(12) United States Patent
Dowski, Jr. et al.

(10) Patent No.: US 11,009,584 B2
(45) Date of Patent: May 18, 2021

(54) LOCALIZATION SYSTEM AND ASSOCIATED METHOD

(71) Applicant: ASCENTIA IMAGING, INC., Boulder, CO (US)

(72) Inventors: Edward R. Dowski, Jr., Steamboat Springs, CO (US); Gregory Johnson, Boulder, CO (US)

(73) Assignee: ASCENTIA IMAGING, INC., Boulder, CO (US)

( * ) Notice: Subject to any disclaimer, the term of this patent is extended or adjusted under 35 U.S.C. 154(b) by 372 days.

(21) Appl. No.: 16/065,860

(22) PCT Filed: Dec. 22, 2016

(86) PCT No.: PCT/US2016/068434
§ 371 (c)(1),
(2) Date: Jun. 25, 2018

(87) PCT Pub. No.: WO2017/112903
PCT Pub. Date: Jun. 29, 2017

(65) Prior Publication Data
US 2019/0011530 A1  Jan. 10, 2019

Related U.S. Application Data

(63) Continuation-in-part of application No. 15/162,329, filed on May 23, 2016, now Pat. No. 10,126,114.
(Continued)

(51) Int. Cl.
*G01S 5/00* (2006.01)
*G01S 5/16* (2006.01)
(Continued)

(52) U.S. Cl.
CPC ............... *G01S 5/16* (2013.01); *G01S 3/784* (2013.01); *G01S 3/7835* (2013.01)

(58) Field of Classification Search
USPC ........................................ 367/4.07; 356/4.07
See application file for complete search history.

(56) References Cited

U.S. PATENT DOCUMENTS

| 5,010,885 A | 4/1991 | Fink et al. |
| 5,890,095 A | 3/1999 | Barbour et al. |

(Continued)

FOREIGN PATENT DOCUMENTS

| GB | 2198007 A | 6/1988 |
| JP | 2010085279 A | 4/2010 |
| WO | WO 2013/103725 | 7/2013 |

OTHER PUBLICATIONS

International Search Report of PCT/US2016/068434 dated Apr. 12, 2017, 4 pp.
(Continued)

*Primary Examiner* — James R Hulka
(74) *Attorney, Agent, or Firm* — Lathrop GPM LLP

(57) ABSTRACT

A method for determining a localization parameter of an object includes generating a plurality of estimates of a first frequency-domain amplitude of a baseband signal from the object, each estimate corresponding one of a plurality of temporal segments of the baseband signal. The method also includes determining the first frequency-domain amplitude as most common value of the plurality of estimates, and determining the localization parameter therefrom. A localization system includes a memory and a microprocessor. The memory stores instructions and is configured to store a baseband signal having a temporal frequency component and a corresponding first frequency-domain amplitude. The microprocessor is adapted to execute the instructions to: (i) generate a plurality of estimates of the first frequency-domain amplitude each corresponding to a respective one of a plurality of temporal segments of the baseband signal, and
(Continued)

(ii) determine the first frequency-domain amplitude as the most common value of the estimates.

17 Claims, 23 Drawing Sheets

Related U.S. Application Data

(60) Provisional application No. 62/387,387, filed on Dec. 23, 2015, provisional application No. 62/164,696, filed on May 21, 2015.

(51) Int. Cl.
*G01S 3/784* (2006.01)
*G01S 3/783* (2006.01)

(56) References Cited

U.S. PATENT DOCUMENTS

| | | | | |
|---|---|---|---|---|
| 10,126,114 B2* | 11/2018 | Dowski, Jr. | ............ | G01S 3/783 |
| 2003/0072363 A1* | 4/2003 | McDonald | ............ | H04N 5/211 |
| | | | | 375/232 |
| 2007/0211786 A1 | 9/2007 | Shattil | | |
| 2009/0046787 A1* | 2/2009 | Uesugi | ............ | H04L 25/03891 |
| | | | | 375/260 |
| 2011/0164783 A1* | 7/2011 | Hays | ............ | G01S 17/003 |
| | | | | 382/100 |
| 2012/0050750 A1* | 3/2012 | Hays | ............ | G01S 17/003 |
| | | | | 356/519 |
| 2012/0268745 A1 | 10/2012 | Kudenov | | |
| 2012/0274937 A1* | 11/2012 | Hays | ............ | G01S 17/58 |
| | | | | 356/337 |
| 2013/0230206 A1* | 9/2013 | Mendez-Rodriguez | ............ | |
| | | | | G06K 9/0063 |
| | | | | 382/103 |
| 2014/0204360 A1 | 7/2014 | Dowski, Jr. et al. | | |
| 2016/0094318 A1* | 3/2016 | Shattil | ............ | H04J 13/004 |
| | | | | 375/267 |
| 2016/0341540 A1 | 11/2016 | Dowski, Jr. et al. | | |
| 2017/0026218 A1* | 1/2017 | Shattil | ............ | H04L 5/0037 |
| 2017/0054480 A1* | 2/2017 | Shattil | ............ | H04J 13/004 |

OTHER PUBLICATIONS

International Preliminary Report on Patentability of PCT/US2016/068434 dated Jun. 26, 2018, 8 pp.
European Patent Application No. 20164347.5, Extended Search and Opinion dated Jul. 10, 2020, 9 pages.
Horisaki et al. (2011) "Multidimensional TOMBO imaging and its application," Proc. of SPIE vol. 8165, 6 pp.
Japanese Patent Application No. 2018-532692, English translation of Office Action dated Dec. 11, 2020, 9 pages.

* cited by examiner

LOCALIZATION SYSTEM AND ASSOCIATED METHOD

CROSS-REFERENCE TO RELATED APPLICATIONS

This application is a 35 U.S.C. § 371 filing of International Application No. PCT/US2016/068434, filed Dec. 22, 2016, which claims priority to U.S. Provisional Application No. 62/387,387 filed Dec. 23, 2015, which is incorporated by reference in its entirety. This application is also a continuation in part of U.S. patent application Ser. No. 15/162,329 filed May 23, 2016, which claims priority to U.S. Provisional Application No. 62/164,696 filed May 21, 2015. Each of the above-referenced applications is incorporated by reference herein in its entirety.

BACKGROUND

A localization system tracks location and movement of one or more objects within a localization domain that are in the field of view of the localization system. An angle-based localization system determines locations, in part, by computing relative angles between tracked objects and a location on a plane. Angle-based localization systems are often preferable to image-based localization systems, for example, when high localization precision is required and/or when the size of the localization domain far exceeds that of an image sensor of an image-based localization system.

SUMMARY OF THE INVENTION

In a first embodiment, a method for determining a localization parameter of an object includes generating a plurality of estimates of a first frequency-domain amplitude of a baseband signal from the object. Each of the plurality of estimates corresponds to a respective one of a plurality of temporal segments of the baseband signal. The first frequency-domain amplitude corresponds to a temporal frequency of the baseband signal. The method also includes determining the first frequency-domain amplitude as most common value of the plurality of estimates, and determining the localization parameter based on the first frequency-domain amplitude.

In a second embodiment, a localization system includes a memory and a microprocessor. The memory stores non-transitory computer-readable instructions and is configured to store a baseband signal having a temporal frequency component and a corresponding first frequency-domain amplitude. The microprocessor is adapted to execute the instructions to: (i) generate a plurality of estimates of the first frequency-domain amplitude each corresponding to a respective one of a plurality of temporal segments of the baseband signal, and (ii) determine the first frequency-domain amplitude as the most common value of the plurality of estimates.

DETAILED DESCRIPTION OF THE EMBODIMENTS

Figure 1:
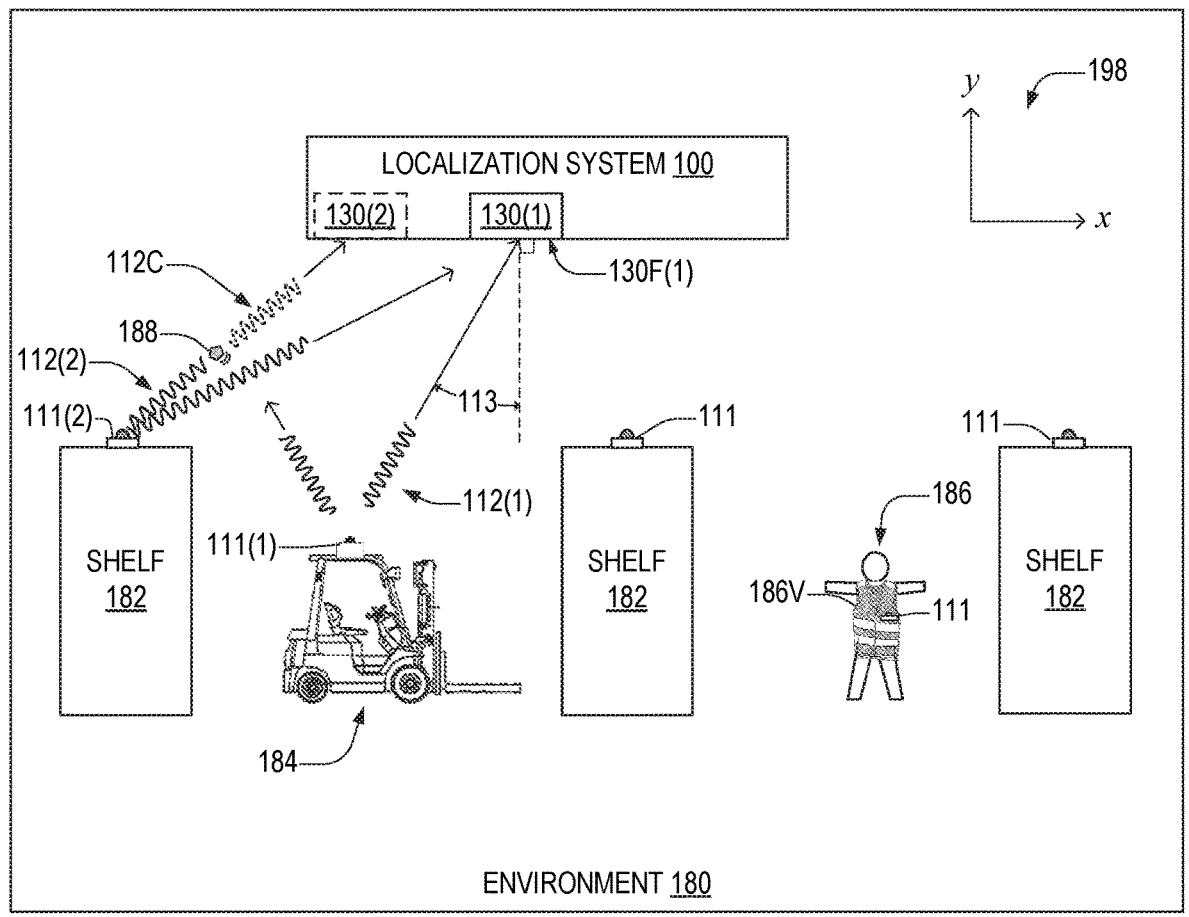
FIG. 1 shows a localization system in an exemplary use scenario, in an embodiment.

FIG. 1 shows a localization system 100 in an exemplary use scenario within an environment 180. Environment 180 is for example a warehouse, a factory, a fabrication plant, a job site, a construction site (for a road, building, etc.), a landscaping site, and may be located either indoors or outdoors. The physical scale, electrical bandwidth, and required localization precision in this scenario are each sufficiently large as to make image-processing-based localization very difficult and/or resource intensive. Localization system 100 may include any feature of optical guidance systems 500, 600, and 700 described in U.S. application Ser. No. 14/165,946.

Environment 180 includes a vehicle 184, a person 186 wearing a vest 186V, and obstructions, such as shelves 182, which limit a human's line-of-sight ability. Vehicle 184 is for example a forklift or other type of vehicle with a repositionable part, such as construction equipment (backhoe, excavator, bulldozer, etc.). Localization system 100 includes a receiver 130(1) and tracks positions of emitters 111, which are on trackable objects such as vehicle 184, vest 186V, and shelves 182. Receiver 130(1) has a front surface 130F(1) in a plane perpendicular to the x-y plane of a coordinate system 198. Localization system 100 optionally includes one or more additional receivers, such as a second receiver 130(2).

In an embodiment, both receivers 130 and emitters 111 are located on a same vehicle, such as vehicle 184, for determining and controlling location of a moving part of vehicle 184.

Emitters 111 may be part of localization system 100. In an exemplary mode of operation, receiver 130(1) receives a signal 112(1) from emitter 111(1), from which localization system 100 determines location information about emitter 111(1).

One function of localization system 100 may be to localize and report the locations of objects or people, such as vehicle 184 and person 186. For example, localization system 100 determines a location angle 113 in the x-y plane between emitter 111(1) and front surface 130F(1). Localization system 100 may also determine a second localization angle of emitter 111(1) with respect to receiver 130(2). Such location data may be used to control object locations, such as vehicle 184, for purposes of navigation and collision avoidance.

Receiver 130 may receive corrupted signals from emitters 111, e.g., from emitter 111(2) emitting signal 112(2). For example, when an occlusion 188 is between emitter 111(2) and receiver 130(2), receiver 130(2) receives a corrupted signal 112C, which is a corrupted version of signal 112(2). Occlusion 188 is for example airborne dust, or ambient moisture in the form of rain, sleet, or snow. Corrupted signal 112C may also be caused by a malfunction of an emitter 111. Reliable operation of localization system 100 requires system 100 be able to remove noise in corrupted signal 112C such that it can accurately locate emitter 111(2).

Figure 2:
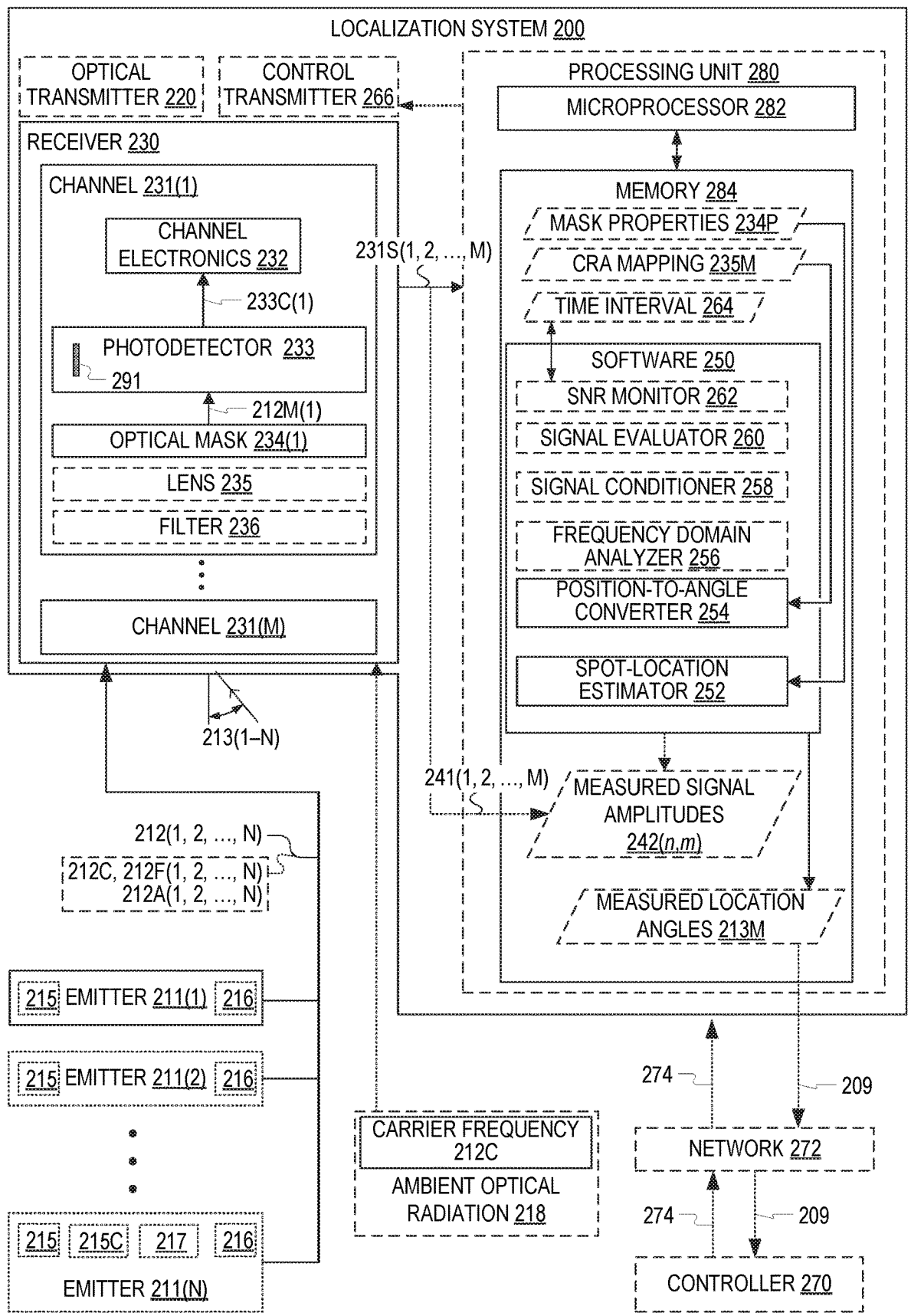
FIG. 2 illustrates an embodiment of a localization system that is an example of localization system of FIG. 1.

FIG. 2 illustrates one exemplary localization system 200, which is an example of localization system 100. Localization system 200 includes a receiver 230 and optionally a processing unit 280. Processing unit 280 includes a microprocessor 282 and a memory 284. Memory 284 may represent one or both of volatile memory (e.g., SRAM, DRAM, or any combination thereof) and nonvolatile memory (e.g., FLASH, ROM, magnetic media, optical media, or any combination thereof). Memory 284 stores software 250 that includes machine-readable instructions. Microprocessor 282 is communicatively coupled to memory 284 and, when executing the machine-readable instructions stored therein, performs functions of localization system 200 as described herein. Software 250 includes a spot-location estimator 252, a position-to-angle converter 254, and optionally a frequency domain analyzer 256, a signal conditioner 258, a signal evaluator 260, a signal-to-noise (SNR) monitor 262. Memory 284 may also store mask properties 234P, CRA mapping 235M, and time interval 264 that are optionally used by spot-location estimator 252, position-to-angle converter 254, and SNR monitor 262, respectively.

Localization system 200 may also include optional emitters 211. Receiver 230 and emitters 211 may be implemented as receiver 130(1) and emitters 111, respectively. Emitters 211 include at least emitter 211(1) and may further include any number of emitters 211(2) through 211(N). Each emitter 211(1-N) provides a respective optical signal 212(1-N) having a carrier frequency 212C. Optical signals 212(1-N) may have modulation frequency 212F(1-N) and a corresponding frequency-domain amplitude 212A(1-N), in which case carrier frequency 212C is a carrier frequency. In a typical use scenario, localization system 200 is in an environment that includes ambient optical radiation 218 that includes carrier frequency 212C in its optical spectrum. Modulation frequencies 212F of optical signals 212 enable localization system 200 to distinguish a signal propagating from emitters 211 from the component of ambient optical radiation 218 having carrier frequency 212C.

Emitter 211 may include a light source 215, such as a light-emitting diode (LED) or laser diode, which generates optical signal 212. An emitter 211 may also include electrical circuitry 215C configured to modulate output of light source 215. Optical signal 212 may be originally generated by a source distant from an emitter 211, such as an optical transmitter 220, which is for example part of localization system 200 and may be attached to or proximate receiver 230. Emitter 211 may include a reflector 216 for reflecting optical signal 212 generated by optical transmitter 220 toward receiver 230. Optical transmitter 220 may emit electromagnetic radiation such as visible light, near-infrared light, and a combination thereof.

Modulating optical signals 212(1-N) with a respective modulation frequency 212F(1-N) is one way to distinguish emitters 211 from one another. Alternatively, each emitter 211 may emit a different carrier frequency (212C(1, 2, . . . N)) or polarization. A channel 231 may include a filter 236 for transmitting a carrier frequency 212C or polarization corresponding to that of light propagating from a single emitter 211. Filter 236 includes, for example, at least one of an optical bandpass filter, a linear polarizer, and a circular polarizer.

Carrier frequency 212C corresponds, for example, to one or more free-space optical wavelengths between 0.40 µm and 2.0 µm, such as 0.95-µm. Filter 236 is for example a narrow-band optical bandpass filter having a center transmission frequency equal to carrier frequency 212C. Modulation frequencies 212F are for example between 50 Hz and 500 kHz. Optical signals 212 may be modulated with one or more modulation methods known in the art, which include amplitude modulation, frequency modulation, spread-spectrum, and random one-time code modulation.

Receiver 230 includes a plurality of channels 231. Each channel 231 includes an optical mask 234, a photodetector 233, channel electronics 232, and optionally a lens 235. Each optical mask 234 is between its respective photodetector 233 and emitter 211 such that optical signals 212 propagate through an optical mask 234 before being detected by a photodetector 233 therebehind. Two or more optical masks 234(1-M) may be distinct optical elements. Alternatively, two or more optical masks 234(1-M) may correspond to a different region of a single optical element that covers two or more respective photodetectors 233.

In an embodiment, each photodetector 233 is a single-pixel photodetector, for example a photodiode such as a silicon PIN diode that has, for example, a temporal cut-off frequency of 20 MHz. In another embodiment, photodetectors 233 are implemented in a pixel array such that each photodetectors 233 is a different pixel of the pixel array. The pixel array is, for example, a complementary metal-oxide-semiconductor (CMOS) image sensor or a charge-coupled device (CCD) image sensor.

Channels 231 may be arranged in any spatial configuration within receiver 230. In one embodiment, channels 231 are arranged along a line. In another embodiment, channels 231 are arranged within a plane but not all lie on the same line, such that channels 231 define a plane. For example, channels 231 are arranged in a two-dimensional array.

Each optical mask 234(1-M) is mutually distinct, such that optical mask 234(m) of channel 231(m) differs from optical mask 234(n) of channel 231(n), where m≠n. Without departing from the scope hereof, receiver 230 may also include, in addition to channels 231(1-M), additional channels 231 having an optical mask 234 identical to an optical mask 234 of a channel 231(1-M), Optical masks 234 may impose a respective signal modification of incident optical signals 212. The signal modification is at least one of a change in phase, amplitude, or polarization, and is for example functionally or numerically representable as a mask property 234P optionally stored in memory 284. An optical mask is for example an optical element with a spatially-varying transmissivity described by a spatially-varying transmission function, which is an example of a mask property 234P stored in memory 284. Mask property 234P is, for example, a look-up table representing the transmission function. Each optical mask 234 modifies the optical signal 212 transmitted therethrough to photodetector 233 and hence, with the exception of a phase-only mask, also modifies frequency-domain amplitude 212A corresponding to optical signal 212.

Optical signals 212(1-N) are incident on channels 231 at respective location angles 213(1-N), illustrated in FIG. 2 as a single angle for clarity of illustration. Each location angles 213 is an example of location angle 113. When included in a channel 231(i), where i∈{1, 2, . . . , M}, lens 235 is between the channel's photodetector 233(i) and an emitter 211(i) such that lens 235 maps angle 213 to an signal location 291 on photodetector 233(i) upon which optical signal 212 is incident.

Location angle 213 is for example a chief-ray angle (CRA) of a ray (the chief ray) incident on lens 235. Lens 235 maps angle 213 to an signal location 291 according to a characteristic CRA function, which may be stored in memory 284 as CRA mapping 235M. CRA mapping 235M is for example a lookup table of chief-ray angles and corresponding signal locations 291. CRA mapping 235M may also include properties of lens 235 such as its focal length and distance from optical mask 234.

Each channel 231 has a respective channel field of view ("channel-FOV") by virtue of the size of its photodetector and, when included, the relative aperture (f-number) of lens 235. In an embodiment, channel-FOVs of three or more channels 231 overlap such that at least three channels 231 receive optical signal 212 from a same emitter 211.

Each optical mask 234 transmits one or more optical signals 212(1-N) to photodetector 233 as a modified optical signal 212M, which in turn generates a photocurrent signal 233C received by channel electronics 232. For example, photodetectors 233 of channel 231(1) generates photocurrent signal 233C(1).

Channel electronics 232 may include circuitry capable of performing one or more of the following operations on photocurrent signal 233C: analog-to-digital conversion, low-pass filtering, and a demodulation. For example, channel electronics 232 includes low-pass filter circuitry that also functions as an analog demodulator. In another example, channel electronics 232 includes a low-pass filter, an analog-to-digital convertor, and a digital demodulator.

In an embodiment, channel electronics 232 of one or more channels 231 is capable of demodulating photocurrent signal 233C to recover, if present, more than one modulation frequency 212F. For example, within a demodulation period T, channel electronics 232 demodulates photocurrent signal 233C at a demodulation frequency equal to one of 212F(1-$N_1$) for a duration $T/N_1$, where $1<N_1 \le N$. In an embodiment, one or more channels 231 has dedicated channel electronics 232 corresponding to a single modulation frequency 212F. In another embodiment, channel electronics 232 provides amplification and is spatially separate from, where demodulation, filtering and digital conversion occurs, e.g., within processing unit 280 to which channel electronics 232 is communicatively coupled. In this embodiment, channel electronics 232 may also provide bias cancellation.

Channel electronics 232 of each channel 231(m) outputs a respective channel signal 231S(m) to memory 284 communicatively coupled to microprocessor 282, where m∈{1, 2, . . . , M}. Each channel signal 231S(m) includes a measured signal amplitude 241(m), which may be stored as a measured signal amplitude 242 in memory 284. Measured signal amplitude 241(m) may be the amplitude of channel signal 231S(m), for example, when optical signal 212 is not modulated, or prior to demodulation, filtering, and digital conversion of channel signal 231S(m).

When optical signal 212 is modulated, that is, with a modulation frequency 212F(n) at a corresponding frequency-domain amplitude 212A(n), software 250 may determine measured signal amplitude 242(n, m) corresponding to optical signal 212(n) as detected by channel 231(m), where n∈{1, 2, . . . , N}.

Microprocessor 282 may include circuitry configured to and capable of performing one or more of the following operations on photocurrent signal 233C: amplification, analog-to-digital conversion, low-pass filtering, and a demodulation. For example, microprocessor 282 and channel electronics 232 are complementary, such that at least one of them performs amplification, analog-to-digital conversion, low-pass filtering, and a demodulation on the respective signals they receive.

In one embodiment, microprocessor 282 is integrated with receiver 230. For example, microprocessor 282 and receiver 230 may be located on the same circuit board. Microprocessor 282 may be integrated into a channel 231, which then functions as a master with other channels 231 being slaves. In another embodiment, microprocessor 282 is separate from receiver 230. For example, microprocessor 282 and receiver 230 share an enclosure, or microprocessor 282 is located on a separate computer at a distance away from receiver 230. Localization system 200 may include more than one receiver 230, which may be communicatively coupled and independently positionable with respect to microprocessor 282 and memory 284.

In an embodiment, localization system 200 measures location angles 213(1-N) corresponding to respective emitters 211(1-N), which may be stored in memory 284 as measured location angles 213M(1-N). Measured location angles 213M(1-N) correspond to a respective location angle 213(1-N). Localization may be configured to output localization data 209, such as angles 213M, to a controller 270, via wired or wireless communication. Controller 270 may be remotely located such that it receives localization data 209 via a computer network 272, which is for example an intranet or the Internet. Localization system 200 may also be configured to receive instructions 274 from controller 270 and transmit them, via a control transmitter 266, to a receiver 217 on an object that also includes an emitter 211. For example, emitter 211(N) may include receiver 217, and is an example of emitter 111(1) on vehicle 184. Alternatively, a receiver 217 need not be integrated (co-packaged) with an emitter 211, such that an object such as vehicle 184 may include a receiver 217 and emitter 211 that are independently positionable. Control transmitter 266 and receiver 217 are WiFi, Bluetooth, Bluetooth Low Energy (BLE), Cellular (3G, 4G, 5G, LTE, LTE-U, NB-1, CAT, etc.)-compliant devices, for example, but may be any wireless transmission protocol without departing from the scope hereof.

Figure 3:
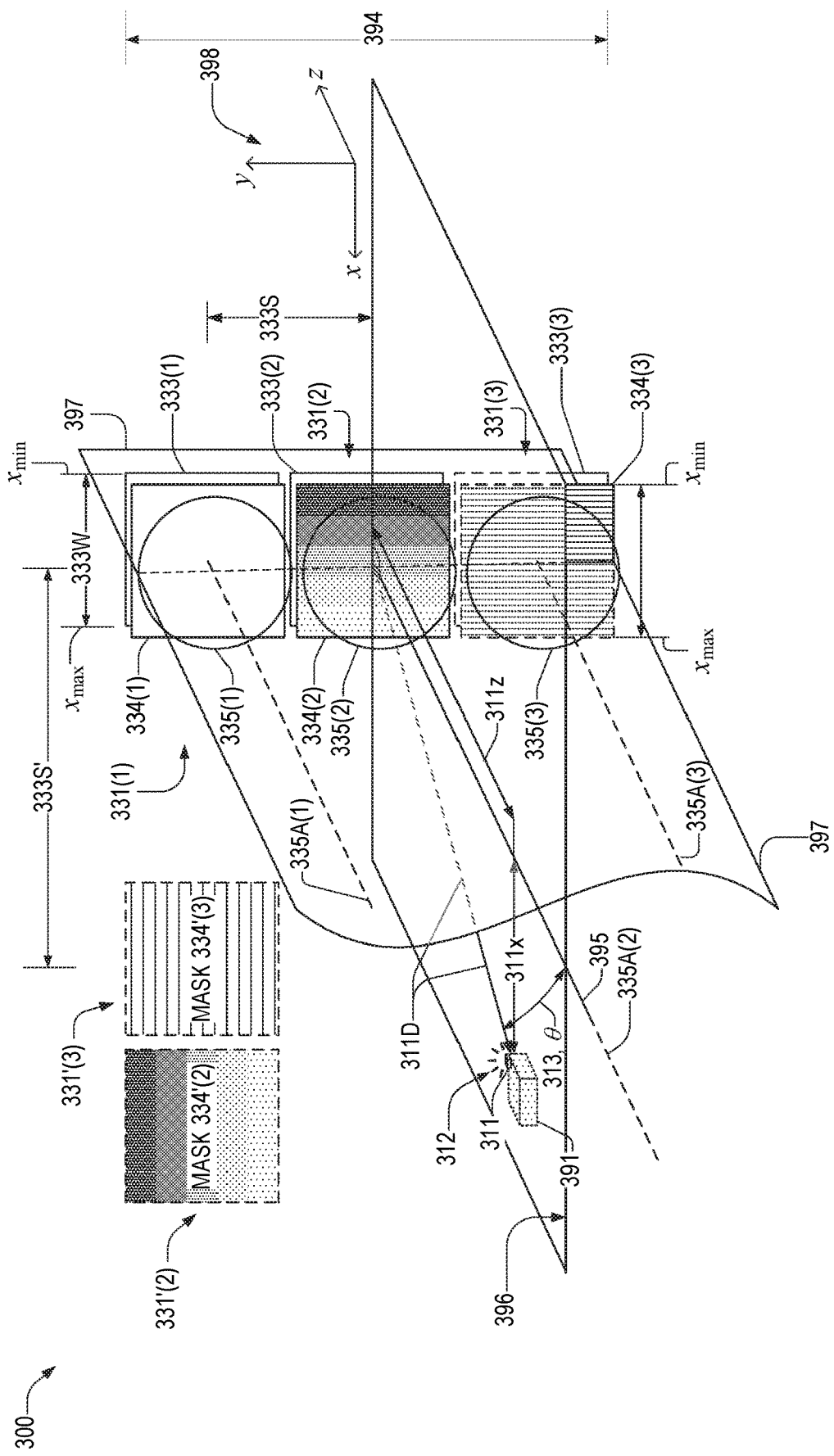
FIG. 3 is a perspective view of a localization system, which is an example of the localization system of FIG. 2.
Figure 4:
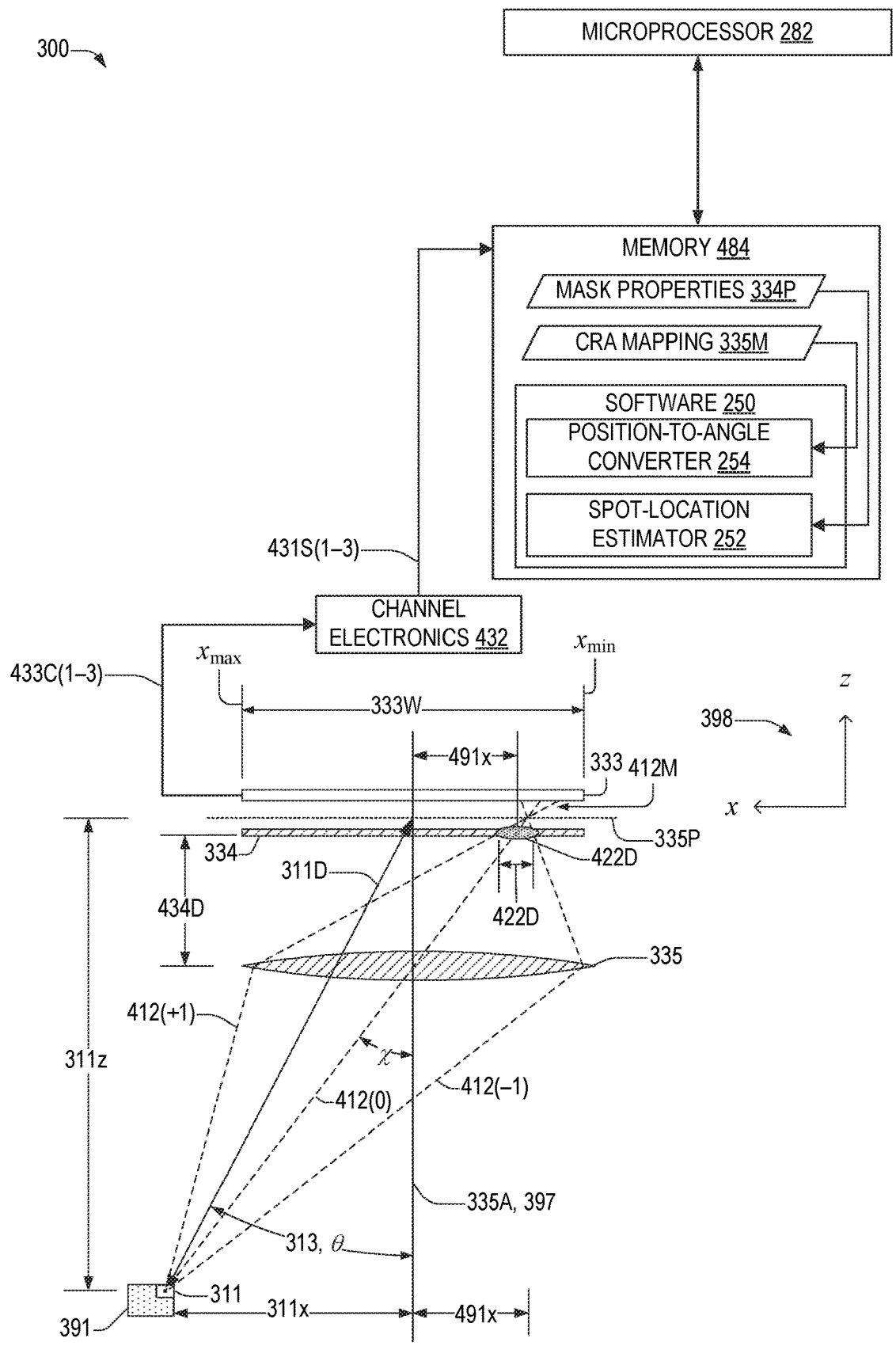
FIG. 4 is a cross-sectional view of the localization system of FIG. 3.

FIG. 3 is a perspective view and FIG. 4 is a cross-sectional view of a localization system 300. FIGS. 3 and 4 are best viewed together in the following description. FIG. 3 includes a coordinate system 398 that has an x-y plane, an x-z plane, and a y-z plane. Herein, references to x, y, and z directions (or axes) and planes formed thereof are of coordinate system 398, unless otherwise specified. Localization system 300 is an example of localization system 200 and includes channels 331(1-3), channel electronics 432, microprocessor 282, and memory 484.

Channels 331(1-3) are each examples of channels 231 and include photodetectors 333(1-3), optical masks 334(1-3), and lenses 335(1-3), respectively. Photodetectors 333, optical masks 334, and lenses 335 are examples of photodetectors 233, optical masks 234, and lenses 235, respectively. Channel electronics 432 is an example of channel electronics 232. Memory 484 is an example of memory 284 and includes mask properties 334P of masks 334 and CRA mapping 335M of lenses 335. Mask properties 334P and CRA mapping 335M are examples of mask properties 234P and CRA mapping 235M, respectively.

The relative positions of channels 331 may change without affecting the functionality of localization system 300. For example, channel 331(1) may be between channels 331(2,3), or channel 331(3) may be between channels 331(1,2).

Optical masks 334(1-3) span a region in the x-direction between $x_{min}$ and $x_{max}$, where distance $(x_{max}-x_{min})$ is, for example, equal to a width 333W of each photodetector 333 or an image circle from lenses 335, either of which may also span the region. Distance $(x_{max}-x_{min})$ may be less than or exceed width 333W without departing from the scope hereof. Each optical mask 334 is in a plane parallel to the x-y plane that is perpendicular to a plane 396, which is parallel to the x-z plane. Lenses 335 are in front of optical masks 334(1-3) and have respective optical axes 335A(1-3) that are coplanar in a plane 397, which is orthogonal to plane 396. The cross-sectional view of FIG. 4 represents a cross-sectional view of localization system 300 in plane 396, or in a plane parallel to plane 396 that includes one of optical axes 335A(1) and 335A(3).

Optical masks 334(1-3) are each part of a respective channel 331(1-3) of localization system 300 that have respective fields of view that overlap in a region that includes an object 391. Object 391 has thereon an emitter 311 that intersects plane 396. Emitter 311 is an example of emitter 211. Line 395 is in plane 396 and is perpendicular to the x-y plane. Line 395 is for example collinear with an optical axis 335A of lens 335 in front of optical mask 334(2). Optical mask 334(2) may be a biplanar absorptive filter (with gradient transmissivity) or a wedge-shaped absorption filter having a thickness that varies in the x direction. Channels 331 span a range 394 of y-coordinate values. Object 391 and emitter 311 are shown within this range for illustrative purposes only, and may be outside of this range without departing from the scope hereof.

In plane 396, emitter 311 is located at a distance 311D from photodetector 333(2), a distance 311z from a plane that includes photodetectors 333, and a distance 311x from plane 397. Distances 311x and 311z correspond to emitter 211 having a location angle 313 with respect to plane 397, or equivalently with respect to optical axis 335A(2). Location angle 313 is an example of angle 213, and herein is also referred to as location angle θ.

Channels 331(1-3) are arranged collinearly in the y-direction. For example, channels 331(1-3) are center-aligned in the x-direction such that each optical axis 335A(1-3) is in plane 397. Such center alignment prevents parallax-induced errors in determining angle 313. For example, if channels 331 were translated along the negative y-direction such that optical axis 335A(1) of channel 331(1) were in plane 397, the angle between emitter 311 and optical axis 335A(1) equals aforementioned location angle 313 only if channels 331(1-2) are center-aligned in the x-direction. In another embodiment, the parallax effect is used as a ranging estimator by purposefully arranging channels to induce parallax errors.

Photodetectors 333 are separated by a center-to-center distance 333S along the y direction. Distance 333S is for example between one millimeter and ten centimeters, which is much less than a typical distance 311D.

Lenses 335 have a focal length $f$ and are located a distance 434D from respective optical masks 334. Distance 434D for example equals focal length $f±\Delta$, where defocus distance $\Delta$ may equal zero. Emitter 211 emits optical signal 312, which is an example of optical signal 212. Optical signal 312 includes a chief ray 412(0) and marginal rays 412(±1), which lens 335 images onto an image plane 335P. Rays 412 form a spot 422 at optical mask 334 that has a spot size 422D. Spot size 422D may be a full-width-half-max spot size or a $1/e^2$ spot size. Spot 422 is centered at a signal location 491x with respect to plane 397.

Image plane 335P is, for example, within optical mask 334, at a front surface or back surface thereof, or between optical mask 334 and photodetector 333. Optical mask transmits optical signal 312 as a modified optical signal 412M, which is an example of modified optical signal 212M.

In some embodiments, it is advantageous for the lens 335 to produce a large spot (e.g., a minimum spot size relative to the diffraction limit) or for image plane 335P to be displaced from optical mask 334 ($|\Delta|>0$) such that spot 422 is either large by design or a blurred spot on optical mask 334. Lens 335 may be designed to yield a large optical spot to enable misfocus invariance, such as for extended depth of field, wide FOV, chromatic aberration control and/or thermal control. Another way to form a large optical spot is through simple misfocus.

For example, optical mask 334 has a spatially-varying transmissivity that is binary (transmission equals either $T_{min}$ or $T_{max}$) and periodic in the x direction with a period $\Lambda_x$. Period $\Lambda_x$ is between twenty-five micrometers and fifty micrometers, for example. If spot size 422D is less than period $\Lambda_x$, then optical mask 334 may either completely attenuate or completely transmit optical signal 312, which would result in processing unit being incapable of determining providing localization information about emitter 311 from modified optical signal 412M. To avoid such a scenario, lens 335 may be designed to produce a spot at image plane 335P that has a spot size, as a function of chief-ray angles $\chi$, that minimally differs from period $\Lambda_x$ for chief-ray angles $\chi$ within the field of view of channel 331.

In an embodiment, lens 335 has an f-number N=4, such that at free-space wavelength $\lambda_0$=1.0 µm, its diffraction limited spot size (Airy disk diameter) is approximately ten micrometers. Lens 335 may be designed to direct light to a spot having a minimum diameter that exceeds the diffraction limit. For example, the minimum diameter equals period $\Lambda_x$, with exemplary ranges described above.

Chief-ray 412(0) intersects optical axis 335A at chief-ray angle (CRA) $\chi$ such that signal location 491x equals ($f\pm\Delta$) tan($\chi$). Signal location 491x is an example of signal location 291, FIG. 2. In practice, chief-ray angle $\chi$ is approximately equal to location angle 313 ($\theta$), which can be seen in FIG. 4. Location angle $\theta$ satisfies $$\tan\theta = \frac{411x}{411z},$$

while chief-ray angle $\chi$ satisfies $$\tan\chi = \frac{411x + 491x}{411z}.$$

In practice, distance 311x is far greater than signal location 491x, such that $\chi \approx \theta$. Detector 333 may be a single-pixel detector for example has width 333W between one-half millimeter and ten millimeters such that signal location 491x is less than five millimeters. By contrast, distance 311x may be on the order of meters.

Chief-ray angle $\chi$ satisfies CRA mapping 335M relating chief-ray angle $\chi$ and signal location 491x. When lens 335 is a thin lens, CRA mapping 335M is $$\tan\chi = \frac{491x}{434D}.$$

Distance 434D is known, and hence determining signal location 491x enables determination of chief-ray angle $\chi$, and hence location angle $\theta$ of emitter 311 and object 391.

Without departing from the scope hereof, chief-ray angle $\chi$ and signal location 491x may satisfy a relation other than $$\tan\chi = \frac{491x}{434D},$$

for example, when lens 335 is a compound lens. In such a case, a functional relationship or a numerical one-to-one mapping between chief-ray angle $\chi$ and signal location 491x may be determined using lens design software known in the art and stored as CRA mapping 335M. For example, lenses 335 are image-side telecentric lenses, which decrease the spatial dimensions, such as width 333W, of optical masks 334 and photodetectors 333 sufficient for rays 412 to reach optical masks 334 and photodetectors 333.

Figure 5:
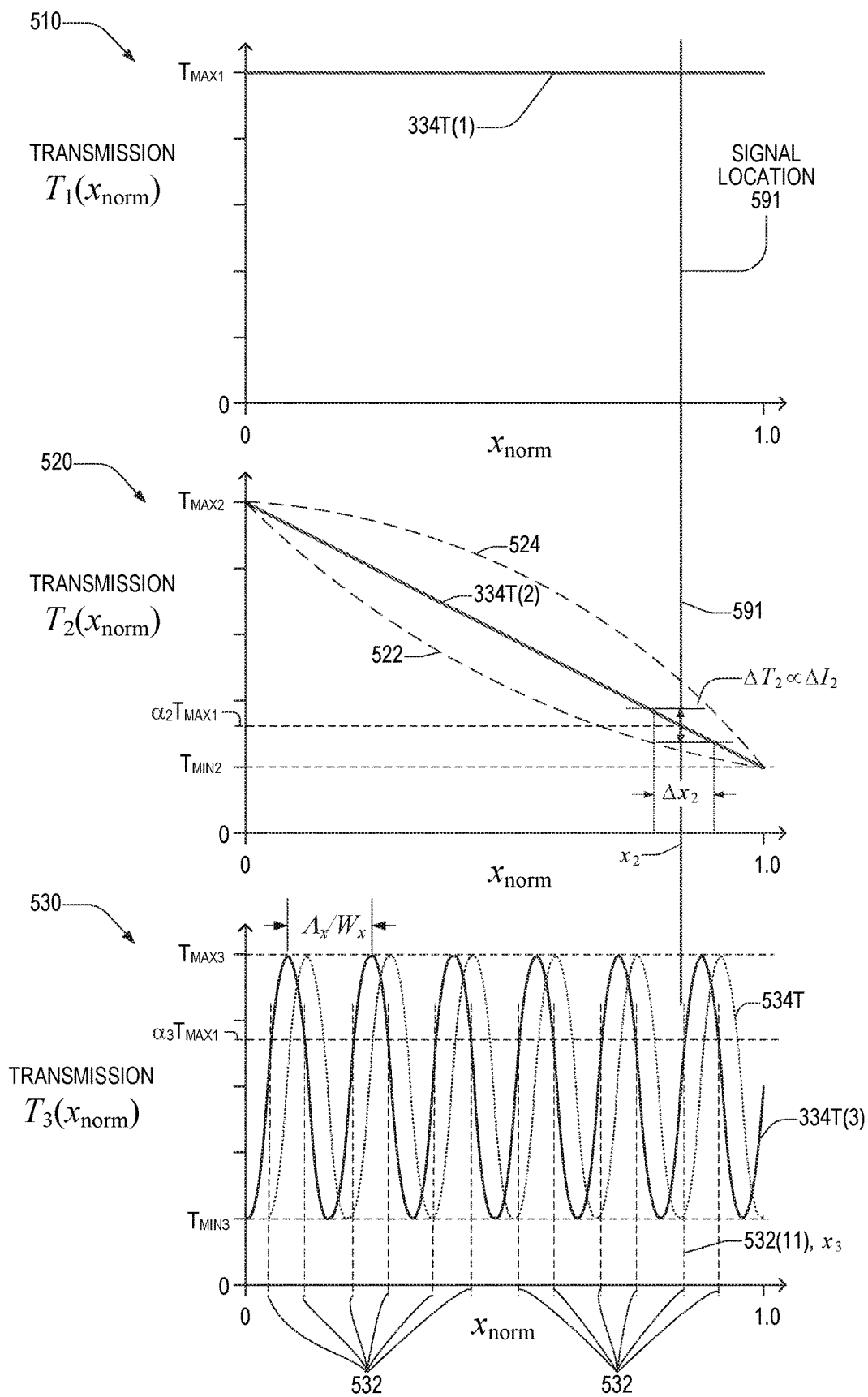
FIG. 5 includes plots of exemplary transmission functions of optical masks of the localization system of FIG. 3.

FIG. 5 includes plots 510, 520, and 530 showing respective exemplary transmission functions 334T(1-3) of optical masks 334(1-3). Optical masks 334 are for example formed of molded plastic or may be a clear opening for a unity transmission function. Optical masks 334 may include an absorbing dye at predetermined locations such that their transmission functions 334T apply at a wavelength corresponding to carrier frequency 212C. The absorbing dye absorbs near-infrared light, for example, and may have a peak absorption at 950±20 nm. Any of optical masks 334 (1-3) may have a plurality of opaque or transparent halftone shapes (dots, polygons, lines, etc.) arranged such that transmission functions 334T(1-3) represent their respective measured transmission functions. Such a transmission function measurement employs an optical spot that spans several halftone shapes such that the halftones yield an effective spatial transmission gradient.

Transmission functions 334T(1-3) are each a function of a normalized signal location $x_{norm}$ in a direction parallel to the x-dimension. Herein, transmission functions 334T(1-3) are also referred to as $T_1(x_{norm})$, $T_2(x_{norm})$, and $T_3(x_{norm})$ respectively. Transmission functions 334T(1-3) may be independent of y, such that any spatial variation thereof is entirely along the x direction. A 2D search may be performed to isolate or determine the x and y spatial variation. Normalized signal location $x_{norm}$ is between $x_{min}$ and $x_{max}$ of FIGS. 3 and 4, for example.

Transmission function 334T(1) has a uniform transmission, in both directions x and y, equal to $T_{max1}$, which is for example unity or 0.99. Transmission function 334T(2) has a maximum $T_{max2} \le T_{max1}$ and a minimum $T_{min2} > 0$. Transmission function 334T(3) has a maximum $T_{max3} \le T_{max1}$ and a minimum $T_{min3} > 0$. Minimum transmissions $T_{min2}$ and $T_{min3}$ are for example 0.20. Transmission functions 334T(1-3) are each examples of a mask property 234P that may be stored in memory 484, as a lookup table for example.

Normalized signal location $x_{norm}$ is normalized to a width of optical mask 334 along the x-dimension. In response to modified optical signal 412M, photodetectors 333(1-3) generate a respective photocurrent signal 433C(1-3), which are each examples of photocurrent signal 233C, from which channel electronics 432 generates respective channel signals 431S(1-3) (FIG. 4). Channel signals 431S(1-3) are examples of channel signals 231S.

The amplitude of channel signals 431S(1-3) may be stored in memory 284 as measured signal amplitudes 242. The amplitude of channel signals 431S(1-3) may correspond to a single modulation frequency amplitude 242A, e.g., a frequency of amplitude modulation, of modified optical signal 412M that distinguishes signals from emitter 311 from ambient light incident on channels 331. Alternatively, amplitudes of channel signals 431S(1-3) may be proportional to respective photocurrent signals 433C(1-3).

Herein, channel signals 431S(1-3) are also denoted by $I_1$, $I_2$, and $I_3$, respectively. Modified optical signal 412M has an optical power $P_0$, which can be considered uniform across photodetectors 333 because distance 333S between adjacent photodetectors 333 is small compared to distance 311D.

Channel signals $I_1, I_2,$ and $I_3$ are proportional to the product of optical power $P_0$ and their respective transmission functions $T_1, T_2,$ and $T_3$ (m=1,2, or 3), as shown in Equation 1.

$$I_m \propto T_m P_0 \qquad \text{Eq. (1)}$$

Plots 510, 520, and 530 each denote a normalized signal location 591, which corresponds to signal location 491x of FIG. 5. The value of signal location 591, that is, a value of $x_{norm}$ between zero and one, may be determined given known transmission functions $T_1, T_2,$ and $T_3$.

Channel 331(1) generates channel signal $I_1$ generated by photodetector 333(1) that is independent of signal location

591 because $T_1(x_{norm})=T_{max}$. Hence, on its own, the response of photodetector 333(1), which is channel signal $I_1$, provides no information about signal location 491$x$, and accordingly no information about location angle 313.

Channel signal $I_2$ generated by channel 331(2) provides a coarse estimate $x_2$ of signal location 491$x$ because the functional form $T_2(x_{norm})$ is known. In the example of plot 500(2), transmission function 334T(2) ($T_2(x_{norm})$) is represented by Equation 2, where $T_{max2}$ and $T_{min2}$ of optical mask 334(2) are known.

$$T_2(x_{norm})=T_{max2}-(T_{max2}-T_{min2})x_{norm} \quad \text{Eq. (2)}$$

Measured channel signals $I_1$ and $I_2$ provide a value of a ratio $\alpha_2 = I_2/I_1$. Ratio $\alpha_2$ also equals $T_2/T_1$ because $I_2 \propto T_2 P_0$, per Eq. 1. Hence, in channel 331(2) signal location 591 corresponds to a transmission value of $T_2(x_2)=\alpha_2 T_{max1}$. Accordingly, $\alpha_2 T_1$, or equivalently $\alpha_2 T_{max1}$, may be substituted for $T_2(x_{norm})$ in Eq. 2, such that a first estimate $x_2$ of $x_{norm}$ can be determined from known quantities $T_{max1}$, $T_{max2}$, and $T_{min2}$, as shown in Equation 3. Spot-location estimator 252 may determine first estimate $x_2$.

$$x_2 = \frac{T_{max2} - \alpha_2 T_{max1}}{(T_{max2} - T_{min2})} \quad \text{Eq. (3)}$$

Transmission function 334T(2) is shown as linear in FIG. 5 and Eq. 2, but may be non-linear without departing from the scope hereof. For example, Transmission function 334T(2) may be a monotonically increasing or monotonically decreasing function of $x_{norm}$, such as curves 522 and 524. The above-mentioned examples of transmission function 334T(2) are each a one-to-one function (a.k.a. an "injective" or "strictly monotonic" function, to use mathematical terms), such that each transmission value between $T_{min}$ and $T_{max}$ corresponds to one and only one value of $x_{norm}$. A strictly monotonic function may be either strictly increasing or strictly decreasing. Mathematically, transmission function 334T(2) as shown in plot 520 is a strictly decreasing function of increasing $x_{norm}$ because it is always decreasing, rather than increasing or remaining constant. The injective or strictly monotonic property of transmission function 334T(2) enables measured photocurrent signal 433C(2) (also denoted $I_2$) to identify a one (and only one) $x_2$ value as an estimate of signal location 591. Herein, an optical mask with an injective (strictly monotonic) transmission function (e.g., strictly increasing or strictly decreasing) is called a slow-varying optical mask.

Different embodiments of optical mask 334(2) may have a same measured transmission function similar to transmission function 334T(2) shown in plot 520. In a first embodiment, optical mask 334(2) has a truly gradient transmission function. In a second embodiment, optical mask 334(2) is a halftone mask. In a third embodiment, optical mask 334(2) has a plurality of gray levels equivalent to a step-wise approximation of transmission function 334T(2) such that, when its transmission is measured with an optical beam having a width wider than a step width, its measured transmission function is approximates or is indistinguishable from transmission function 334T(2). The step-wise approximation of an optical mask 334(2) may have just one step, such that it has two transmission values, 0.75 and 0.25, for example, indicating respectively a "left-half" or "right half" of optical mask 334(2) in a direction parallel to the $x_{norm}$ axis.

The accuracy of $x_2$ depends in part on an uncertainty $\Delta I_2$ of channel signal $I_2$, as ratio $\alpha_2 = I_2/I_1$. Since ratio $\alpha_2$ also equals $T_2/T_1$, this uncertainty may be represented in plot 520. Uncertainty $\Delta I_2$ corresponds to an uncertainty $\Delta x_2$ of $x_2$, the magnitude of which is determined by slope $$\frac{dT_2}{dx_{norm}} = \frac{(T_{max2} - T_{min2})}{1} \text{ of } T_2(x_{norm}),$$

as shown in Equation 4.

$$\Delta x_2 = \frac{\Delta T_2}{(dT_2/dx_{norm})} \quad \text{Eq. (4)}$$

Uncertainty $\Delta x_2$ can be reduced by increasing ($T_{max2}-T_{min2}$). However, as $T_{min}$ approaches zero, measurements of modified optical signal 412M so attenuated become more noisy, such that $\Delta I_2$ increases, and hence places a lower limit on uncertainty $\Delta x_2$.

Uncertainty $\Delta x_2$ may be reduced detecting optical power $P_0$ with a channel having an optical mask having a slope larger than ($T_{max2}-T_{min2}$). For example, channel 331(3) that has optical mask 334(3), which has a transmission function 334T(3), or $T_3(x_{norm})$, which in this example is periodic. Transmission function 334T(3) may be a continuous function of $y$, e.g., sinusoidal function, or a discontinuous function of $y$, e.g., a signum function of a periodic function (e.g., a square-wave function), a triangle function, or a sawtooth function.

Channel signal $I_3$ generated by photodetector 333(3) provides a refined estimate $x_3$ of signal location 491$x$ because the functional form $T_3(x_{norm})$ is known. For example, $T_3(x_{norm})$ may be represented by Equation 5, where plot 520 illustrates period $\Lambda_x$ divided by $W_x$, which is photodetector width 333W.

$$T_3(x_{norm}) = T_{min} + (T_{max} - T_{min})\sin\left(\frac{2\pi x_{norm}}{(\Lambda_x/W_x)}\right) \quad \text{Eq. (5)}$$

Channel signals $I_1$ and $I_3$ provide a value of a ratio $\alpha_3 = I_3/I_1$. Ratio $\alpha_3$ also equals $T_3/T_1$ because $I_3 \propto T_3 P_0$, per Eq. 1. Hence, in channel 331(3) signal location 591 corresponds to a transmission value of $T_3(x_{norm})=\alpha_3 T_{max}$, which is satisfied at several candidate locations 532, denoted by dashed vertical lines in plot 530, because, in the example of plot 530, $T_3(x_{norm})$ is a sinusoidal function. One location 532 corresponds to signal location 591, which has the same value on each channel 331(1-3). Hence, the "correct" candidate location 532 is the one closest to location $x_2$ determined for channel 331(2), denoted by normalized location 532(11) in plot 530. Normalized location 532(11) may be considered a refined estimate of signal location 591, and hereinafter is also referred to a refined estimate 532(11) or refined estimate $x_3$. Spot-location estimator 252 may determine refined estimate 532(11).

Transmission function 334T(3) may be non-sinusoidal periodic function, such as a triangle waveform, without departing from the scope hereof. Transmission function 334T(3) may be also a non-injective and non-periodic function, such as a quasi-periodic function or a locally-periodic function, without departing from the scope hereof. $T_3(x_{norm})$ of Eq. 5 can be generalized to represent a locally periodic function by specifying that period $\Lambda_x$ is a function of $x_{norm}$, that is, $\Lambda_x=\Lambda_x(x_{norm})$.

In an embodiment, localization system 300 includes additional channels 331 with respective optical masks 334 having a respective periodic transmission function identical to transmission function 334T(3), except that they are shifted by a respective fraction of period $\Lambda_x/W_x$. Transmission function 534T illustrates such a transmission function. Such an embodiment of localization system 300 may include three channels 331, hereinafter "phase-shifted channels," with respective transmission functions 534T that are phase-shifted versions transmission function 334T(3), where the respective phase shifts are 60°, 120°, and 180°. Such an embodiment of localization system 300 may include two phase-shifted channels 331, with respective transmission functions 534T that are phase-shifted versions transmission function 334T(3), where the respective phase shift is 90°.

Such phase-shifted channels each provide additional sets of candidate locations 532 such that refined estimate $x_3$ is determined from more candidates, which enables refined estimate $x_3$ to be closer to coarse estimate $x_2$ than with fewer candidate locations 532. A second benefit of phase-shifted channels becomes apparent when candidate locations 532 are at or near regions of transmission function 334T(3) have zero or very small slope, which results in large uncertainties as illustrated by Eq. 4. A phase-shifted transmission function (e.g., function 534T) has candidate locations in high-slope regions, and hence provide refined estimates with low uncertainty.

The forgoing describes how localization system may operate to determine, for emitter 311, location angle 313 in plane 396. Localization system 300 may also include additional channels 331'(2) and 331'(3), which enable localization system 300 to determine for emitter 311, a second location angle in plane 397, which is orthogonal to plane 396. Distance 333S' between channels 331'(3) and channel 331(1) is not to scale and is for example equal to distance 333S. Channels 331'(2) and 331'(3) are collinear to and in a plane parallel to channel 331(1). For example, channels 331(1), 331'(2), and 331'(3) are center-aligned along the y direction and have lenses 335 with respective optical axes that are coplanar in a plane parallel to plane 396. Channels 331'(2) and 331'(3) are equivalent to channels 331(2) and 331(3), but have respective optical masks 334'(2) and 334'(3) rotated by ninety degrees with respect to optical masks 334(2) and 334(3) such their transmission varies along the x dimension. Channels 331(1), 331'(2), and 331'(3) would enable localization system to determine a second angular location of emitter 311 in a plane parallel to plane 397.

Figure 6:
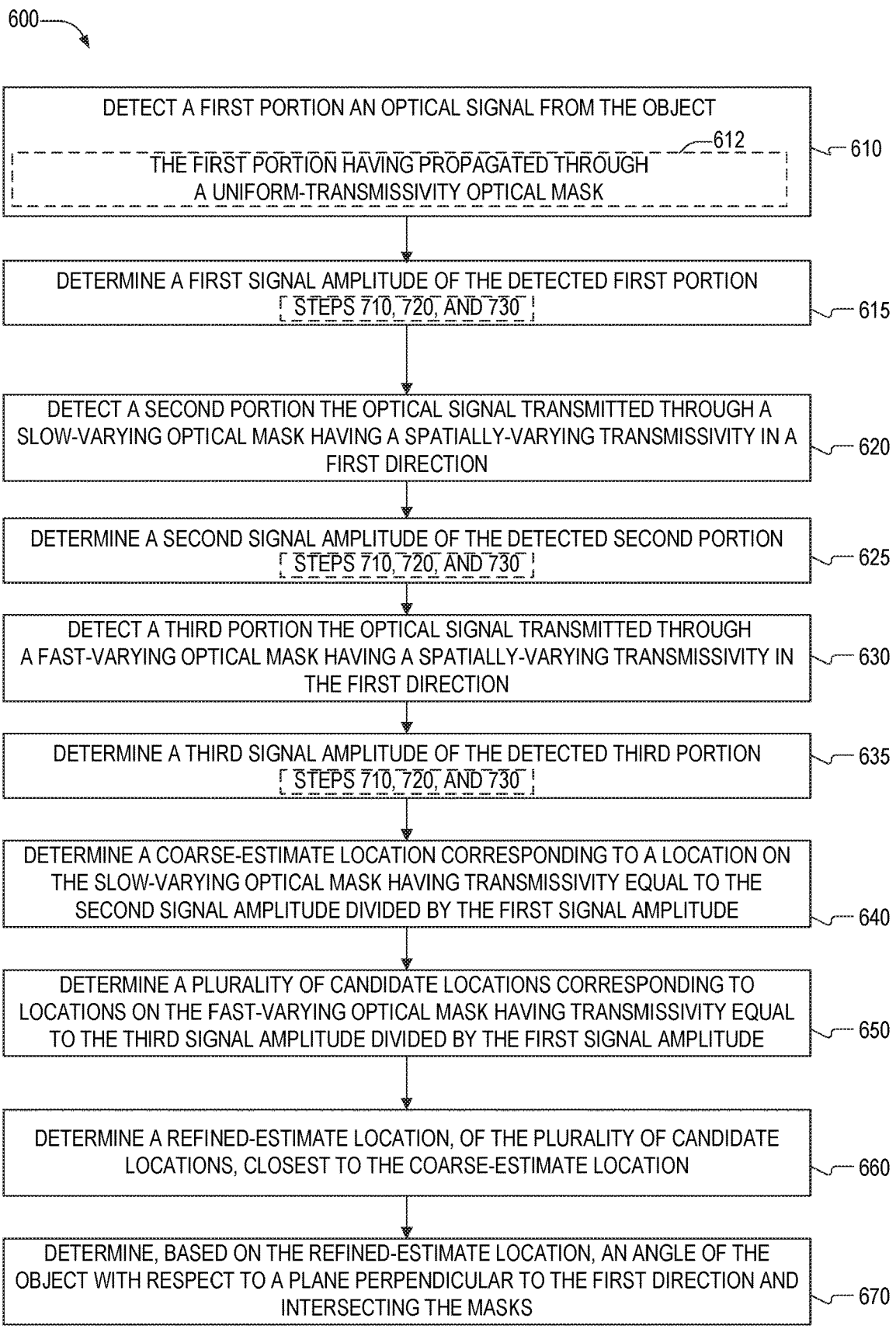
FIG. 6 is a flowchart illustrating a method for determining an angular location of an object, in an embodiment.

FIG. 6 is a flowchart illustrating a method 600 for determining a localization parameter of an object. Method 600 is for example implemented by localization system 200 executing computer-readable instructions of software 250. Localization parameters include each position relative to a rectangular coordinate system (x, y, z), a spherical coordinate system (radial distance r, azimuthal angle θ, and polar angle φ), and Euler angles indicating rotational orientation relative to a coordinate system: pitch, yaw, and roll. Angle 213M may be either a azimuthal angle θ or a polar angle φ. The localization parameter is, for example, an angular location such as measured location angle 213M. The localization parameter may be a distance between the object and a receiver that detects an electromagnetic signal propagating from the object, e.g., in ranging applications.

In step 610, method 600 detects a first portion of an optical signal from the object. In an example of step 610, a first portion of optical signal 312 is incident on lens 335(1), which directs the first portion toward detector 333(1).

Step 610 optionally includes step 612. In step 612, method 600 detects the first portion, the first portion having propagated through a uniform optical mask having a uniform transmissivity that equals or exceeds a maximum transmissivity of a second optical mask. In an example of step 612, lens 335(1) directs the first portion toward optical mask 334(1) such that the first portion propagates through optical mask 334(1) before being detected by detector 333(1).

In step 615, method 600 determines a first signal amplitude of the detected first portion. In an example of step 615, channel electronics 432 generates channel signal 431S(1) from photocurrent signal 433C, where the amplitude of channel signal 431S(1) is an example of the first signal amplitude.

In step 620, method 600 detects a second portion of the optical signal transmitted through a slow-varying optical mask having a strictly monotonic transmissivity $T_2(x)$, in an x-range of a spatial dimension x. In an example of step 620, a second portion of optical signal 312 is incident on lens 335(2), which directs the second portion toward optical mask 334(2).

In step 625, method 600 determines a second signal amplitude of the detected second portion transmitted through the slow-varying optical mask. In an example of step 625, channel electronics 432 generates channel signal 431S(2) from photocurrent signal 433C, where the amplitude of channel signal 431S(2) is an example of the second signal amplitude.

In step 630, method 600 detects a third portion of the optical signal transmitted through a fast-varying optical mask having a spatially-varying transmissivity $T_3(x)$ having a same value at more than one value of x in the x-range. In an example of step 630, a third portion of optical signal 312 is incident on lens 335(3), which directs the third portion toward optical mask 334(3).

In step 635, method 600 determines a third signal amplitude of the detected third portion transmitted through the fast-varying optical mask. In an example of step 635, channel electronics 432 generates channel signal 431S(3) from photocurrent signal 433C, where the amplitude of channel signal 431S(3) is an example of the third signal amplitude.

In step 640, method 600 determines a coarse-estimate location $x_2$ in the x-range and corresponding to a location on the slow-varying optical mask having transmissivity equal to the second signal amplitude divided by the first signal amplitude. In an example of step 640, spot-location estimator 252 determines location $x_2$(plot 520, FIG. 5) on optical mask 334(2) (FIG. 3) using mask properties 334P.

In step 650, method 600 determines a plurality of candidate locations $\{x_{3,1}, x_{3,2}, x_{3,3}, \ldots, x_{3,n}\}$ in the x-range and corresponding to locations on the fast-varying optical mask having transmissivity equal to the third signal amplitude divided by the first signal amplitude. In an example of step 650, spot-location estimator 252 determines candidate locations 532 (plot 530, FIG. 5) on optical mask 334(3) (FIG. 3).

In step 660, method 600 determines a refined-estimate location, of the plurality of candidate locations, closest to the coarse-estimate location $x_2$. In an example of step 660, spot-location estimator 252 determines, from normalized locations 532, normalized location 532(11) as the closest to coarse-estimate location $x_2$ (plot 520, FIG. 5).

In step 670, method 600 determines, based on the refined-estimate location, an angle of the object with respect to a plane perpendicular to the spatial dimension x and intersecting the masks. In an example of step 670, position-to-angle-converter 254 determines a measured location angle 213M, which is a measurement of location angle 313 of object 391 with respect to plane 397, which is perpendicular to the x-y plane.

Figure 7:
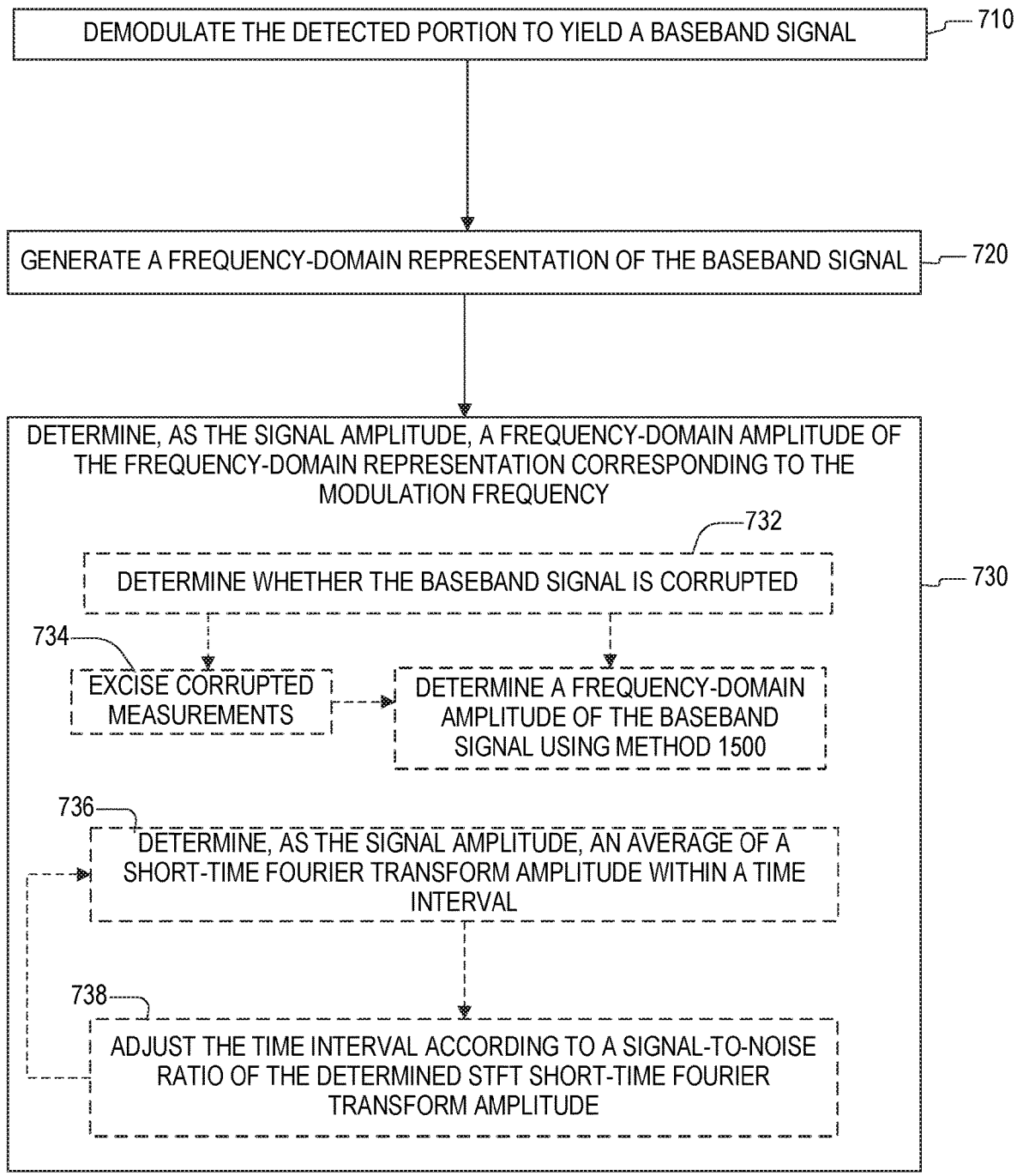
FIG. 7 is a flowchart illustrating optional steps of the method of FIG. 6, in an embodiment.
Figure 33:
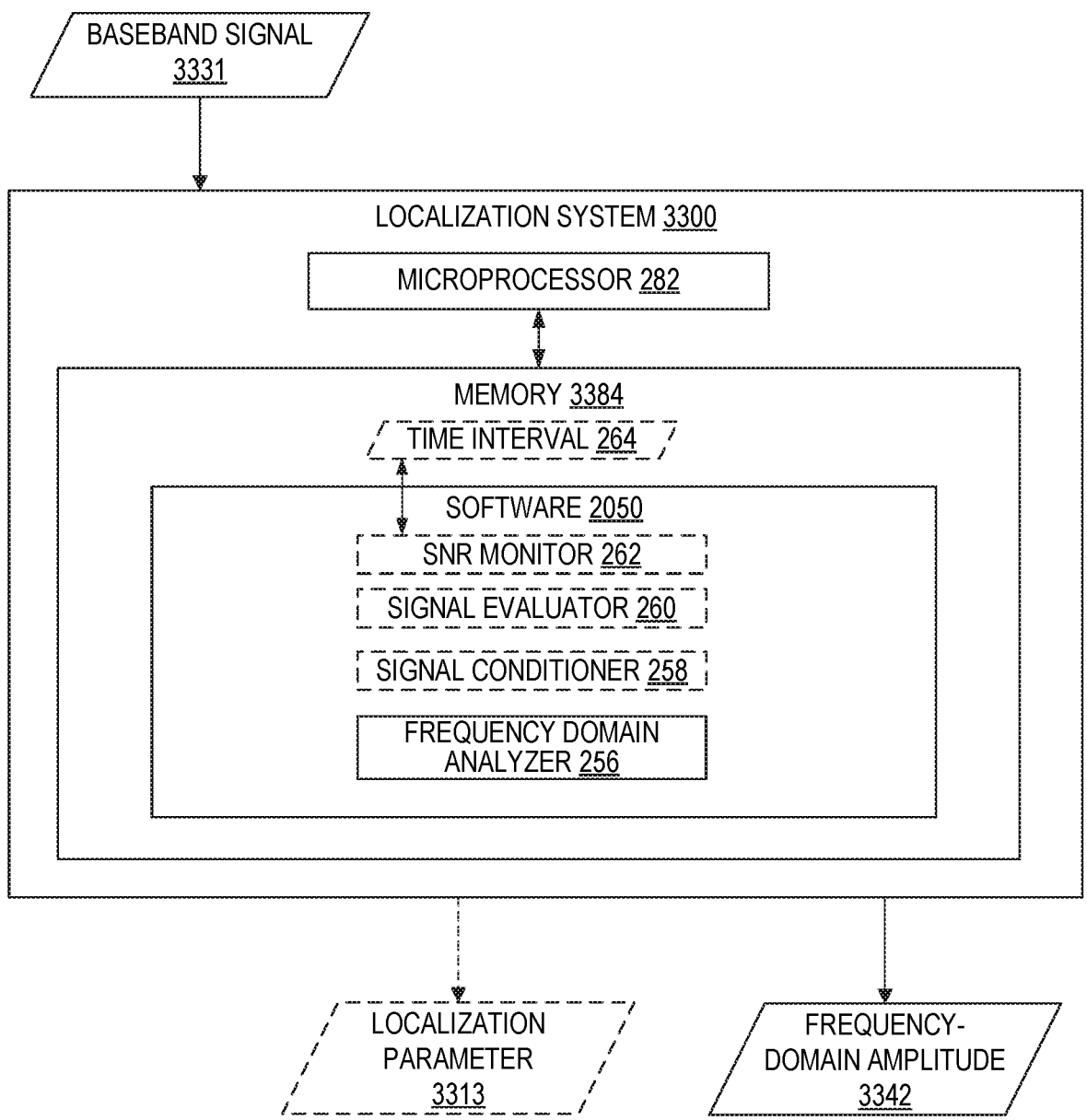
FIG. 33 illustrates one exemplary localization system, in an embodiment.
Figure 34:
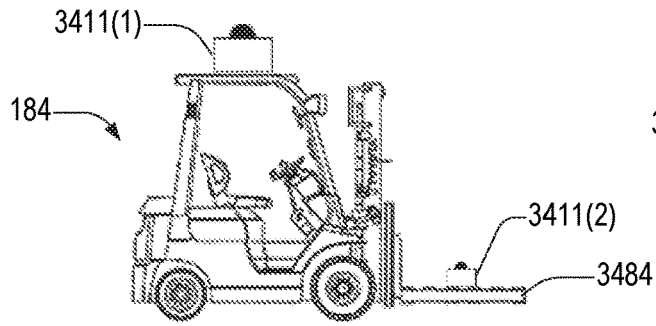
FIGS. 34-38 describe examples of exemplary uses of the localization system of FIG. 2 and the method of FIG. 6.
Figure 35:
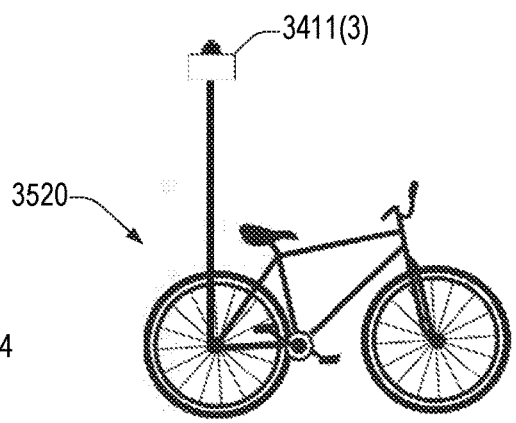

The optical signal introduced in step 610 may be a modulated optical signal with a modulation frequency and a corresponding frequency-domain amplitude. In such an instance, method steps 615, 625, and 635 may implement steps 710, 720, and 730, shown in FIG. 7. Steps 710, 720, and 730 are for example implemented by localization system 200 executing computer-readable instructions of software 250, or by a localization system 3300 executing computer-readable instructions of software 2050, as shown in FIG. 33. Herein, indices $m_1$, $m_2$, and $m_3$ each denote a different one of channels 231(1–M), that is: $m_{1,2,3} \in [1, 2, \ldots, M]$. Index $n_1$ denotes an one of emitters 211(1–N), that is: $n_1 \in [1, 2, \ldots, N]$.

In step 710, method 600 demodulates the detected portion to yield a baseband signal. In a first example of step 710, channel 231($m_1$) detects optical signal 212($n_1$) from emitters 211(1–N). Optical signal 212($n_1$) is modulated at modulation frequency 212F($n_1$), FIG. 2. Channel electronics 232 ($m_1$) demodulates optical signal 212($n_1$) to yield channel signal 231S($m_1$) having a measured modulation frequency amplitude 242($n_1$, $m_1$) corresponding to modulation frequency 212F($n_1$). In a second example of step 710, channel 231($m_2$) detects signal 212 from emitters 211(1–N). Channel electronics 232($m_2$) demodulates optical signal 212($n_1$) to yield channel signal 231S($m_2$) having a measured modulation frequency amplitude 242($n_1$, $m_2$) corresponding to modulation frequency 212F($n_1$). In a third example of step 710, channel 231($m_3$) detects signal 212($n_1$) from emitters 211(1–N). Channel electronics 232 ($m_3$) demodulates optical signal 212($n_1$) to yield channel signal 231S($m_3$) having a measured modulation frequency amplitude 242($n_1$, $m_3$) corresponding to modulation frequency 212F($n_1$)

In step 720, method 600 generates a frequency-domain representation of the baseband signal. In an example of step 720, frequency domain analyzer 256 generates a first, second, and third frequency-domain representation of respective channel signals 231S($m_1$), 231S($m_2$), and 231S($m_3$).

Step 730 is an optional part of method 600, which localization system 200 may implement to find an angular position of an object emitting a modulated optical signal. The angular position is accurate so long as the baseband signal of step 710 is not corrupted, e.g., by occlusion 188.

In step 730, method 600 determines, as the signal amplitude, a frequency-domain amplitude of the frequency-domain representation corresponding to the modulation frequency. In an example of step 730, frequency domain analyzer 256 determines, as respective first, second, and third signal amplitudes, measured modulation frequency amplitudes 242($n_1$, $m_1$), 242($n_1$, $m_2$), and 242($n_1$, $m_3$).

Figure 8:
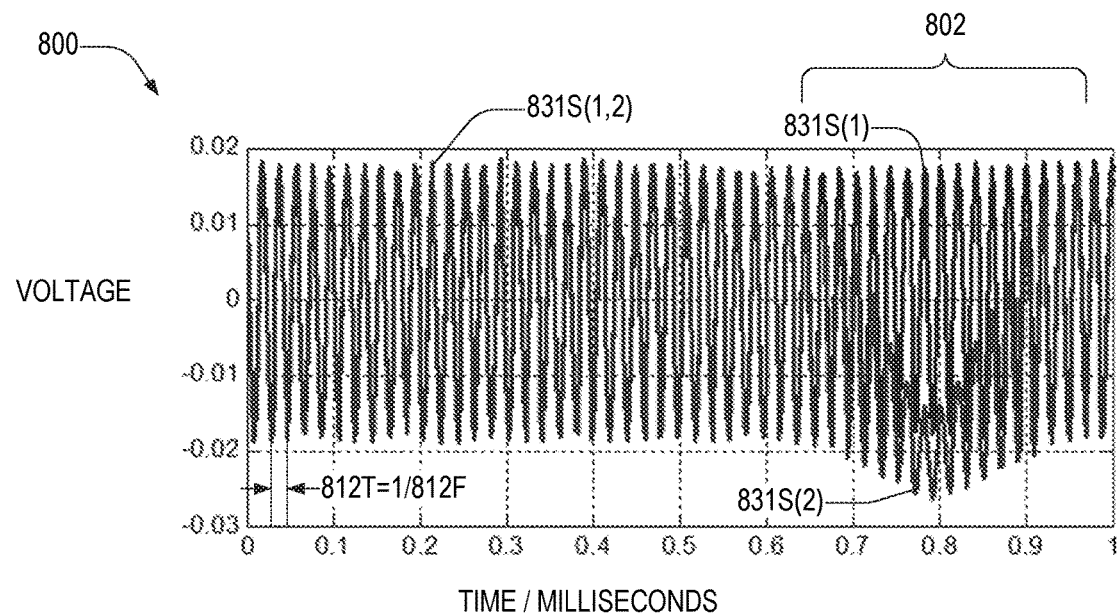
FIG. 8 shows exemplary baseband signals from channels of the localization system of FIG. 2.
Figure 9:
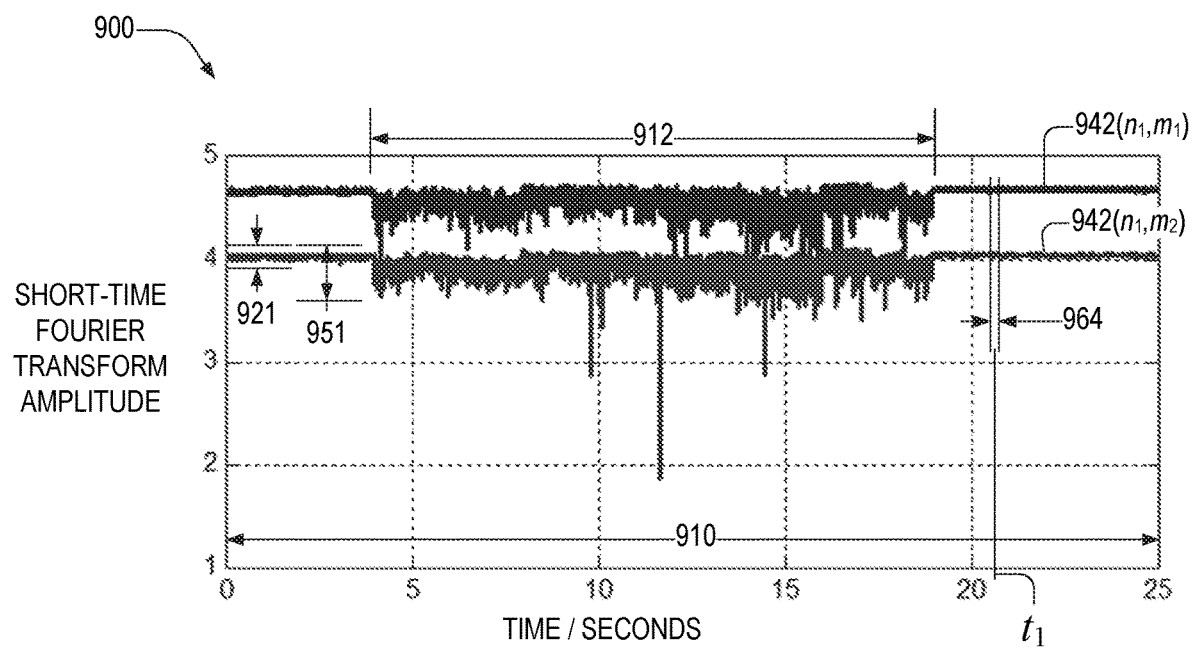
FIG. 9 shows a time series of short-time Fourier transform (STFT) amplitudes of the baseband signal of FIG. 8.

Step 730 may include step 732, in which method 600 determines whether the baseband signal is corrupted. Step 730 may also include step 734, in which method 600 excises corrupted measurements. FIGS. 8-10 show exemplary corrupted signals and signals processed therefrom, which illustrate examples of step 732 and 734.

FIG. 8 is a time-series plot 800 of measured voltage corresponding to channel signals 831S(1) and 831S(2), the latter of which is an example of a corrupt baseband signal. Channel signals 831S are both examples of a channel signal 231S produced by channel electronics 232 of localization system 200. Channel signals 831S have a same modulation period 812T and corresponding modulation frequency 812F, which is an example of modulation frequency 212F.

Channel signals 831S(1) and 831S(2) are generated by channels 231(1) and 232(2), respectively, of localization system 200 in response to a modulated optical signal 212. Modulated optical signal 212 is, for example, modulated optical signal 112(2) generated by emitter 111(2), FIG. 1. For sake of clarity, plot 800 displays channel signals 831S as normalized with DC-bias removed. Hence, plot 800 does not illustrate any difference in signal amplitudes of channel signals 831S(1,2) caused by their respective optical masks 234(1,2) of channels 231(1,2) of FIG. 1.

Plot 800 designates time period 802, during which occlusion 188 of FIG. 1 is between emitter 111(2) and receiver 130(2), and channel signal 831S(2) deviates from channel signal 831S(1). Deviation of channel signal 831S(2) from channel signal 831S(1) during time period 802 is an example of detection of corrupted signal 112C, FIG. 1.

In a first example of step 732, signal evaluator 260 determines that channel signal 831S(2) is corrupt by detecting a feature thereof that deviates from a predetermined value. For example, during time period 802, both the time-averaged value (e.g., over several periods) and amplitude of channel signal 831S(2) differ from the respective time-average values and amplitudes in preceding times.

In this example, occlusion 188 is airborne particulate such as dust or dirt. Although corrupted signal 831S(2) of plot 800 results from actual dust/dirt, a corrupted signal similar to corrupted signal 831S(2) may also occur in clear-air systems when there are other type of electrical or weather events, extreme motion between the transmitter and coded receivers, unwanted short-time reflection or jammers as well as failure of a transmitter. Noisy electrical environments such as vehicles or high transmission power areas may also induce similar changes in clear air. High-voltage transients occur frequently in relay-switched systems such as diesel or gasoline and electrical powered vehicles, aircraft, boats, and numerous industrial switching systems. Typical fluorescent lighting generates both optical and electrical interference and is common indoors. Incandescent lighting generates the usual 50 Hz and 60 Hz noise. All of these noise sources can potentially corrupt localization system 200 and are mitigated using various processing approaches.

FIG. 9 illustrates a time-series plot 900, which is a frequency-domain analog of plot 800 showing the effects of airborne dust and dirt on measured modulation frequency amplitudes. Time-series plot 900 includes measured STFT amplitudes 942($n_1$, $m_1$) and 942($n_1$, $m_2$) corresponding to detection of optical signal 212($n_1$) emitted by emitter 211 ($n_1$) as detected by respective channels 231($m_1$) and 231($m_2$) of localization system 200. STFT amplitudes 942 are examples of measured signal amplitudes 242. Plot 900 includes a time interval 964 that includes a time $t_1$ over which STFT amplitudes 942 may be averaged to determine a frequency-domain amplitude at time $t_1$. Time interval 964 is an example of time interval 264.

In this example, optical signal 212($n_1$) has a modulation frequency 212F($n_1$). Channels 231($m_1$) and 231($m_2$) generate respective channel signals 231S($m_1$) and 231S($m_2$). STFT amplitudes 942($n_1$, $m_1$) and 942($n_1$, $m_2$) are STFT amplitudes of channel signals 231S($m_1$) and 231S($m_2$), respectively, corresponding to modulation frequency 212F ($n_1$) during a time window 910. The STFT has a dwell time (window width) of one millisecond, during which channel signals 231S($m_{1,2}$) were sampled two-hundred fifty times, which corresponds to a 250-kHz sample rate. Sample rates may be greater than or less than 250 kHz, up to 1.0 MHz for example, without departing from the scope hereof.

Time window 910 includes a sub-interval 912 during which airborne particulates (e.g., dust and/or dirt) between emitter 211($n_1$) and each channel 231($m_1$) and 231($m_2$) results in STFT amplitudes 942($n_1$, $m_1$) and 942($n_1$, $m_2$) being noisy relative to amplitudes thereof at times outside of sub-interval 912. The airborne particulates are examples of occlusion 188. As shown in plot 900, airborne particulates may either reduce or amplify STFT amplitudes 942. Applicant postulates that such amplification is likely caused by a "lensing" or mirror effect of particulates in the presence of direct sun. Similar lensing and mirror effects are seen with rain drops between one emitter 211 and one channel 231.

In optional step 732, method 600 determines whether the baseband signal is corrupted. A second example of step 732 involves exemplary STFT amplitude 942($n_1$,$m_1$) of emitter 211($n_1$). In this example, signal evaluator 260 determines that the component of channel signal 231S($m_1$) corresponding to emitter 211($n_1$) is corrupt because, during sub-interval 912, its STFT amplitude 942($n_1$,$m_1$) has a fluctuation 951 that exceeds a predetermined range 921. Predetermined range 921 is, for example, greater than the fluctuation of STFT amplitudes 942 outside of sub-interval 912.

Occlusion 188 distorts values of measured STFT amplitudes 942, which results in inaccurate localization of emitter 211($n_1$). STFT amplitudes 942 are examples of frequency-domain amplitudes determined in step 730, optionally used in embodiments of method 600 to determine the first, second, and third signal amplitudes. Method 600 uses the first, second, and third signal amplitudes to determine an object's angular orientation, such location angle 313 of object 391 with respect to plane 397, FIG. 3. As such, accurate determination of STFT amplitudes 942 in the presence of occlusion 188 is essential for localization system 200 to accurately locate emitters 211 emitting modulated signals 212.

Figure 10A:
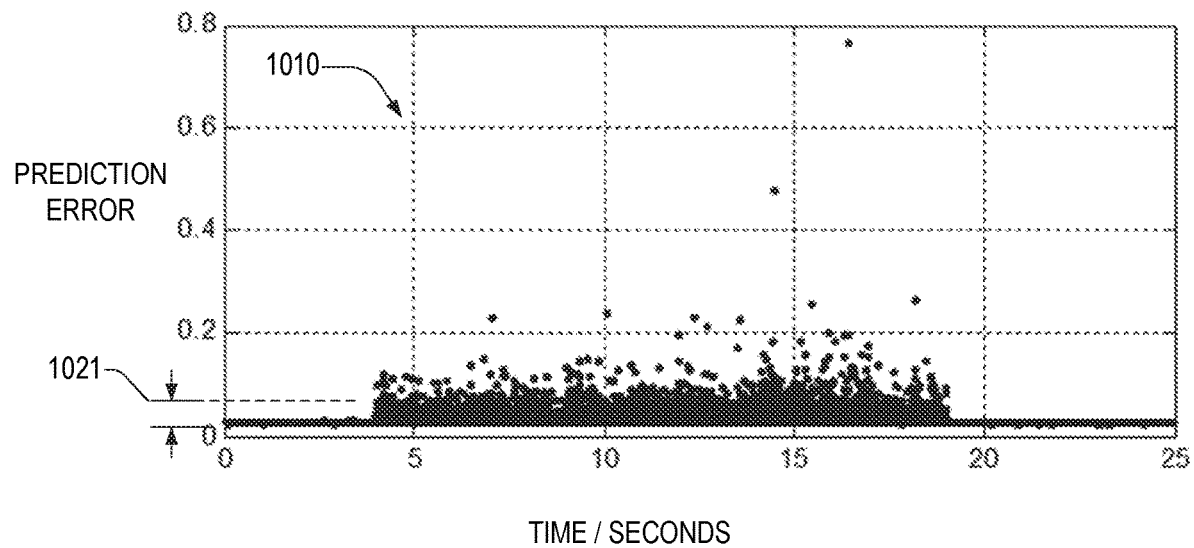
FIGS. 10A and 10B are plots of prediction errors corresponding to STFT amplitudes of FIG. 9.
Figure 10B:
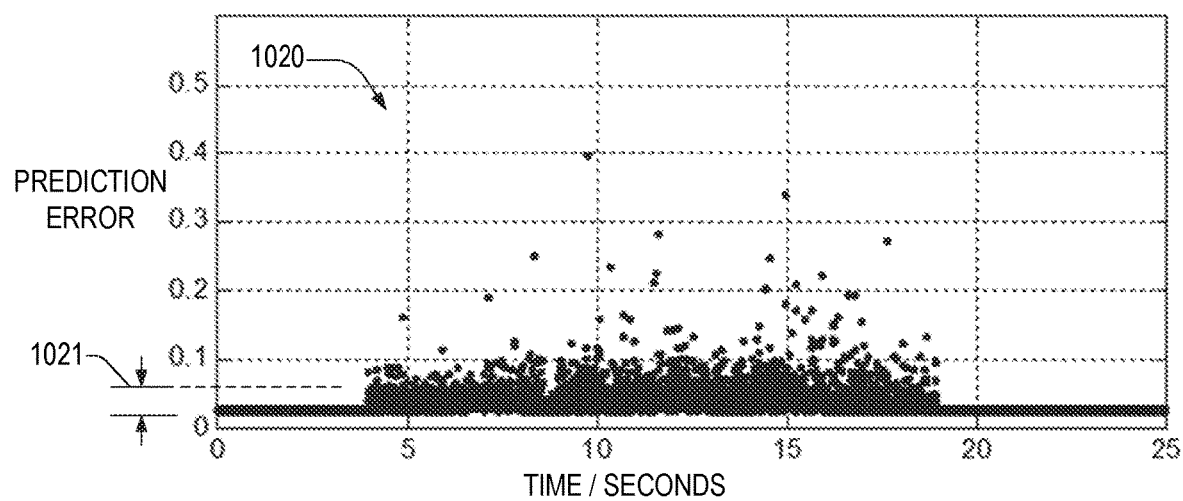

A third example of step 732 involves prediction errors 1010 and 1020 shown in FIGS. 10A and 10B and generated by signal evaluator 260. Prediction errors 1010 and 1020 correspond to STFT amplitudes 942($n_1$, $m_1$) and 942($n_1$, $m_2$), respectively. Prediction errors 1010 and 1020 result from convolving respective STFT amplitudes 942($n_1$, $m_1$) and 942($n_1$, $m_2$) with respective linear prediction coefficients. Recall that STFT amplitudes 942($n_1$, $m_1$) and 942($n_1$, $m_2$) are STFT amplitudes of channel signals 231S($m_1$) and 231S($m_2$), respectively (FIG. 2), corresponding to modulation frequency 212F($n_1$). Outlying values of prediction errors 1010 and 1020 are roughly correlated with spikes in respective STFT amplitudes 942($n_1$, $m_1$) and 942($n_1$, $m_2$).

Prediction errors 1010 and 1020 correspond to different receive channels and are essentially uncorrelated. Correlation of prediction errors 1010 and 1020 depends on the source of the error. If the error is induced by a transmission-side phenomenon or a system-wide issue that impacts all channels 231, for example a cloud suddenly blocking the sun, then all the channels 231 should see a similar error and the prediction errors become correlated. Events occurring closer to the receiver 230 such as dirt or rain drops that only fall in front of one aperture millimeters away from the sensor cover glass may only affect one channel 231 and result in uncorrelated prediction errors.

In this example of step 732, signal evaluator 260 determines that channel signals 231S($m_1$) and 231S($m_2$) are corrupt because their respective prediction errors exceed a threshold 1021, which equals 0.05 in this example as illustrated in both FIGS. 10A and 10B. In an embodiment of localization system 200, signal evaluator 260 calculates the linear prediction coefficients in real-time and determines channel signals 231S($m_1$) and 231S($m_2$) to be corrupt when respective prediction errors exceed threshold 1021, FIGS. 10A and 10B. Signal evaluator 260, for example, executes a forward linear predictor using a root-mean-square criterion or other predictors known in the art.

In optional step 734 of step 730, method 600 excises corrupted measurements In an example of step 734, signal conditioner 258 excises STFT amplitudes 942 (FIG. 9) that correspond to prediction errors 1010 and 1020 exceeding threshold 1021 (FIG. 10).

Figure 11A:
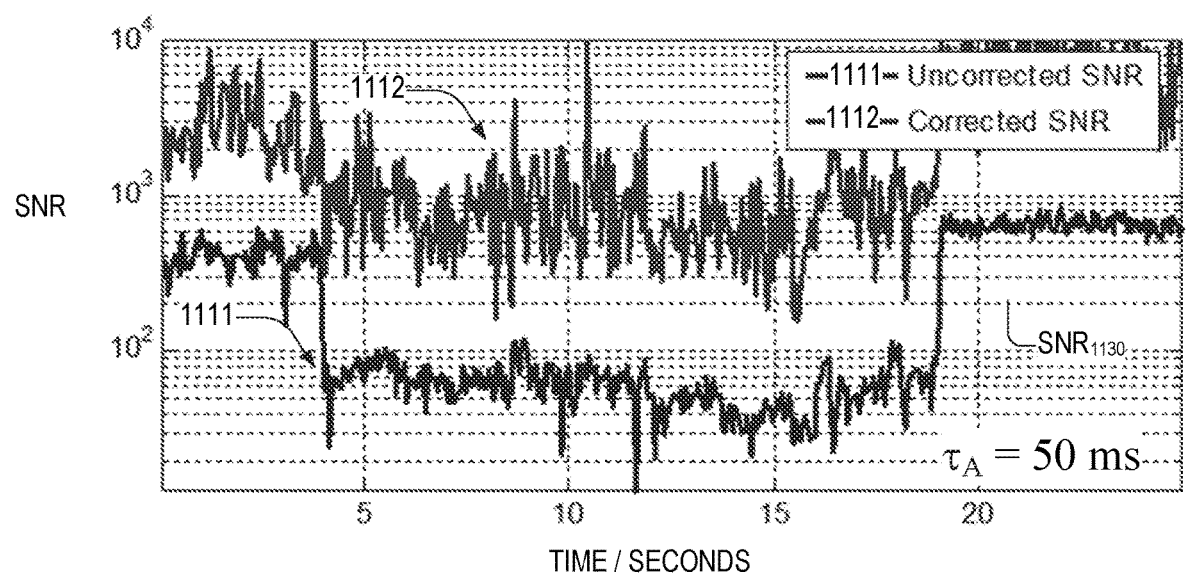
FIGS. 11A and 11B are signal-to-noise ratio (SNR) time series of the prediction error of FIG. 10A.
Figure 11B:
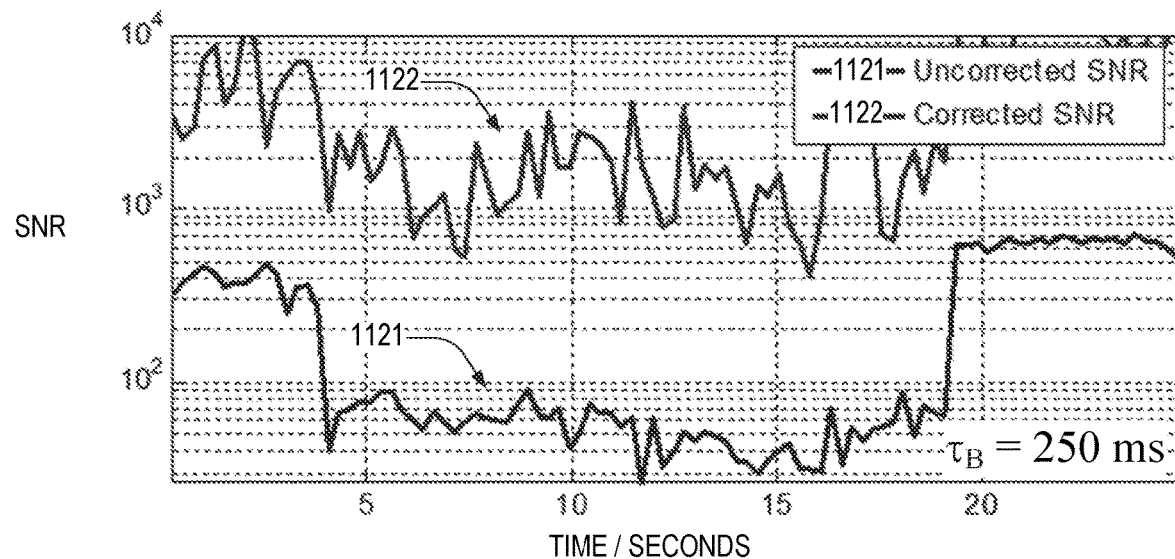

FIGS. 11A and 11B are plots illustrating the improvement of signal-to-noise ratios (SNRs) of STFT amplitudes 942($n_1$, $m_1$) resulting from excision of corrupted data revealed by prediction error 1010 of FIG. 10A. FIG. 11A shows uncorrected SNR time series 1111 and corrected SNR time series 1112 each computed over non-overlapping fifty-millisecond time intervals ($\tau_A$=50 ms) of STFT amplitudes 942($n_1$, $m_1$). FIG. 11B shows uncorrected SNR time series 1121 and corrected SNR time series 1122 each computed over non-overlapping 250-millisecond time intervals ($\tau_B$=250 ms) of STFT amplitudes 942($n_1$, $m_1$). Time intervals $\tau_A$ and $\tau_B$ are each examples of time interval 964 shown in FIG. 9. SNR monitor 262 may generate time series 1111, 1112, 1121, and 1122.

Time intervals $\tau_A$ and $\tau_B$ correspond to respective update rates $R_A=1/\tau_A$ and $R_B=1/\tau_B$. Hence, the time series of FIG. 11B each have a lower update rate compared to those of FIG. 11A.

Uncorrected SNR time series 1111 and 1121 were computed using all values of STFT amplitudes 942($n_1$, $m_1$). Corrected SNR time series 1112 and 1122 were computed using only STFT amplitudes 942($n_1$, $m_1$) with prediction errors not exceeding threshold 1021. As shown in FIG. 11A, uncorrected SNR time series 1111 ranges from about zero to a maximum of about one hundred. Corrected SNR time series 1112 ranges from a minimum of about 140 to a maximum exceeding one thousand. Absent weather events, i.e. clear air, the uncorrected and corrected SNR time series 1111 and 1112 would be approximately constant. Correction of the data yields a significant increase in SNR, for example, an increased minimum SNR. The minimum SNR may be used as criterion for performance of localization system 200. For example, FIG. 11A denotes a minimum SNR 1130 as $SNR_{1130}$, which equals two hundred, for example.

In FIG. 11B, uncorrected SNR time series 1121 ranges from about zero to a maximum of about one hundred. An occlusion event is clearly seen between four seconds and nineteen seconds, where uncorrected SNR time series 1121 decreases by nearly an order of magnitude. Corrected SNR time series 1122 ranges from a minimum of about four hundred to a maximum exceeding five thousand. Increasing the time interval 264 increases the minimum SNR of the corrected data by approximately the square root of the time-increase factor. The time-increase factor for SNR time series 1112 and 1122 is five, such that the ratio of respective minima of SNR time series 1112 to SNR time series 1111 should be approximately $\sqrt{5}\approx2.2$. The minimum of corrected SNR time series 1122 ($\approx400$) is approximately 2.9 times that of the minimum of corrected SNR time series 1112 ($\approx140$).

Step 730 may include steps 736 and 738. In step 736, method 600 determines, as the signal amplitude, an average of a short-time Fourier transform amplitude within a time interval. In an example of step 736, frequency domain analyzer 256 determines an average of STFT amplitudes 942($n_1$, $m_1$) within time interval 964.

In optional step 738, method 600 adjusts the time interval according to a signal-to-noise ratio of the determined STFT short-time Fourier transform amplitude. In an example of step 738, the time interval of step 736 is $\tau_A$ of FIG. 11A. In this example of step 738, SNR monitor 262 increases time interval 264 from $\tau_A$ to $\tau_B$ because the minimum of SNR time series 1112 is below a predetermined threshold, such as SNR 1130.

Method 600 may repeat step 736 after step 738 to yield a signal amplitude with an increased signal to noise ratio. The increased time interval results in the signal amplitude, that is, average of STFT amplitudes 942($n_1$, $m_1$) within time interval 964, having a higher SNR, as shown by comparing SNR time series 1122 to SNR time series 1112. Increasing time interval 964, an example of time interval 264, maintains accuracy of measured locations angles 213M generated by localization system 200, while decreasing the update rate thereof.

Figure 12:
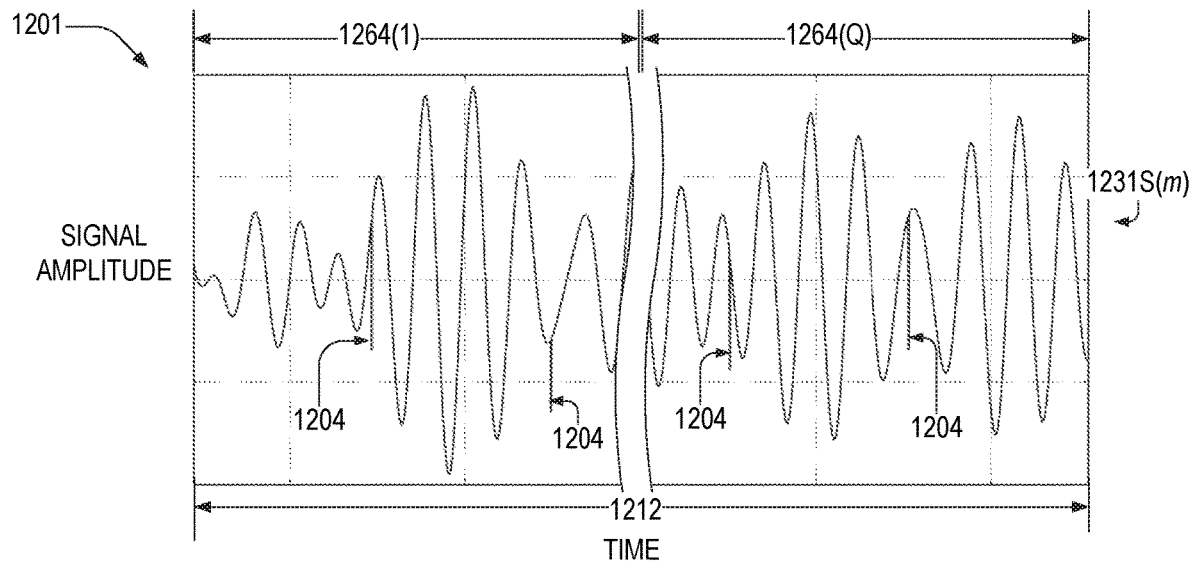
FIG. 12 is a plot of a corrupted baseband signal generated by a channel of an embodiment of localization system of FIG. 2.

FIG. 12 is a plot 1201 of a corrupted baseband signal 1231S(m) generated by channel 231(m) in response to emitters 211 emitting respective modulated optical signals 212 with associated modulation frequencies 212F. Signal 1231S(m) is similar to channel signal 831S(2) by virtue of their both including noise. Corruption of baseband signal 1231S is similar to the corruption of channel signal 831S(2) in FIG. 8. Modulation frequencies 212F include a modulation frequency 212F($n_1$) corresponding to emitter 211($n_1$). Corrupted baseband signal 1231S(n) spans a time duration 1212 and is an example of a channel signal 231S, such as channel signal 831S(2) that is also corrupted by noise. Baseband signal 1231S includes noise components 1204 that each contribute frequency domain amplitudes to a frequency-domain representation of corrupted baseband signal 1231S. Corrupted baseband signal 1231S has a measured frequency-domain corresponding to modulation frequency 212F($n_1$). The time variation of this frequency-domain amplitude is similar to those of STFT amplitudes 942 during sub-interval 912, FIG. 9.

Figure 13:
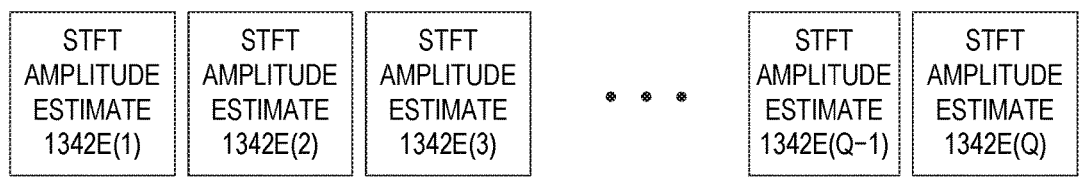
FIG. 13 illustrates a plurality of STFT amplitude estimates corresponding to a respective plurality of segments of the corrupted baseband signal of FIG. 12.

Time duration 1212 includes a plurality of intervals 1264(1, 2, ... Q), which may be overlapping. Intervals 1264 are examples of time interval 264 of localization system 200, shown in FIG. 2. The time duration of each interval 1264 exceeds a maximum modulation period $T_{1231S}$ of baseband signal 1231S corresponding to the inverse of the smallest of modulation frequencies 212F. For example, each interval 1264 has a duration $250 \cdot T_{1231S}$. FIG. 13 illustrates a plurality of STFT amplitude estimates 1342E(1, 2, ..., Q), which correspond to a respective interval 1264(1, 2, ..., Q). STFT amplitude estimates 1342E corresponds to modulation frequency 212F($n_1$). STFT amplitude estimates 1342E have a minimum value $A_1$ and a maximum value $A_{20}$, which are illustrated in FIG. 14.

Figure 14:
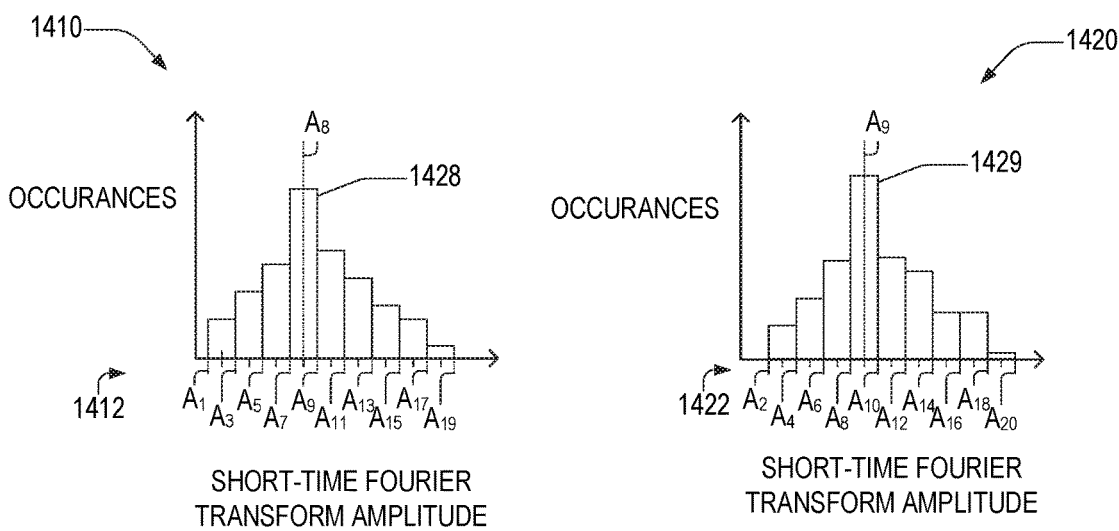
FIG. 14 depicts schematic histograms illustrating occurrences of STFT amplitude estimates of FIG. 13.

FIG. 14 depicts histograms 1410 and 1420 illustrating occurrences of STFT amplitude estimates 1342E. The total number of occurrences in each histogram is Q. Histograms 1410 and 1420 have horizontal axes that span STFT amplitudes $A_1$-$A_{20}$. Histogram 1410 has bins 1412 that each span adjacent odd-indexed STFT amplitudes. Histogram 1420 has bins 1422 that each span adjacent even-indexed STFT amplitudes. Bins 1422 and 1412 are shifted with respect to one another by one-half a bin width. Within bins 1412 of histogram 1410, the bin with the highest number of occurrences is centered on STFT amplitude $A_8$, as indicated by count 1428. Within bins 1412 and 1422 of histograms 1410 and 1420, the bin with the highest number of occurrences is centered on STFT amplitude $A_9$, as indicated by count 1429. Hence, STFT amplitude $A_9$ may be considered a most likely amplitude of modulation frequency 212F($n_1$). STFT amplitude $A_9$ is an example of either a first, second, or third signal amplitude determined by step 615, step 625, or step 635 respectively, of method 600 FIG. 6.

Figure 15:
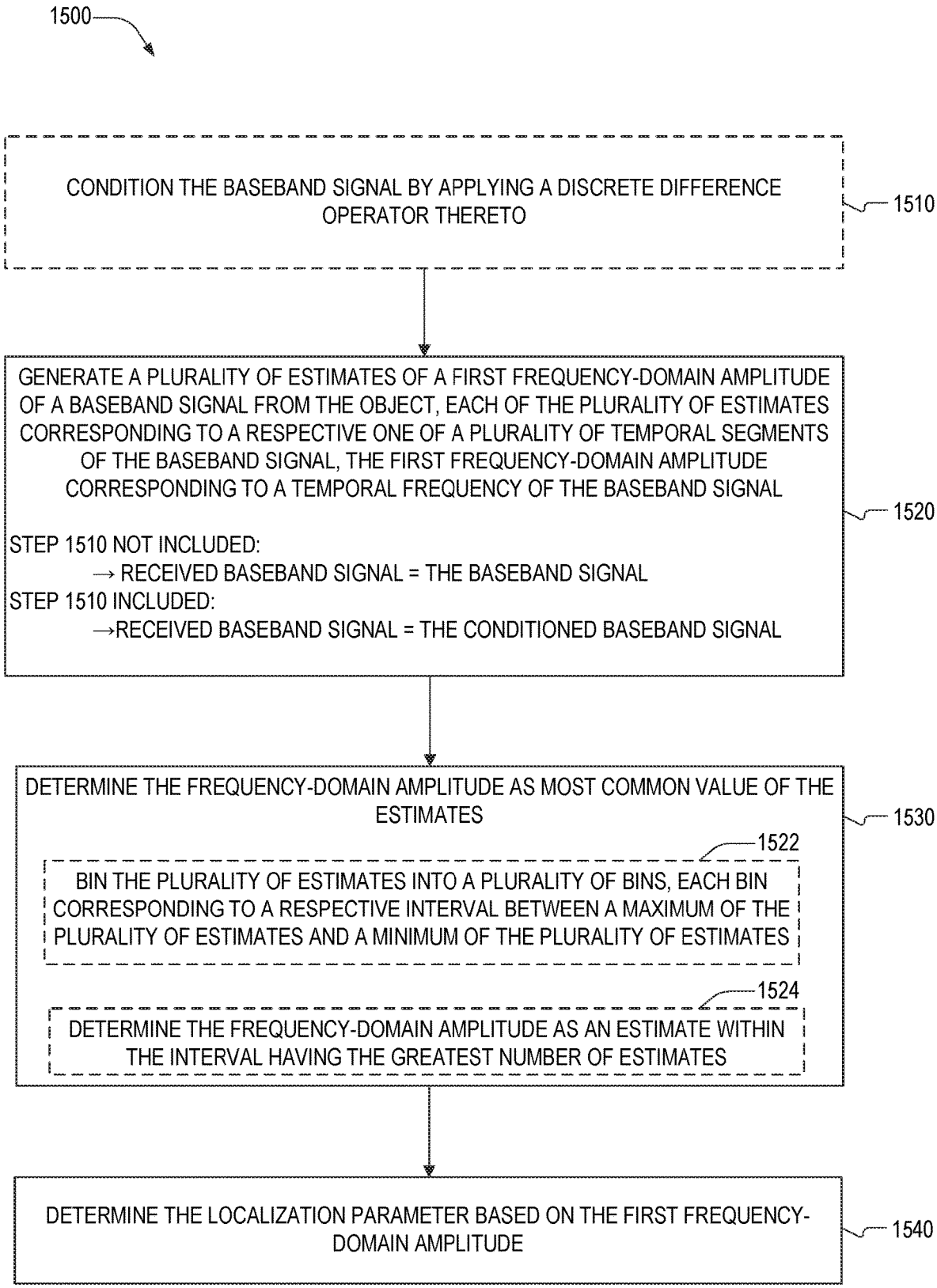
FIG. 15 is a flowchart illustrating a method for determining a frequency-domain amplitude of a baseband signal, in an embodiment.

FIG. 15 is a flowchart illustrating a method 1500 for determining a localization parameter of an object. Method 1500 is, for example, implemented by localization system 200 executing computer-readable instructions of software 250, or by localization system 3300 executing computer-readable instructions of software 2050, as shown in FIG. 33. Step 730 (FIG. 7) may employ method 1500 to determine the signal amplitude. FIGS. 12-15 are best viewed together in the following description.

Method 1500 includes step 1520, step 1530, step 1540, and an optional step 1510. In step 1510, method 1500 conditions the baseband signal by applying a discrete difference operator thereto. Step 1510 yields a conditioned baseband signal. In an example of step 1510, signal conditioner 258 applies a discrete difference operator to baseband signal 1231S, which results in a conditioned baseband signal. Examples of a discrete difference operator are the "numpy.diff" function, of the SciPy open-source library for the Python programming language, and the "diff" function in MATLAB®.

In step 1520, method 1500 generates a plurality of estimates of a first frequency-domain amplitude of a baseband signal from the object. Each of the plurality of estimates corresponds to a respective one of a plurality of temporal segments of the baseband signal. The first frequency-domain amplitude corresponds to a temporal frequency of the baseband signal. When method 1500 does not include step 1510, the received baseband signal is the baseband signal. When method 1500 includes step 1510, a baseband signal is the conditioned baseband signal. In a first example of step 1520, frequency domain analyzer 256 generates STFT amplitude estimates 1342E(1, 2, ..., Q) from respective intervals 1264(1, 2, ..., Q) of baseband signal 1231S. In a second example of step 1522, frequency domain analyzer 256 generates STFT amplitude estimates 1342E(1, 2, ..., Q) from respective intervals 1264(1, 2, ..., Q) of baseband signal 1231S conditioned by signal conditioner 258.

In step 1530, method 1500 determines the frequency-domain amplitude as most common value of the estimates. In an example of step 1530, frequency domain analyzer 256 determines frequency-domain amplitude $A_9$ as the most common value of STFT amplitude estimates 1342E.

Step 1530 may include steps 1522 and 1524. In step 1522, method 1500 bins the plurality of estimates into a plurality of bins, each bin corresponding to a respective interval between a maximum of the plurality of estimates and a minimum of the plurality of estimates. In step 1524, method 1500 determines the frequency-domain amplitude as an estimate within the bin corresponding to the interval having the greatest number of estimates.

In a first example of steps 1522 and 1524, frequency domain analyzer 256 generates histogram 1410 and determines frequency-domain amplitude $A_8$ as the most common value of STFT amplitude estimates 1342E. In a second example of steps 1522 and 1524, frequency domain analyzer 256 generates histograms 1410 and 1420 determines frequency-domain amplitude $A_9$ as the most common value of STFT amplitude estimates 1342E.

In step 1540, method 1500 determines the localization parameter based on the first frequency-domain amplitude. In an example of step 1540, position-to-angle-converter 254 of localization system 200 determines a measured location angle 213M.

Figure 16A:
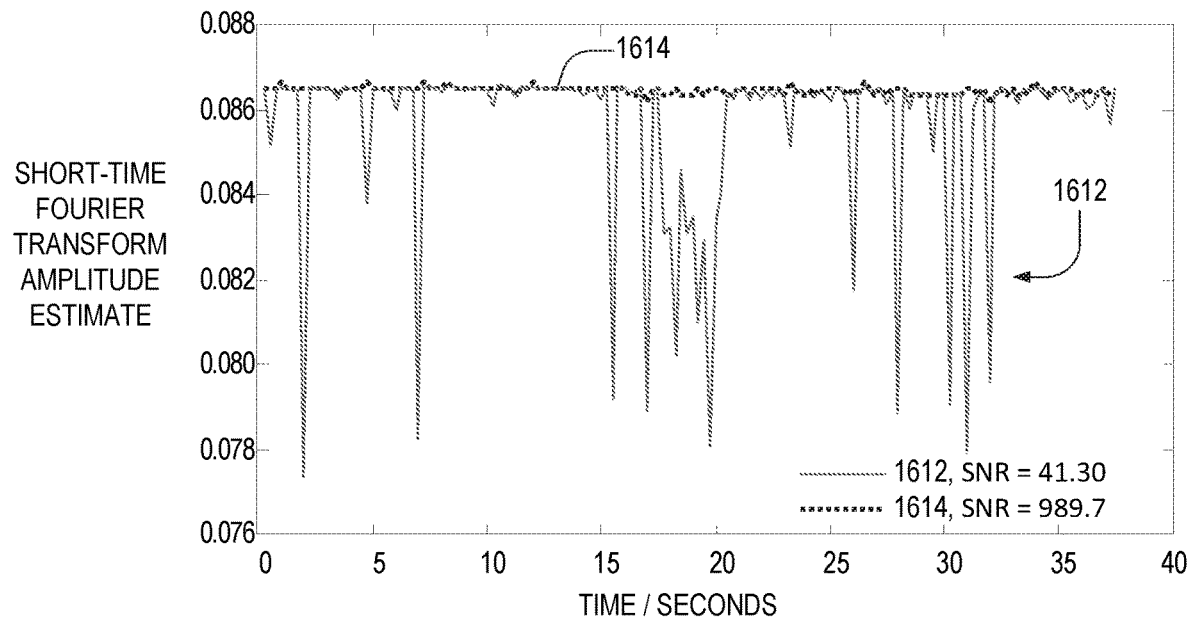
FIGS. 16A and 16B are plots comparing raw STFT amplitude estimates and refined STFT amplitude estimates resulting from the method of FIG. 15.

FIG. 16A is a plot comparing raw STFT amplitude estimates 1612 (solid lines) and refined STFT amplitude estimates 1614 (dotted line). Raw STFT amplitude estimates 1612 are examples of STFT amplitude estimates 1342E and have a signal-to-noise ratio of 41.3. Refined STFT amplitude estimates 1614 are examples of frequency-domain amplitude $A_9$ (FIG. 12) as generated by system 200 implementing method 1500 without step 1510. STFT amplitude estimates 1614 have a signal-to-noise ratio of 989.7.

Figure 16B:
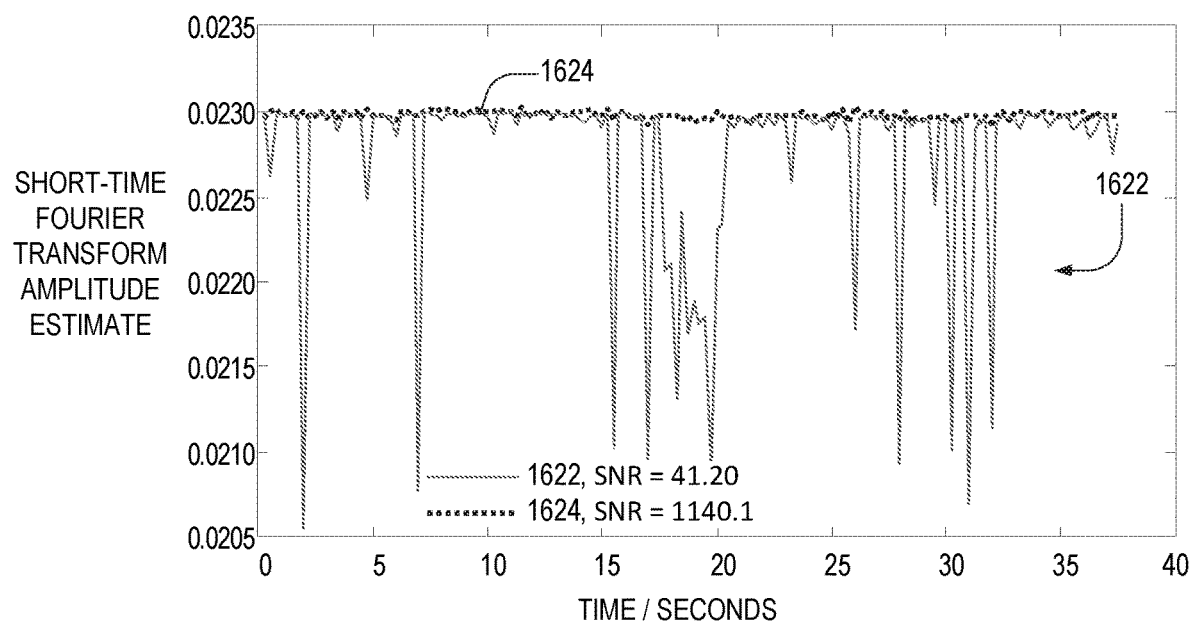

FIG. 16B is a plot comparing raw STFT amplitude estimates 1622 (solid lines) and refined STFT amplitude estimates 1624 (dotted line). Raw STFT amplitude estimates 1622 are examples of STFT amplitude estimates 1342E and have a signal-to-noise ratio of 41.2. Refined STFT amplitude estimates 1624 are examples of frequency-domain amplitude $A_9$ (FIG. 12) as generated by system 200 implementing method 1500 with step 1510. STFT amplitude estimates 1624 have a signal-to-noise ratio of 1140.1, which is fifteen percent higher than the signal-to-noise ratio of STFT amplitude estimates 1614.

Figure 17:
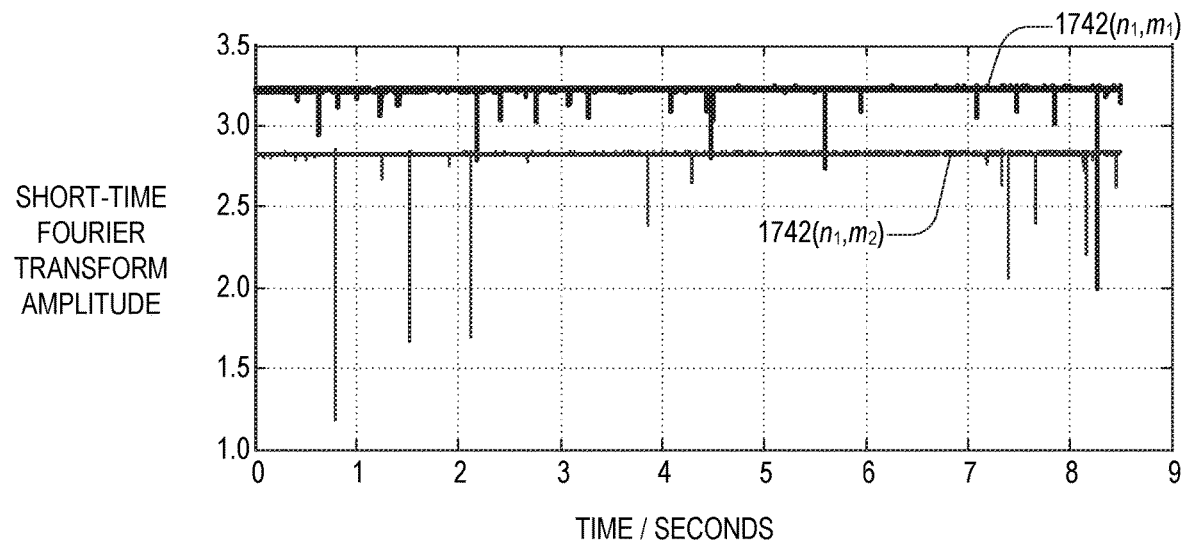
FIG. 17 is a time-series plot of measured STFT amplitudes generated by an embodiment of localization system of FIG. 2.

FIG. 17 is a time-series plot of measured STFT amplitudes $1742(n_1, m_1)$ and $1742(n_1, m_2)$ corresponding to detection of optical signal $212(n_1)$ emitted by emitter $211(n_1)$ as detected by respective channels $231(m_1)$ and $231(m_2)$ of localization system 200. STFT amplitudes 1742 are examples of measured signal amplitudes 242 and are similar to STFT amplitudes 942 of FIG. 9.

Figure 18:
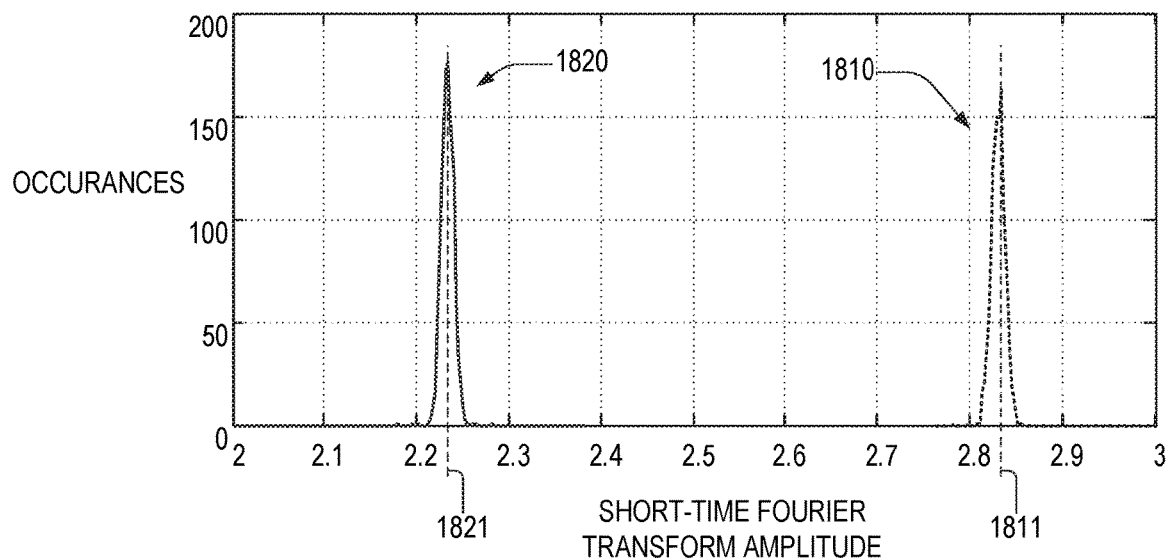
FIG. 18 shows histograms of the STFT amplitudes of FIG. 17 generated via the method of FIG. 15.

FIG. 18 shows histograms 1810 and 1820 generated from STFT amplitudes $1742(n_1, m_1)$ and $1742(n_1, m_2)$, respectively. Histograms 1810 and 1820 are examples of histogram 1410, FIG. 14, and result from step 1530 of method 1500. Histograms 1810 and 1820 have respective most-common values 1811 and 1821, which are both examples of the most common value of frequency-domain amplitude estimates determines in step 1530.

Figure 19A:
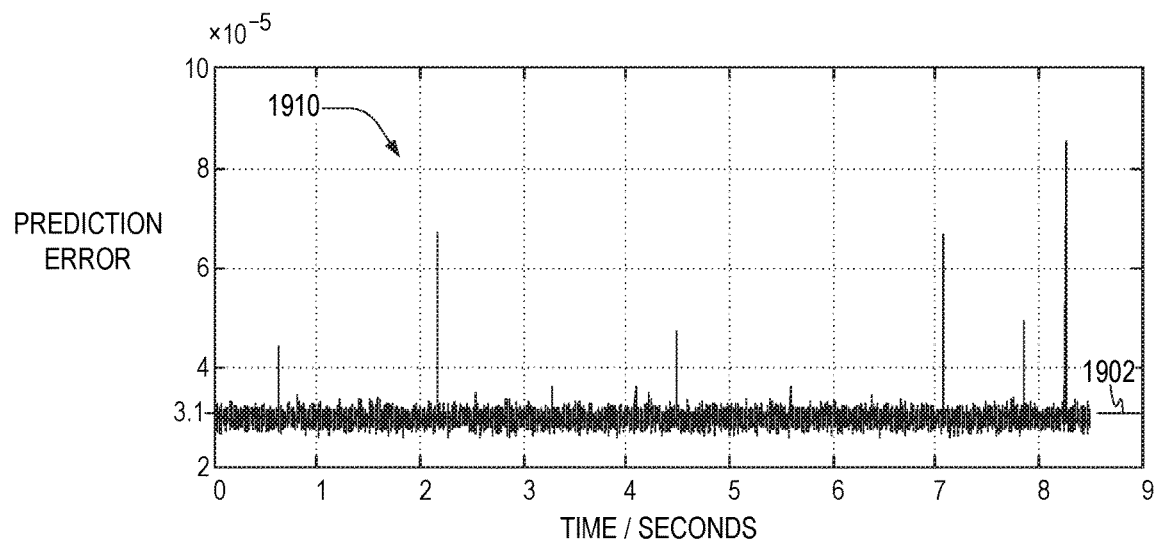
FIGS. 19A and 19B are plots of prediction errors of the STFT amplitudes of FIG. 17.
Figure 19B:
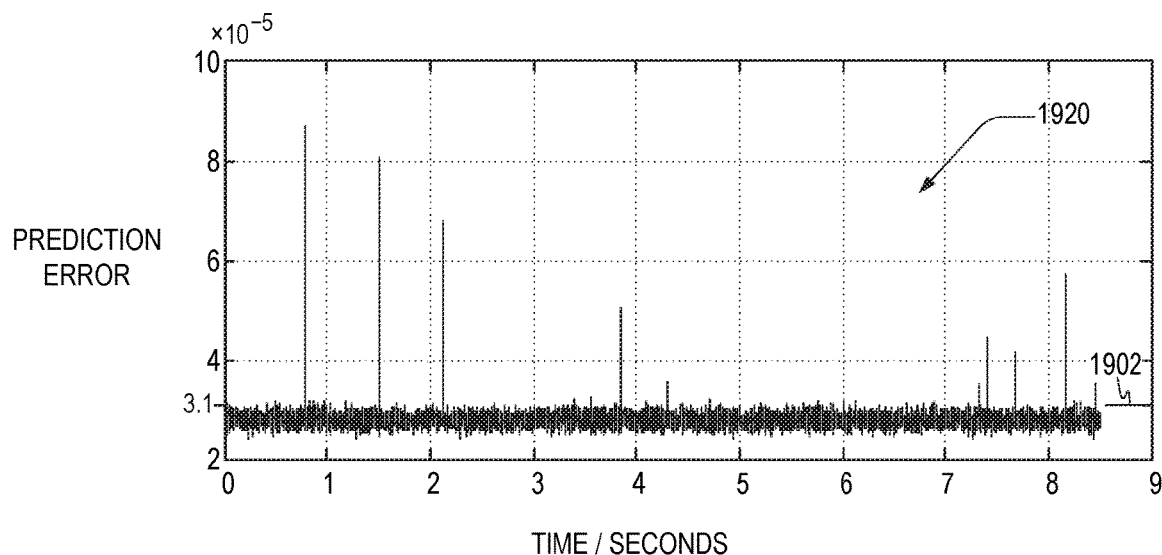

FIGS. 19A and 19B are plots of prediction errors 1910 and 1920 of STFT amplitudes $1742(n_1, m_1)$ and $1742(n_1, m_2)$, respectively. Prediction errors 1910 and 1920 are similar to prediction errors 1010 and 1020 shown in FIG. 10. Prediction errors 1910 and 1920 that exceed a threshold 1902 correspond to a corrupt STFT amplitude 1742. In the following discussion, threshold 1902 equals $3.1 \times 10^{-5}$. Corrupt amplitudes of STFT amplitudes 1742 are those that yield a prediction error 1910, 1920 that exceeds threshold 1902.

In an embodiment of method 600, step 732 evaluates an STFT amplitude corresponding to a baseband signal to determine if the baseband signal is corrupt. In an example of step 732, signal evaluator 260 determines that a baseband signal (e.g., a channel signal 231S) corresponding to an STFT amplitude 1742 is corrupted when its prediction error 1910 or 1920 exceeds threshold 1902.

Figure 20:
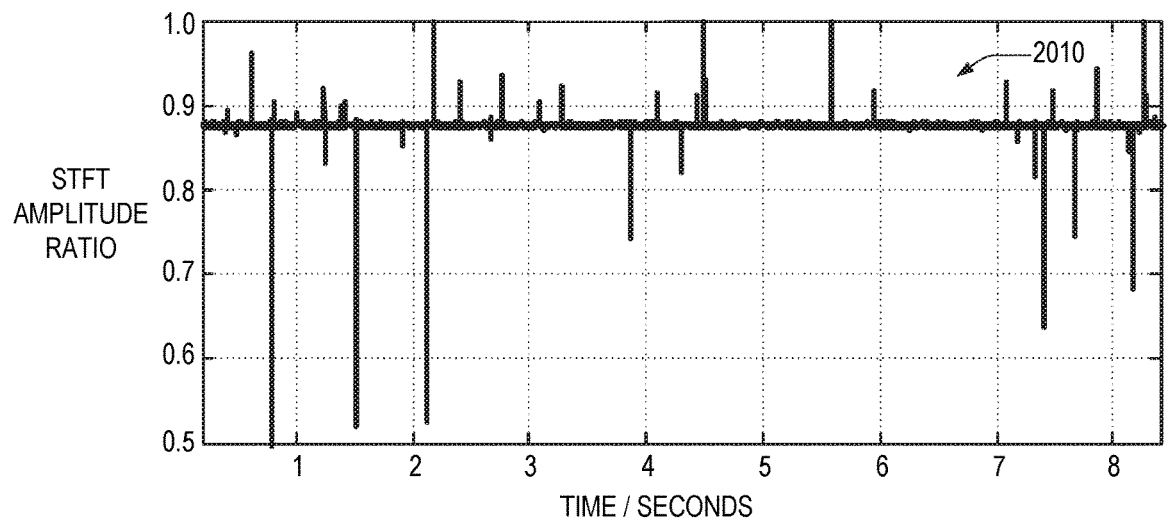
FIG. 20 is a plot of a ratio of STFT amplitudes of FIG. 17.

FIG. 20 is a plot of STFT ratio 2010, which is the ratio of STFT amplitude $1742(n_1, m_1)$ to STFT amplitude $1742(n_1, m_2)$. Ideally, STFT amplitudes $1742(n_1, m_1)$ and $1742(n_1, m_2)$ would have respective mean values with a small amount of statistical noise. Due to the weather events, snow in this case, the STFT amplitudes $1742(n_1, m_1)$ and $1742(n_1, m_2)$ have large variations, which STFT amplitude ratio 2010 illustrates. Estimates of a time-average value of STFT amplitude ratio 2010 will either have a large bias, variance or both, which means that STFT amplitude ratio 2010 is badly corrupted.

Figure 21:
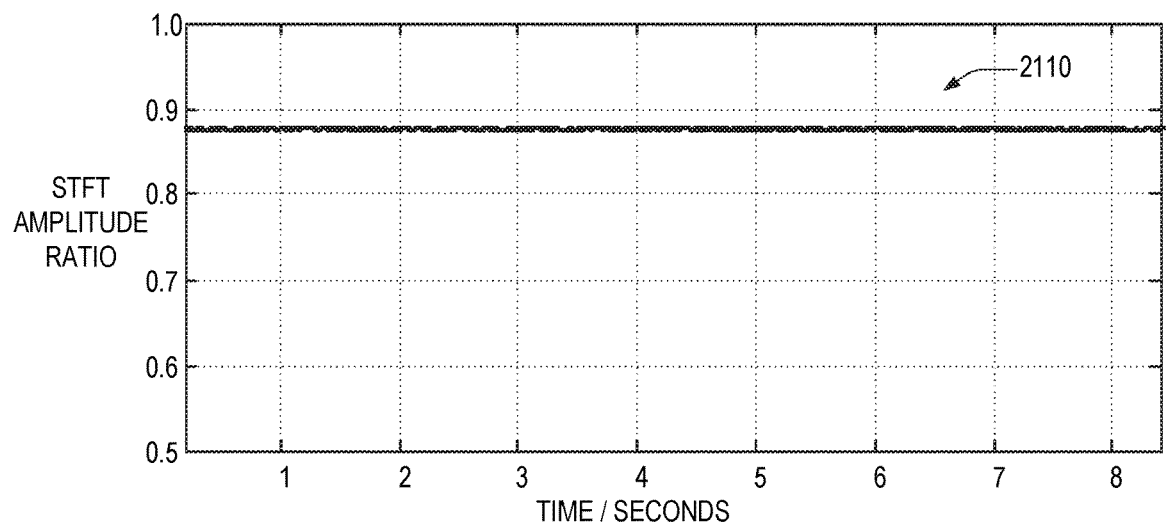
FIG. 21 is a plot of a ratio of STFT amplitudes of FIG. 17 with corrupted measurements excised.

FIG. 21 is a plot of corrected STFT ratio 2110, which is the ratio of STFT amplitude $1742(n_1, m_1)$ to STFT amplitude $1742(n_1, m_2)$ with corrupt amplitudes removed. These corrupt amplitudes are shown in FIGS. 19A, B. Compared to STFT amplitude ratio 2010, corrected STFT amplitude ratio 2110 has a constant value with little variation due to noise. The SNR of STFT amplitude ratio 2010 approaches that of ideal data for a stationary system with no relative motion.

In an embodiment of method 600, step 732 evaluates a STFT amplitude ratio corresponding to a baseband signal to determine if the baseband signal is corrupt. In an example of step 732, signal evaluator 260 determines that a baseband signal (e.g., a channel signal 231S) corresponding to an STFT amplitude 1742 is corrupted when STFT amplitude ratio 2010 has a variance that exceeds a predetermined value.

Figure 22:
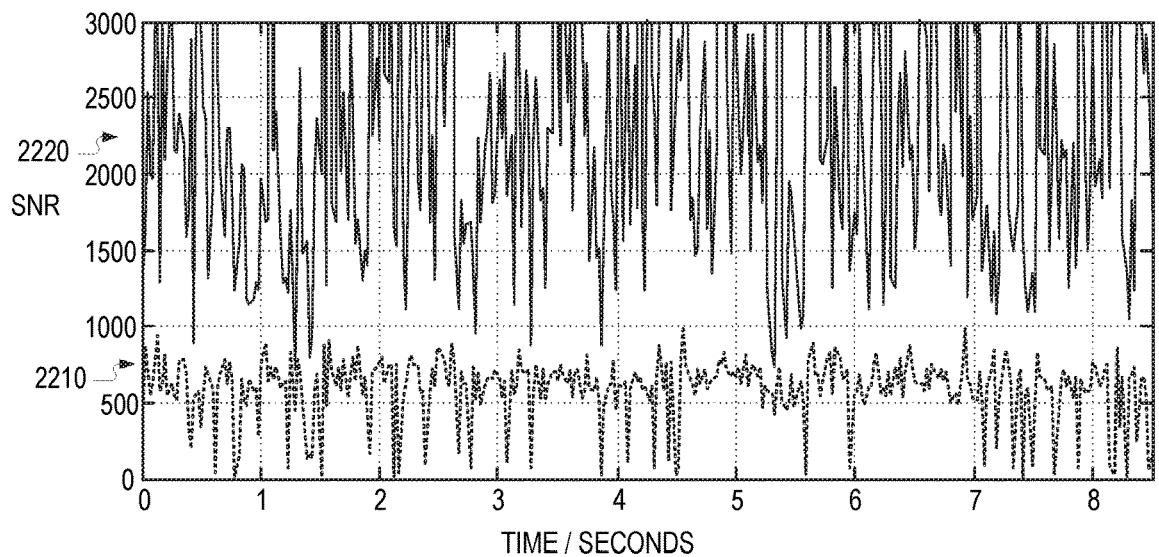
FIG. 22 is a plot of signal-to-noise ratios corresponding to STFT amplitude ratios of FIGS. 20 and 21.

FIG. 22 is a plot of SNR time series 2210 and SNR time series 2220 corresponding to STFT ratios 2010 and 2110, respectively. SNR time series 2210 and 2220 were computed with non-overlapping time intervals 264 having a 25-ms duration, in which each interval includes twenty-six short-time Fourier transform samples with a duration of 0.952 milliseconds. SNR time series 2210 ranges from a minimum of about zero to a maximum of about one thousand. SNR time series 2220 ranges from a minimum of about one thousand to a maximum of over 3000. Absent weather events, i.e. with clear air, SNR time series 2210 and 2220 would be approximately constant. Correction of the data yields a significant increase in SNR and minimum SNR. Minimum SNR is may be a criterion for system performance.

Figure 23:
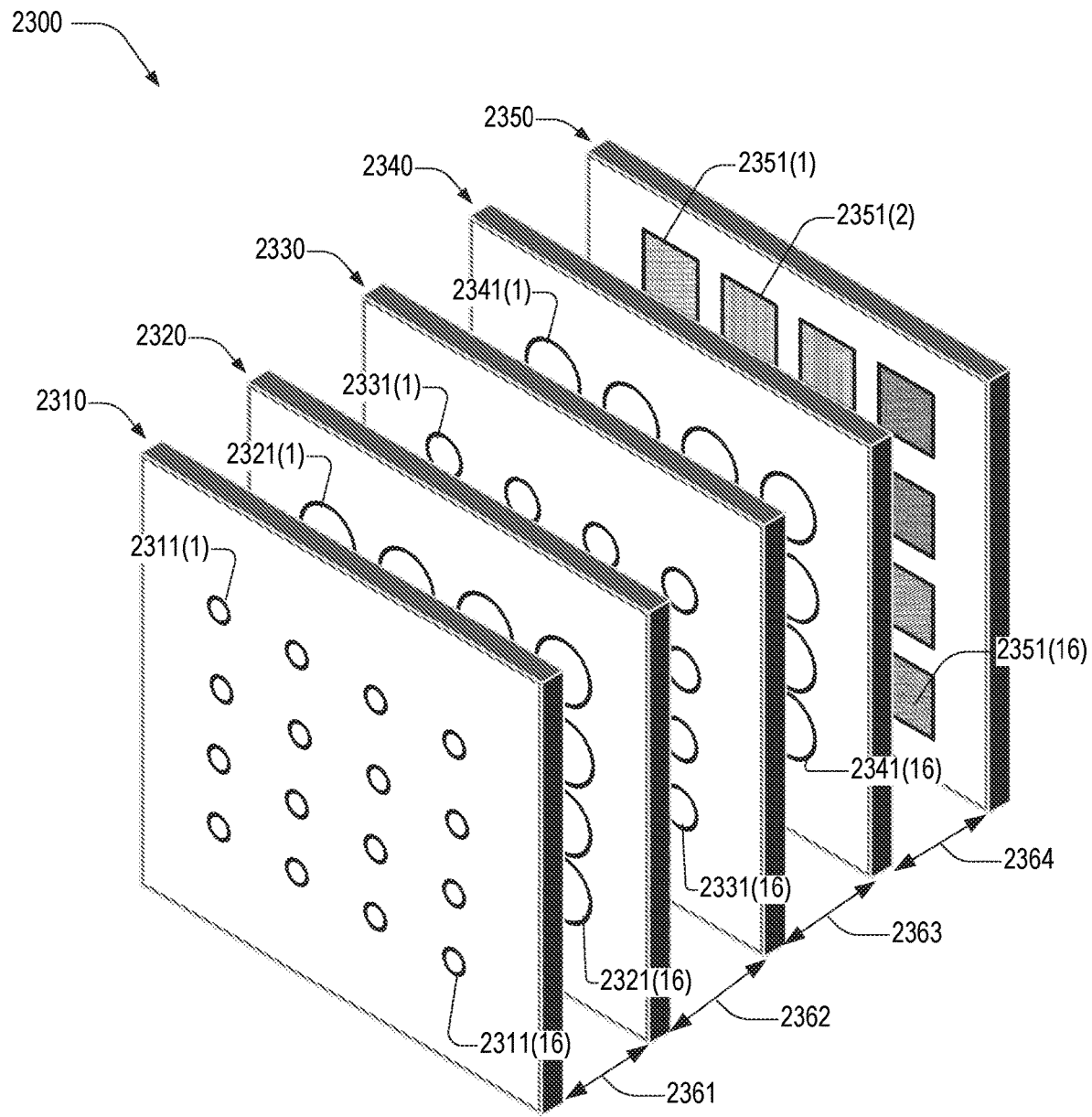
FIG. 23 illustrates an optical component array present in an embodiment of a receiver of the localization system of FIG. 2.

FIG. 23 illustrates an optical component array 2300 present in an embodiment of receiver 230 of localization system 200 of FIG. 2. Array 2300 includes a lens mount 2310 holding lenses 2311, a spacer 2320 having windows 2321, a lens mount 2330 holding lenses 2331, a spacer 2340 having windows 2341, and an optical mask assembly 2350 that includes optical masks 2351(1, 2, . . . , N). While N equals sixteen in array 2300, it may equal to different positive integer without departing from the scope hereof. Each optical mask 2351 may be mutually distinct. Alternatively, two or more optical masks 2351(1, 2, . . . , N) may be identical. One or more optical mask 2351 may be a clear mask, an aperture through optical mask assembly 2350, for example.

Each optical mask 2351 is an example of optical mask 234 of channel 231 and is aligned with a respective lens 2311 of lens mount 2310, window 2321 of spacer 2320, lens 2331 of lens mount 2330, and window 2341 of spacer 2340. For example, optical mask 2351(1) is aligned with window 2341(1), lens 2331(1), window 2321(1), and lens 2311(1). Windows 2321 and 2341 may be apertures through respective spacers 2320 and 2340.

Mount 2310, spacer 2320, mount 2330, spacer 2340, and assembly 2350 are separated by distances 2361, 2362, 2363, and 2364 as shown in FIG. 23. Distance 2361-2364 and respective focal lengths of lenses 2311 and 2331 may be configured such that optical signals 212 propagating through a lens 2311 and 2331 and windows 2321 and 2341 aligned with an optical mask 2351 are either (a) focused thereon or (b) focused to a plane parallel and proximate to mask 2351 such that aforementioned defocus distance Δ is non-zero, e.g., when mask 2351 is binary and periodic. Distances 2361 and 2362 may both equal zero such that thickness of spacer 2320 defines a distance between lens mounts 2310 and 2330. Distances 2363 and 2364 may both equal zero such that thickness of spacer 2340 defines a distance between lens mount 2330 and optical mask assembly 2350.

Spacers 2320 and 2340 may be opaque to carrier frequency 212C, e.g., to at least one of visible and near-IR light, and function to prevent stray light from reaching an optical mask 2351. For example, windows 2321(1) and 2341(1) may be configured, e.g., sized, to prevent light propagating through lenses 2311(1) or 2331(1) from reaching optical mask 2351(2).

When each distance 2361-2364 equals zero, optical component array 2300 may be monolithic such that it is constructed with a single type of optical material in order to reduce the system effects of temperature. Optical components typically change size and form as a function of temperature. Construction of optical component array 2300 with thermally similar or identical materials results in all planes of optical component array 2300 moving similarly, which enables an effective method to control the system effects of temperature. Hence, while all planes similarly change as a function of temperature, each plane is undergoing essentially the same changes, which makes the relative changes between planes unnoticeable when measuring light on the detectors after the mask assembly.

Figure 24:
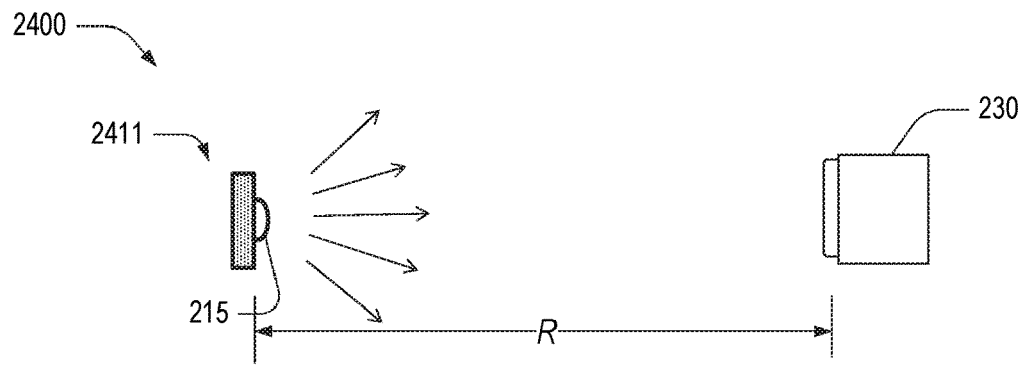
FIGS. 24-27 each illustrate a respective transmitter-receiver pair that includes the receiver of the localization system of FIG. 2.

FIG. 24 is a schematic diagram of a static transmitter-receiver pair 2400. Transmitter-receiver pair 2400 includes a transmitter 2411, which is an example of emitter 211 of FIG. 2, and receiver 230 shown in FIG. 2. Transmitter 2411 includes light source 215. Transmitter 2411 and receiver 230 are separated by distance R.

Figure 25:
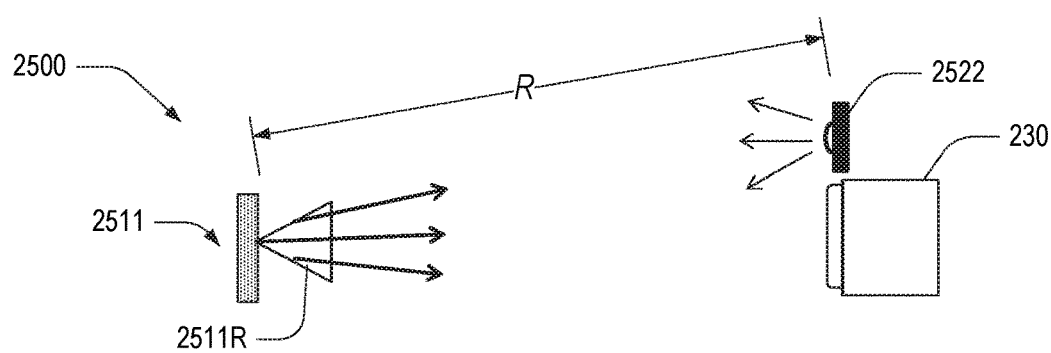

FIG. 25 is a schematic diagram of a static transmitter-receiver pair 2500. Transmitter-receiver pair 2500 includes a transmitter 2511, receiver 230, and a light source 2522. Transmitter 2511 includes a retroreflector 2511R configured to direct light emitted by light source 2522 toward receiver 230. Retroreflector 2511R may include one or more of a mirror, a retroreflector, a light engine, a light pipe, a re-imager, and a projector. Light source 2522 and receiver 230 are separated by distance R.

Figure 26:
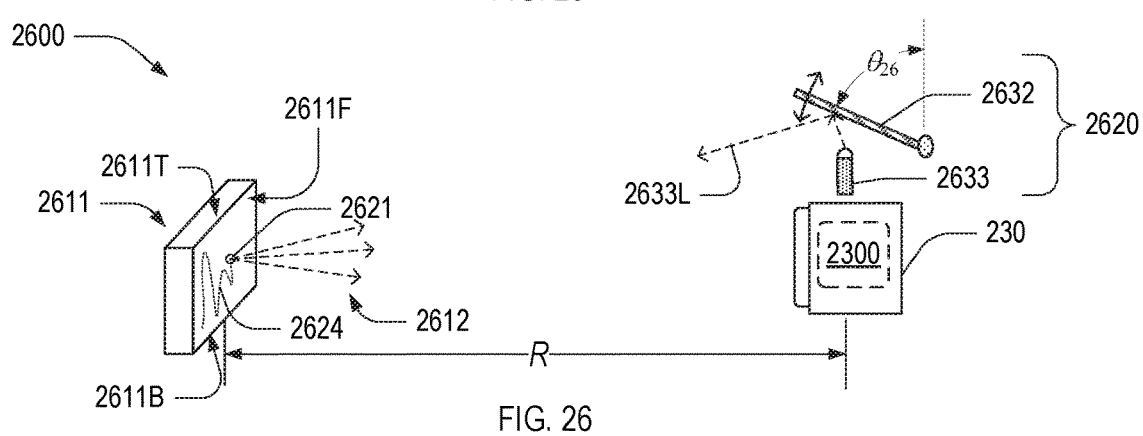

FIG. 26 is a schematic diagram of a localization system 2600 that includes receiver 230 and optical transmitter 2620. Optical transmitter 2620 illuminates regions of an object 2611. Object 2611 is an example of emitter 211. Optical transmitter 2620 is an example of optical transmitter 220, and includes a mirror 2632 that reflects light 2633L emitted by a light source 2633 toward object 2611 located a distance R therefrom. Light source 2633 is an LED or laser diode, for example Mirror 2632 may include at least one of a rotating-scanning mirror and a micro-electro-mechanical systems (MEMs) mirror. Object 2611 has a top end 2611T and a bottom end 2611B, respectively, and a front surface 2611F therebetween. Front surface 2611F may include a barcode or other optical, machine-readable, representation of data.

Mirror 2632 may direct light 2633L toward object 2611 to an illuminated location 2621 such that optical transmitter 2620 scans front surface 2611F along a path 2624 thereon. Path 2624 may traverse top end 2611T to bottom end 2611B or vice versa. Motion of illuminated location 2621 enables localization over a large region of points on surface 2611F by moving the mirror 2632 as a function of time, for example, by a time-varying mirror rotation angle $\theta_{26}(t)$. Depending on the movement of the light 2633L, and hence illuminated location 2621, localization in two or more dimensions is possible. Illuminated location 2621 may also be dynamically controlled to interrogate different regions of the object 2611.

Object 2611 reflects light 2633L incident thereon as optical signal 2612, which is an example of optical signal 212. At any point in time, a portion of optical signal 2612 is directed toward receiver 230 such that processing unit 280 determines the estimated location of the illuminated region on the object. Coordination between the scanning mirror 2632 and receiver 230 is not required. Light 2633L need not form any particular pattern, such as a grid, on front surface 2611F. A random pattern may suffice depending on the temporal needs of the overall system.

Figure 27:
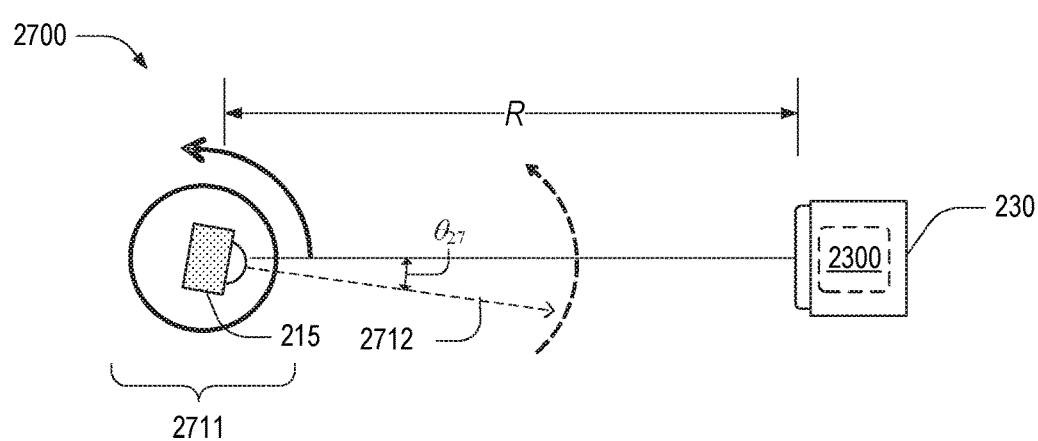

FIG. 27 is a schematic diagram of a transmitter-receiver pair 2700 that includes a rotating emitter 2711 and receiver 230 separated by distance R. Emitter 2711 is an example of emitter 211. Rotating emitter 2711 includes one fixed light source 215 configured to emit beam 2712 at a rotation angle $\theta_{27}$ with respect to a front surface of receiver 230. Rotation angle $\theta_{27}$ may vary in time as $\theta_{27}(t)$. Rotating emitter 2711 may be a rotary laser level. Rotating emitter 2711 may include a MEMs mirror configuration such for changing angle $\theta_{27}$. Beam 2712 is an example of optical signal 212, and may be a structured beam such as a line or fan or multiple lines or circular beams, periodic or otherwise, or other spatially structured signal.

Source/receiver pairs 2400, 2500, and localization system 2600 experience a $R^{-2}$ drop in detected signal power at the receiver as a function of distance R. Since the size of beam 2712 on receiver 230 increases linearly in each transverse dimension as a function of distance R, total optical power detected over a constant area decreases as $R^{-2}$. In transmitter-receiver pair 2700, sweeping beam 2712 through at least one complete beam width enables receiver 230 to capture of all this radiated optical power in a rotation plane of rotation angle $\theta_{27}$. Localization system 200 processes output of receiver 230 to angularly localize rotating emitter 2711 in a plane perpendicular to the rotation plane. Hence, in transmitter-receiver pair 2700, the optical power detected by receiver 230 decreases by a factor of $R^{-1}$ (not $R^{-2}$) as a function of R. The result is that transmitter-receiver pair 2700, can have a far larger range for a given received amount of power, or SNR, compared a fixed-beam system.

Receiver 230 of localization system 2600 and transmitter-receiver pair 2700 may include optical component array 2300 of FIG. 23. Optical signal 2612 (FIG. 26) and beam 2712 (FIG. 27) may work in conjunction with optical component array 2300 to provide a spatiotemporal or time-space dimension for the processing system to determine additional operational parameters, as shown in FIG. 28.

Figure 28:
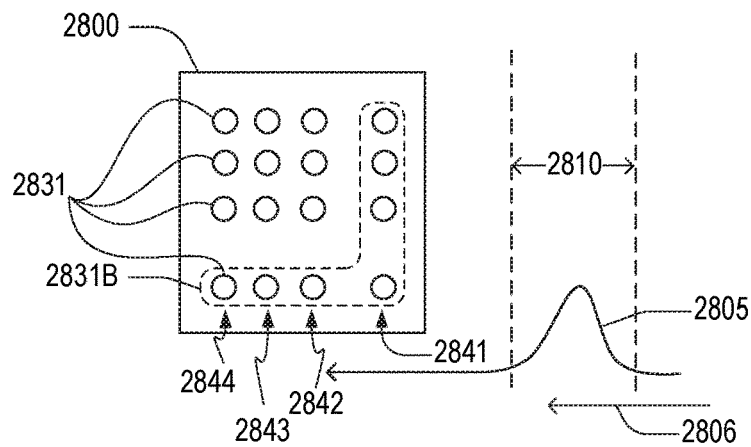
FIGS. 28-32 each illustrate a wavefront traversing an embodiment of receiver that includes the optical component array of FIG. 23.

FIG. 28 illustrates a temporal wavefront 2805 traversing a receiver 2800 in a direction 2806. Temporal wavefront 2805 is, for example, a wavefront of optical signal 2612 or 2712 and traverses receiver 2800 according to temporal dependence of angles $\theta_{26}(t)$ or $\theta_{27}(t)$. Temporal wavefront 2805 that has a finite width 2810 of detectable energy across a receiver 2800.

Receiver 2800 is an example of receiver 230 of FIG. 2 and includes a plurality of channels 2831 arranged in a two-dimensional array. Accordingly, receiver 2800 may include an embodiment of optical component array 2300, shown in FIG. 23. Each channel 2831 is in one of a plurality of channel columns 2841-2844. Channels 2831 include a plurality of non-periodically-spaced channels, denoted within a dashed box 2831B in FIG. 28. In this example, receiver 2800 has non-periodic spacing of channels 2831 to facilitate a spatial separation from the other, periodically-spaced, channels for a constant angular velocity of sweep rate.

Figure 29:
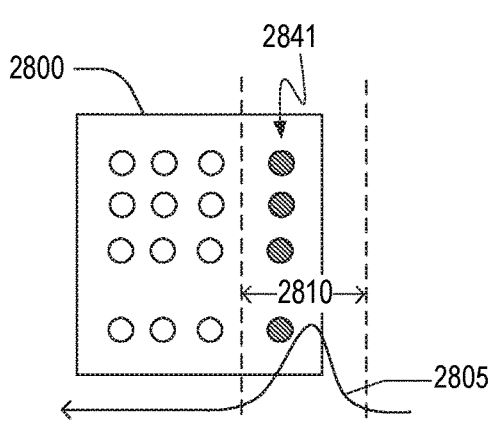
Figure 30:
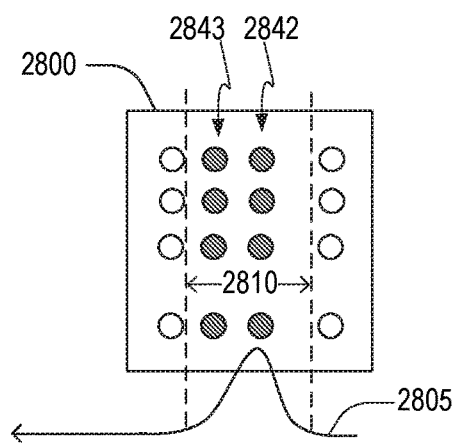
Figure 31:
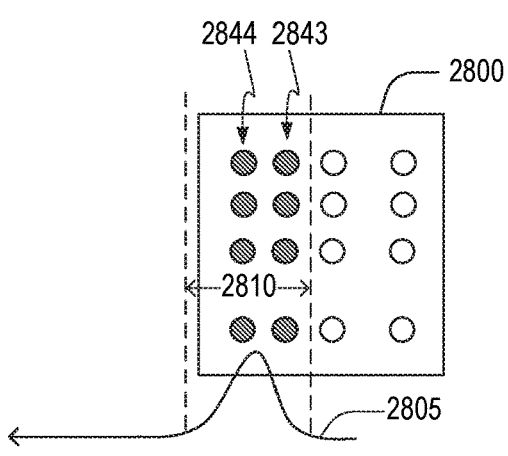
Figure 32:
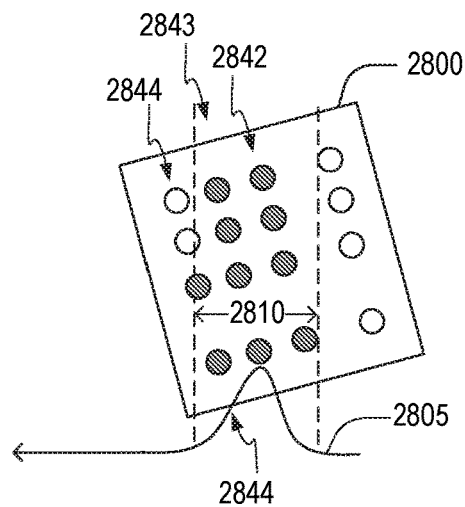

As temporal wavefront 2805 traverses receiver 2800, not all channels 2831 initially detect wavefront 2805. Depending on channel spacing and width 2810 of wavefront 2805, more than channel column 2841-2844 simultaneously detect wavefront 2805, albeit with different energies as a function of time, as shown in FIGS. 29-32. In FIG. 29, channels of channel column 2841 detect wavefront 2805. In FIG. 30, channels 2831 in channel column 2842 and 2843 detect wavefront 2805. In FIG. 31, channels 2831 of channel column 2842 and 2843 detect wavefront 2805. In FIG. 32, channels 2831 of channel column 2843 and 2844 detect wavefront 2805.

Relative angular orientation between receiver 2800 and an emitter such as 2611 or 2711 may be estimated via a temporal signatures of the time of arrival of wavefront 2805 across channels 2831, as shown in FIG. 32. Whereas all channels 2831 in columns 2842 and 2843 detect wavefront 2805 in FIG. 30, two of the four channels of column 2844 detect wavefront 2805 in FIG. 32, where receiver 2800 is rotated relative to its orientation of in FIG. 30. Such incomplete illumination of channels 2831 in a channel column 2844 indicates a tilt of receiver 2800 with respect to a propagation of direction of an optical signal 212, such as optical signal 2612 and beam 2712. Uniqueness in the temporal signature can be used to determine beam width, or distance from the transmitter for a broadening source.

FIG. 33 illustrates one exemplary localization system 3300, which is an example of processing unit 280 of localization system 200. Localization system 3300 is configured to determine a frequency-domain amplitude 3342 of a baseband signal 3331 having a temporal frequency component. The frequency-domain amplitude corresponds to the temporal frequency component. Baseband signal 3331 and frequency-domain amplitude 3342 are examples of channel signal 231S and measured signal amplitude 242, respectively of localization system 200.

Localization system 3300 includes microprocessor 282 and a memory 3484, which is an example of memory 284. Memory 3484 stores software 2050 and optionally time interval 264. Software 2050 includes frequency domain analyzer 256 and optionally spot-location estimator 252, position-to-angle converter 254, signal conditioner 258, signal evaluator 260 and SNR monitor 262. Software 250 of FIG. 2 is an example of software 2050.

Localization system 3300 may also be configured to determine a localization parameter 3313 from frequency-domain amplitude 3342. Localization parameter 3313 is, for example, a measured location angle 213M shown in FIG. 2. Localization parameter 3313 may be a distance between the object and a receiver that detects an electromagnetic signal propagating from the object, e.g., when localization system 3300 is used for ranging.

FIGS. 34-38 describe exemplary uses of localization system 200 and method 600. Each transmitter 3411 of FIGS. 34-38 is an example of an emitter 211. Vehicle 184 of FIG. 34 has a transmitter 3411(1) above its driver's seat and a transmitter 3411(2) on pallet 3484, which enables both location and state of the lift (and pallet 3484) to be estimated, displayed and potentially controlled. Bicycle 3520 of FIG. 35 has a transmitter 3411(3) enables it to be localized and potentially controlled.

Figure 36:
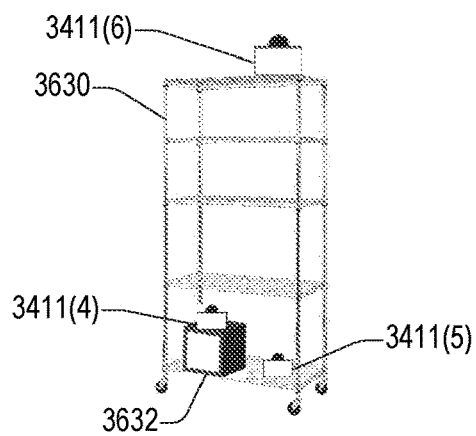
Figure 37:
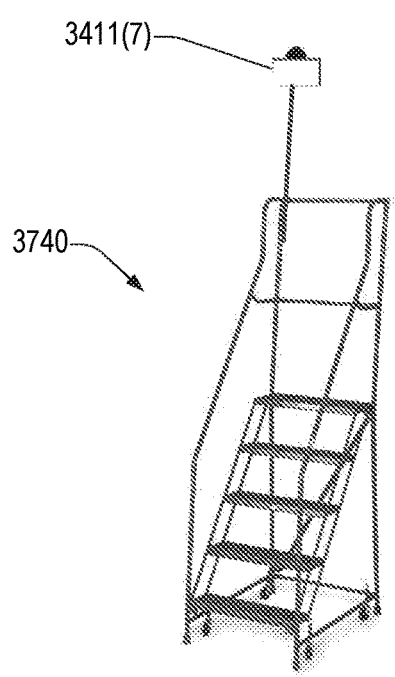

Mobile rack 3630 of FIG. 36 may include a range of trackable objects, such as object 3632 via transmitter 3411 (4). The location of specific regions of rack 3630 may be estimated by localizing transmitters 3411(5) and 3411(6). Transmitter 3411(5) may serve an additional role by virtue of its being on the bottom shelf of rack 3630. When the rack 3630 is empty, transmitter 3411(5) becomes visible to localization system 200, enabling not only a location estimate but the knowledge that rack 3630 is empty. Mobile stair 3740 of FIG. 37 is similarly trackable via transmitter 3411(7).

In an exemplary use case of localization system 200 that includes a transmitter 3411, transmitter 3411 may be placed in locations that are not normally visible, such as the sole of footwear or hidden beneath high value items that should not be moved, or indicate potential issues in the environment. Transmitters 3411 visible from soles of shoes may indicate a person in a prone position, possibly from an accident. A transmitter 3411 may also indicate a missing item when an obstructed and transmitter 3411 is suddenly revealed when the obstruction is removed, enabling real-time theft detection or notification of abrupt changes in an otherwise static environment.

Figure 38:
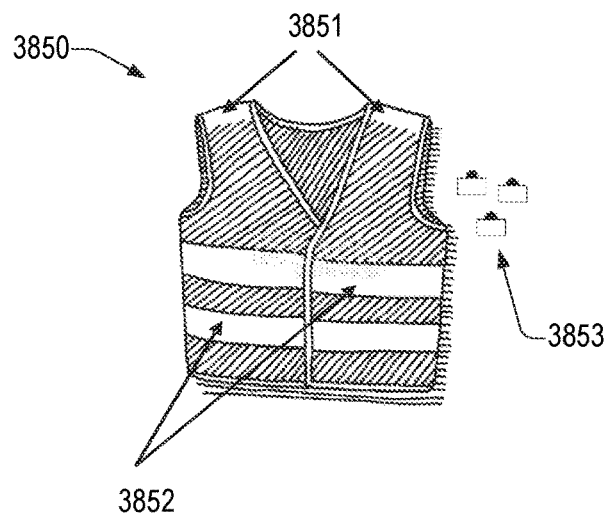

Vest 3850 of FIG. 38 is a specialized vest wearable by workers, visitors and operators at a facility or job site. Vest 3850 is specialized in that it has transmitting regions 3851, 3852 either on or within the material of the vest. Transmitting regions 3851 and 3852 are examples of emitters 211. These vests may incorporate wearable electronics to make the transmitter systems less bulky, more acceptable to wearers and potentially less cost and more technically effective as transmitters. Transmitting region 3851 may transmit light generally upward for identification and localization. Transmitting region 3852 may transmit light generally horizontally when worn in the traditional manner, but also vertically when the wearer is sitting, lying down, etc. A wearer of vest 3850 may also carry additional temporary transmitters 3853 to be placed on items of interest for tracking in a temporary fashion, for example to track the passage of a high value item from shelf to shipping. In such a case, one temporary transmitter 3853 would be activated by the user and logged into the infrastructure by the receivers to begin tracking. A selected temporary transmitter 3853 can be removed from the high-value item prior to shipping and recirculated into a pool of temporary transmitters 3853.

Figure 39:
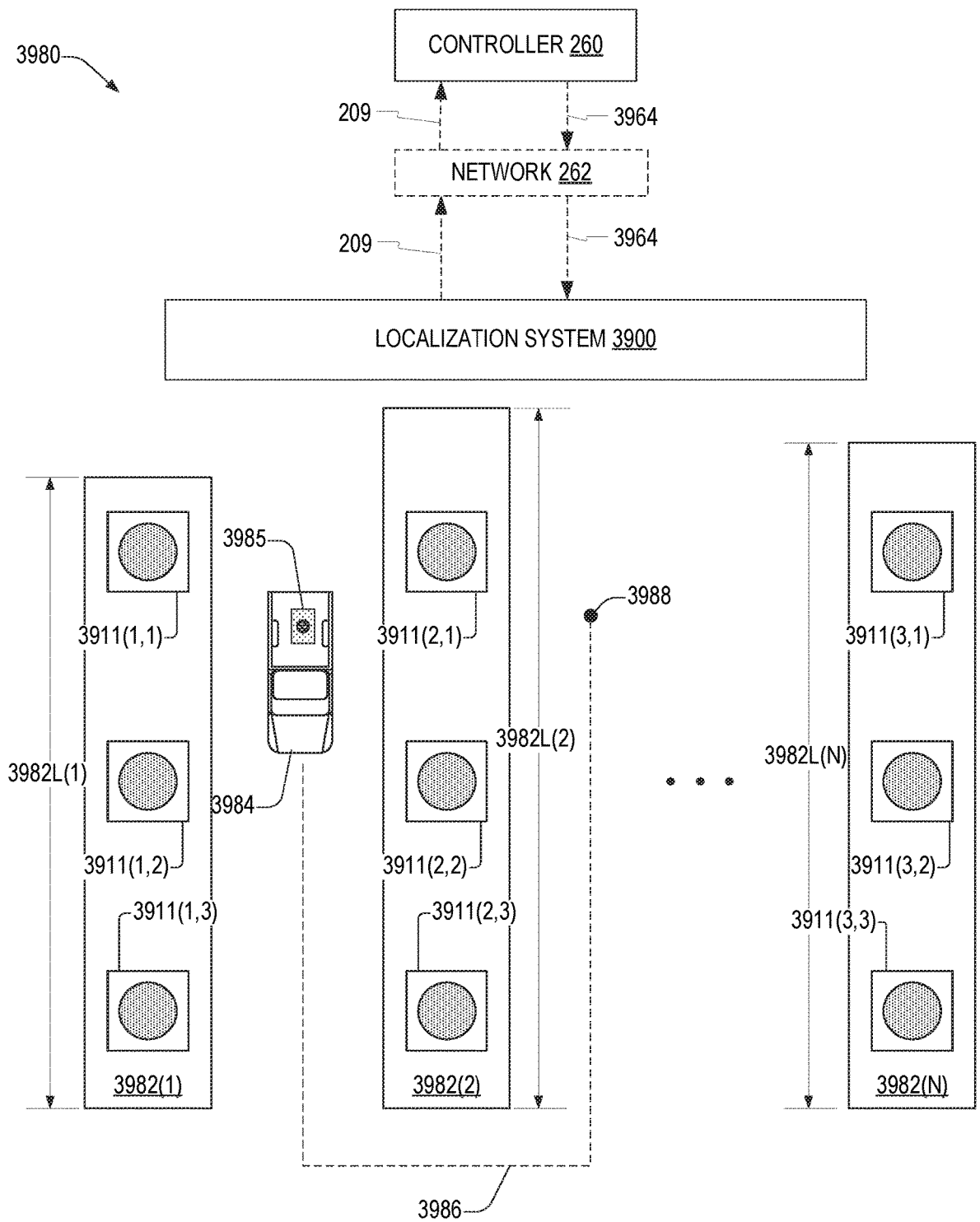
FIG. 39 illustrates a first exemplary use environment for the localization system of FIG. 2, in an embodiment.

FIG. 39 illustrates an exemplary use environment 3980 for a localization system 3900 communicatively coupled to controller 260. Localization system 3900 is an example of localization system 200. Environment 3980 includes fixed landmarks 3982(1-N), which are similar to fixed shelves 182 of FIG. 1. Each landmark 3982 has one or more Mutually distinct transmitters 3911 configured to emit a distinct optical signal 3912. Transmitters 3911 and optical signal 3912 are examples of emitters 211 and optical signal 212 respectively.

Quantity N may range from less than ten to greater than a thousand. Landmarks 3982 have respective lengths 3982L (1-N), each of which may be less than ten meters long to thousands of meters long. While FIG. 39 illustrates landmarks 3982 as being mutually parallel, landmarks 3982 may have other relative orientations. For example, their relative orientation can be simple as a grid or a complex as the streets of a medieval city.

Transmitters 3911 function to identify regions and locations of the fixed landmarks 3982. A landmark 3982 may have any number of transmitters 3911, for example, ranging from less than ten to more than one thousand, depending on the application.

Application environment 3980 includes a mobile object 3984 being directed to a location 3988 along a path 3986 by localization system 3900 and controller 260. Object 3984 has thereon a transceiver 3985, which is an example of an emitter 211 that includes receiver 217. Transceiver 3985 is for example communicatively coupled to object 3984 such that controller 260 may remotely operate object 3984 via transceiver 3985. Controller 260 executes processing and control to calculate a desired path 3986 and command mobile object 3984 travel path 3986, via instructions 3964. Communication to object 3984 can be performed optically or wirelessly through transceiver 3985. Localization system 3900 estimates position, velocity and other relevant information about object 3984, such as potential obstructions while object 3984 travels path 3986. When object 3984 arrives at location 3988, controller 260 may instruct object 3984, via localization system 3900, to perform a specialized task, such as picking up parts, depositing parts to a fixed landmark 3982, or reading a barcode.

Figure 40:
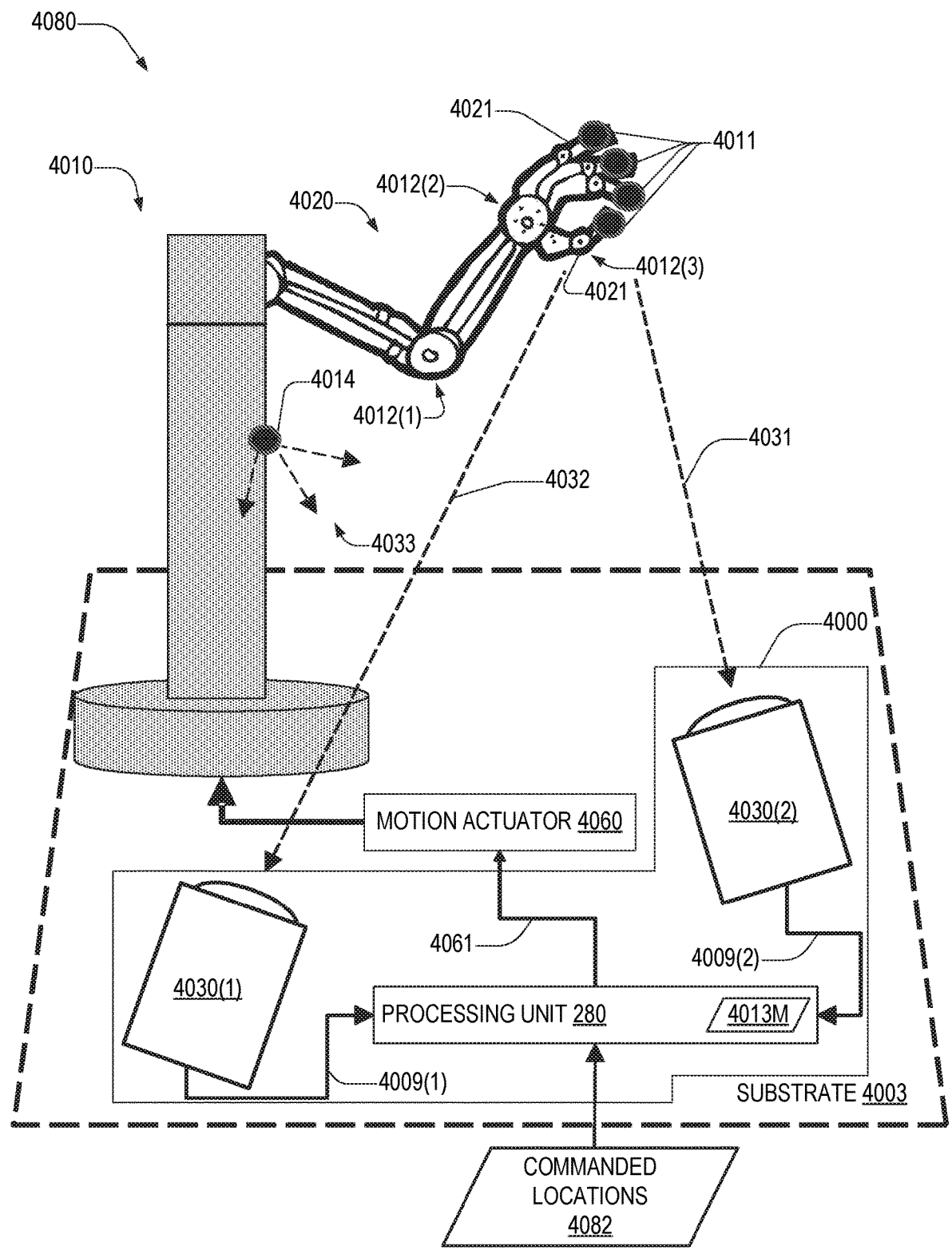
FIG. 40 illustrates a second exemplary use environment for the localization system of FIG. 2, in an embodiment.

FIG. 40 depicts a system 4080 that may be used in conjunction with mobile object 3984 of FIG. 39. System 4080 can also be mounted on a fixed system. System 4080 includes a substrate 4003 that has a robotic arm 4010 and a localization system 4000 mounted thereon. Localization system 4000 is an example of localization system 200 and includes localization receivers 4030(1) and 4030(2). Localization receivers 4030(1) and 4030(2) are each examples of receiver 230.

Robotic arm 4010 includes a plurality of actuators 4012 (1-3). Typically, multiple actuators are used to control mechanical motion and result in what is called open-loop control. Open-loop control does not allow the system to automatically compensate for permanent or temporary errors in the expected position of one or more actuators. Open-loop control also means that picking and placing objects in a fashion as efficient as a human is often difficult to impossible, especially if the robot needs to be relatively low cost. A human's vision coordinated with her hand is a form of closed-loop control. System 4080 in essence enables closed-loop control of a low-cost robot that can mimic the method humans employ to use arms and hands.

Robotic arm 4010 contains an arm 4020 with one or more actuatable parts 4021. Actuatable parts 4021 for example resemble fingers of a human hand. Alternatively, actuatable part 4021 may be a bucket attached to heavy machinery such as an excavator or a crane; for example, arm 4020 is a boom and actuatable part 4021 is hydraulic cylinder actuated by actuator 4012(1).

Mounted on actuatable parts 4021 are mutually distinct transmitters 4011 that enable precision and fast localization of each actuatable part 4021 through localization receivers 4030(1) and 4030(2). Localization of actuatable parts 4021 can be made relative to one or more reference points 4014. Reference points 4014 are for example transmitters 4011 and transmitters 711 of FIG. 7.

Transmitted radiation 403 land 4032 from actuatable parts 4021 and transmitted radiation 4033 from reference point 4014 travel toward localization receivers 4030(1) and 4030 (2). Receivers 4030(1) and 4030(2) deliver localization information of each actuatable part 4021 and reference point 4014 to processing unit 280 via localization data 4009(1) and 4009(2), from which processing unit 280 determines localization angles 4013M, which are examples of localization angles 213M. Localization data 4009(1) and 4009(2) are examples of localization data 209.

Other systems that require actuatable parts 4021 to be in certain positions or have certain motion, for example to pick up a complex part, Such positions and motion may be inputs for system 4080, and may be represented by commanded locations 4082. Processing unit 280 compares commanded locations 4082 to a location determined from measured localization angles 4013M to determine an error signal and updated location commands 4061, which are received by motion actuator 4060. By comparing commanded location with actual location, true closed-loop control of actuatable parts 4021 is possible. Position encoders on the motion actuators within robotic arm 4010 are not required. In fact, with closed-loop control motion actuators can be inexpensive and/or have motion paths unusual compared to classical robots that move rectilinearly. Motion of the arm 4020 and actuatable parts 4021 may resemble a human arm and fingers respectively. Closed-loop control would enable fast and reliable action similar to how a human's sight and brain controls the human's hands and fingers. Picking and placing complex objects is not only possible but relatively simple and low cost with angular coding for closed-loop control.

Combinations of Features

Features described above as well as those claimed below may be combined in various ways without departing from the scope hereof. The following examples illustrate some possible, non-limiting combinations:

(A1) denotes method for determining a localization parameter of an object. The method includes generating a plurality of estimates of a first frequency-domain amplitude of a baseband signal from the object. Each of the plurality of estimates corresponds to a respective one of a plurality of temporal segments of the baseband signal. The first frequency-domain amplitude corresponds to a temporal frequency of the baseband signal. The method also includes determining the first frequency-domain amplitude as most common value of the plurality of estimates and determining the localization parameter based on the first frequency-domain amplitude.

(A2) In the method denoted by (A1), the step of determining the first frequency-domain amplitude may include (i) binning the plurality of estimates into a plurality of bins, each of the plurality of bins corresponding to a respective interval between a maximum of the plurality of estimates and a minimum of the plurality of estimates, and (ii) determining the first frequency-domain amplitude as an estimate within one of the bins that corresponds to the interval having the greatest number of estimates.

(A3) In the method denoted by (A2), the plurality of bins may include (i) a first plurality of bins corresponding to a first plurality of intervals each with a respective center and a respective edge, and (ii) a second plurality of bins corresponding to a second plurality of intervals shifted with respect to the first plurality of intervals such that a center of each of the second plurality of intervals corresponds to an edge of one of the first plurality of intervals.

(A4) Any method denoted by (A2), may further include, before the step of generating a plurality of estimates, preprocessing the baseband signal using a temporal differencing algorithm.

(A5) Any method denoted by one of (A1) through (A4) my further include (i) detecting a first portion of an optical signal from the object, the optical signal being modulated at the temporal frequency, (ii) detecting a second portion of the optical signal transmitted through a slow-varying optical mask having a strictly monotonic transmissivity $T_2(x)$, in an x-range of a spatial dimension x, (iii) detecting a third portion of the optical signal transmitted through a fast-varying optical mask having a spatially-varying transmissivity $T_3(x)$ having a same value at more than one value of x in the x-range, and (iv) demodulating one of the detected first portion, the detected second portion, and the detected third portion to yield the baseband signal.

(A6) Any method denoted by (A5), in which the one of the detected first portion, the detected second portion, and the detected third portion is the detected first portion, may further include (i) demodulating the detected second portion to yield a second baseband signal, (ii) generating a second plurality of estimates, of a second frequency-domain amplitude corresponding to the temporal frequency, each corresponding to a respective one of a plurality of second temporal segments of the second baseband signal, (iii) determining the second frequency-domain amplitude as most common value of the second plurality of estimates, (iv)

demodulating the detected third portion to yield a third baseband signal, (v) generating a third plurality of estimates, of a third frequency-domain amplitude, corresponding to the temporal frequency, each corresponding to a respective one of a plurality of third temporal segments of the third baseband signal, and (vi) determining the third frequency-domain amplitude as most common value of the third plurality of estimates.

(A7) Any method denoted by (A6) may further include (i) determining a coarse-estimate location $x_2$ in the x-range and corresponding to a location on the slow-varying optical mask having transmissivity equal to the second frequency-domain amplitude divided by the first frequency-domain amplitude, (ii) determining a plurality of candidate locations $\{x_{3,1}, x_{3,2}, x_{3,3}, x_{3,n}\}$ in the x-range and corresponding to locations on the fast-varying optical mask having transmissivity equal to the third frequency-domain amplitude divided by the first frequency-domain amplitude, (iii) determining a refined-estimate location, of the plurality of candidate locations, closest to coarse-estimate location $x_2$, and (iv) determining the localization parameter, based on the refined-estimate location, as an angle of the object with respect to a plane perpendicular to the spatial dimension x and intersecting the slow-varying optical mask and the fast-varying optical mask.

(B1) A localization system includes a memory and a microprocessor. The memory stores non-transitory computer-readable instructions and is configured to store a baseband signal having a temporal frequency component and a corresponding first frequency-domain amplitude. The microprocessor is adapted to execute the instructions to: (i) generate a plurality of estimates of the first frequency-domain amplitude, wherein each of the plurality of estimates corresponds to a respective one of a plurality of temporal segments of the baseband signal, and (ii) determine the first frequency-domain amplitude as most common value of the plurality of estimates.

(B2) In the localization system denoted by (B1) the microprocessor may be further adapted to execute the instructions, when determining the first frequency-domain amplitude, to: (i) bin the plurality of estimates into a plurality of bins, each of the plurality of bins corresponding to a respective interval between a maximum of the plurality of estimates and a minimum of the plurality of estimates, and (ii) determine the first frequency-domain amplitude as an estimate within the bin corresponding to the interval having the greatest number of estimates.

(B3) In the localization system denoted by (B2), the plurality of bins may include (i) a first plurality of bins corresponding to a first plurality of intervals each with a respective center and a respective edge, (ii) a second plurality of bins corresponding to a second plurality of intervals shifted with respect to the first plurality of intervals such that a center of each of the second plurality of intervals corresponds to an edge of one of the first plurality of intervals.

(B4) In any localization system denoted by one of (B2) and (B3), the microprocessor may be further adapted to execute the instructions to, before the step of generating a plurality of estimates: pre-process the baseband signal using a temporal differencing algorithm.

(B5) Any localization system denoted by one of (B1) through (B4) may further include: (i) a receiver including a first channel, a second channel, and a third channel. The first channel includes (i) a first lens for receiving a first portion of an optical signal from the object, and (ii) a first photodetector for converting the received first portion, into a first electrical signal having the first frequency-domain amplitude, the optical signal being modulated at the temporal frequency. The second channel includes (i) a second lens for directing a second portion of the optical signal toward a slow-varying optical mask having a strictly monotonic transmissivity $T_2(x)$ in an x-range of a spatial dimension x, and (ii) a second photodetector for converting the second portion, transmitted through the slow-varying optical mask, into a second electrical signal. The third channel includes (i) a third lens for directing a third portion of the optical signal toward a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal. The microprocessor may be further configured to (i) determine a second and third frequency-domain amplitude from the second, and third electrical signals, respectively, and (ii) determine a localization parameter of the object by comparing the first, second, and third frequency-domain amplitudes.

(B6) In any localization system denoted by (B5), the microprocessor may be further configured to execute steps (ii) through (vi) of the method denoted by (A6).

(B7) In any localization system denoted by (B6), the microprocessor may be further configured to execute steps (i) through (iv) of the method denoted by (A7).

(C1) A localization system for determining a localization parameter of an object includes a receiver and a signal processor. The receiver includes a first channel, a second channel, and a third channel. The first channel includes (i) a first lens for receiving a first portion of an optical signal from the object and (ii) a first photodetector for converting the received first portion into a first electrical signal. The second channel includes (i) a second lens for directing a second portion of the optical signal toward a slow-varying optical mask having a strictly monotonic transmissivity $T_2(x)$ in an x-range of a spatial dimension x and (ii) a second photodetector for converting the second portion, transmitted through the slow-varying optical mask, into a second electrical signal. The third channel includes (i) a third lens for directing a third portion of the optical signal toward a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal. The signal processor is configured to (i) determine first, second, and third signal amplitudes from the first, second, and third electrical signals, respectively, and (ii) determine the localization parameter by comparing the first, second, and third signal amplitudes.

(C2) In the localization system denoted by (C1), the optical signal may be a modulated optical signal having a modulation frequency, in which the first, second, and third signal amplitudes being a respective first, second, and third frequency-domain amplitude, corresponding to the modulation frequency, of the first, second, and third electrical signals.

(C3) In a localization system denoted by one of (C1) and (C2), each of the first, second, and third channels may have a respective field of view that overlaps with a field of view of both other channels.

(C4) A localization system denoted by one of (C1) through (C3) may further include a uniform optical mask between the first photodetector and the first lens and having a uniform transmissivity that equals or exceeds a maximum transmissivity of the slow-varying optical mask and a maximum transmissivity of the fast-varying optical mask.

(C5) In a localization system denoted by one of (C1) through (C4), the signal processor may be configured to determine the localization parameter by (i) determining a coarse-estimate location $x_2$ in the x-range and corresponding to a position on the slow-varying optical mask having transmissivity equal to the second signal amplitude divided by the first signal amplitude, (ii) determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third signal amplitude divided by the first signal amplitude, (iii) determining a refined-estimate location, of the plurality of candidate locations, closest to coarse-estimate location $x_2$; and (iv) determining, based on the refined-estimate location, an angle of the object with respect to a plane perpendicular to the spatial dimension x and intersecting the masks.

(C6) A localization system denoted by one of (C1) through (C5) may further include an emitter for at least one of (i) emitting and (ii) reflecting the optical signal, the emitter being located either (a) on the object or (b) proximate the receiver and configured to direct the optical signal at least toward a reflector mounted on the object.

(C7) In a localization system denoted by one of (C1) through (C6), the optical signal may have a free-space wavelength between 0.40 micrometers and 2.0 micrometers.

(C8) In a localization system denoted by one of (C1) through (C7), the spatially-varying transmissivity $T_3(x)$ may be a periodic function of x.

(C9) In a localization system denoted by one of (C1) through (C8), a portion of the slow-varying mask and a portion of the fast-varying mask may be collinear along a line perpendicular to the x-dimension.

(C10) In a localization system denoted by one of (C1) through (C9), in which (a) the slow-varying optical mask spanning the x-range in spatial dimension x and spanning first y-range in a spatial dimension y orthogonal to spatial dimension x, and (b) the fast-varying optical mask spanning the x-range in spatial dimension x and spanning a second y-range in spatial dimension y, transmissivity $T_2(x)$ and transmissivity $T_3(x)$ may be independent of y.

(C11) In a localization system denoted by one of (C1) through (C10), in which spatially-varying transmissivity $T_3(x)$ is a periodic function having a period $\Lambda_x$, the receiver may further include a fourth channel. The fourth channel includes (i) a fourth lens for receiving a fourth portion of the optical signal toward a second fast-varying optical mask having a spatially-varying transmissivity $T_4(x)=T_3(x+\Delta_x)$, $\Delta_x \leq 0.5\Lambda_x$, and (ii) a fourth photodetector for converting the fourth portion, transmitted through the second fast-varying optical mask, into a fourth electrical signal. The signal processor is configured to (i) determine a fourth signal amplitude from the fourth electrical signals, and (ii) determine the localization parameter by comparing the first, second, third, and fourth signal amplitudes.

(D1) A method for determining a localization parameter of an object includes steps 1-10. In step 1, the method directs a first portion of a modulated optical signal from the object. In step 2, the method determines a first signal amplitude of the received first portion. In step 3, the method directs a second portion of the modulated optical signal toward a slow-varying optical mask having a strictly monotonic transmissivity $T_2(x)$, in an x-range of a spatial dimension x. In step 4, the method determines a second signal amplitude of the second portion transmitted through the slow-varying optical mask. In step 5, the method directs a third portion of the modulated optical signal toward a fast-varying optical mask having a spatially-varying transmissivity $T_3(x)$ having a same value at more than one value of x in the x-range. In step 6, the method determines a third signal amplitude of the third portion transmitted through the fast-varying optical mask. In step 7, the method determines a coarse-estimate location $x_2$ in the x-range and corresponding to a location on the slow-varying optical mask having transmissivity equal to the second signal amplitude divided by the first signal amplitude. In step 8, the method determines a plurality of candidate locations $\{x_{3,1}, x_{3,2}, x_{3,3}, \ldots, x_{3,n}\}$ in the x-range and corresponding to locations on the fast-varying optical mask having transmissivity equal to the third signal amplitude divided by the first signal amplitude. In step 9, the method determines a refined-estimate location, of the plurality of candidate locations, closest to coarse-estimate location $x_2$. In step 10, the method determines, based on the refined-estimate location, an angle of the object with respect to a plane perpendicular to the spatial dimension x and intersecting the masks.

(D2) In the method denoted by (D1), the step of directing the first portion may include directing the first portion toward a uniform optical mask having a uniform transmissivity that equals or exceeds a maximum transmissivity of the second optical mask.

(D3) In a method denoted by one of (D1) and (D2), the optical signal may be a modulated optical signal having a modulation frequency and a corresponding frequency-domain amplitude. The steps of determining the first, second, and third signal amplitude may further include: generating a first, second, and third frequency-domain representation of the first portion, the second portion, and the third portion, respectively; determining, as the first, second, and third signal amplitude, the frequency-domain amplitude of the first, second, and third frequency-domain representation, respectively.

(E1) A repositionable mechanical structure includes a repositionable component, an emitter, a controller, and an actuator. The emitter is located on the repositionable component and is configured to emit an optical signal to a receiver. The controller is adapted to receive a control signal from a transmitter communicatively coupled to the receiver. The actuator is communicatively coupled to the controller and mechanically coupled to the repositionable component and is configured to actuate the repositionable component based on the control signal.

(E2) The repositionable mechanical structure denoted by (E1) may further include the receiver. The receiver includes a first channel, a second channel, and a third channel. The first channel includes (i) a first lens for receiving a first portion of an optical signal from the object, and (ii) a first photodetector for converting the received first portion, into a first electrical signal. The second channel includes (i) a second lens for directing a second portion of the optical signal toward a slow-varying optical mask having a strictly monotonic transmissivity $T_2(x)$ in an x-range of a spatial dimension x, and (ii) a second photodetector for converting the second portion, transmitted through the slow-varying optical mask, into a second electrical signal. The third channel includes (i) a third lens for directing a third portion of the optical signal toward a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal.

(E3) The repositionable mechanical structure denoted by (E2) may further include a signal processor configured to (i) determine first, second, and third signal amplitudes from the first, second, and third electrical signals, respectively, and (ii) determine a localization parameter of the emitter by comparing the first, second, and third signal amplitudes.

(E4) In the repositionable mechanical structure denoted by (E3), the signal processor may determine the localization parameter by: (i) determining a coarse-estimate location $x_2$ in the x-range and corresponding to a position on the slow-varying optical mask having transmissivity equal to the second signal amplitude divided by the first signal amplitude, (ii) determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third signal amplitude divided by the first signal amplitude, (iii) determining a refined-estimate location, of the plurality of candidate locations, closest to coarse-estimate location $x_2$; and (iv) determining, based on the refined-estimate location, an angle of the object with respect to a plane perpendicular to the spatial dimension x and intersecting the masks.

(E5) In a repositionable mechanical structure denoted by one of (E3) and (E4), the optical signal may be a modulated optical signal having a modulation frequency and a corresponding frequency-domain amplitude. The steps of determining the first, second, and third signal amplitude may further include: generating a first, second, and third frequency-domain representation of the first portion, the second portion, and the third portion, respectively; determining, as the first, second, and third signal amplitude, the frequency-domain amplitude of the first, second, and third frequency-domain representation, respectively.

A method for determining a first frequency-domain amplitude corresponding to a temporal frequency of a baseband signal is denoted by (F1). The method includes generating a plurality of estimates of the first frequency-domain amplitude. Each of the plurality of estimates corresponds to a respective one of a plurality of temporal segments of the baseband signal. The method also includes determining the first frequency-domain amplitude as most common value of the plurality of estimates.

(F2) In the method denoted by (F1), the step of determining the first frequency-domain amplitude may include (i) binning the plurality of estimates into a plurality of bins, each of the plurality of bins corresponding to a respective interval between a maximum of the plurality of estimates and a minimum of the plurality of estimates, and (ii) determining the first frequency-domain amplitude as an estimate within one of the bins that corresponds to the interval having the greatest number of estimates.

(F3) In the method denoted by (F2), the plurality of bins may include (i) a first plurality of bins corresponding to a first plurality of intervals each with a respective center and a respective edge, and (ii) a second plurality of bins corresponding to a second plurality of intervals shifted with respect to the first plurality of intervals such that a center of each of the second plurality of intervals corresponds to an edge of one of the first plurality of intervals.

(F4) Any method denoted by (F2), may further include, before the step of generating a plurality of estimates, pre-processing the baseband signal using a temporal differencing algorithm.

(F5) Any method denoted by one of (F1) through (F4) my further include (i) detecting a first portion of an optical signal from an object, the optical signal being modulated at the temporal frequency, (ii) detecting a second portion of the optical signal transmitted through a slow-varying optical mask having a strictly monotonic transmissivity $T_2(x)$, in an x-range of a spatial dimension x, (iii) detecting a third portion of the optical signal transmitted through a fast-varying optical mask having a spatially-varying transmissivity $T_3(x)$ having a same value at more than one value of x in the x-range, and (iv) demodulating one of the detected first portion, the detected second portion, and the detected third portion to yield the baseband signal.

(F6) Any method denoted by (F5), in which the one of the detected first portion, the detected second portion, and the detected third portion is the detected first portion, may further include (i) demodulating the detected second portion to yield a second baseband signal, (ii) generating a second plurality of estimates, of a second frequency-domain amplitude corresponding to the temporal frequency, each corresponding to a respective one of a plurality of second temporal segments of the second baseband signal, (iii) determining the second frequency-domain amplitude as most common value of the second plurality of estimates, (iv) demodulating the detected third portion to yield a third baseband signal, (v) generating a third plurality of estimates, of a third frequency-domain amplitude, corresponding to the temporal frequency, each corresponding to a respective one of a plurality of third temporal segments of the third baseband signal, and (vi) determining the third frequency-domain amplitude as most common value of the third plurality of estimates.

(F7) Any method denoted by (F6) may further include (i) determining a coarse-estimate location $x_2$ in the x-range and corresponding to a location on the slow-varying optical mask having transmissivity equal to the second frequency-domain amplitude divided by the first frequency-domain amplitude, (ii) determining a plurality of candidate locations $\{x_{3,1}, x_{3,2}, x_{3,3}, \ldots, x_{3,n}\}$ in the x-range and corresponding to locations on the fast-varying optical mask having transmissivity equal to the third frequency-domain amplitude divided by the first frequency-domain amplitude, (iii) determining a refined-estimate location, of the plurality of candidate locations, closest to coarse-estimate location $x_2$, and (iv) determining, based on the refined-estimate location, an angle of the object with respect to a plane perpendicular to the spatial dimension x and intersecting the slow-varying optical mask and the fast-varying optical mask.

(G1) A frequency-domain analyzer includes a memory and a microprocessor. The memory stores non-transitory computer-readable instructions and is configured to store a baseband signal having a temporal frequency component and a corresponding first frequency-domain amplitude. The microprocessor is adapted to execute the instructions to: (i) generate a plurality of estimates of the first frequency-domain amplitude, wherein each of the plurality of estimates corresponds to a respective one of a plurality of temporal segments of the baseband signal, and (ii) determine the first frequency-domain amplitude as most common value of the plurality of estimates. Localization system 3300 of FIG. 33 may function as the frequency-domain analyzer denoted by (G1)

(G2) In the frequency-domain analyzer denoted by (G1) the microprocessor may be further adapted to execute the instructions, when determining the first frequency-domain amplitude, to: (i) bin the plurality of estimates into a plurality of bins, each of the plurality of bins corresponding to a respective interval between a maximum of the plurality of estimates and a minimum of the plurality of estimates, and (ii) determine the first frequency-domain amplitude as an estimate within the bin corresponding to the interval having the greatest number of estimates.

(G3) In the frequency-domain analyzer denoted by (G2), the plurality of bins may include (i) a first plurality of bins corresponding to a first plurality of intervals each with a respective center and a respective edge, (ii) a second plurality of bins corresponding to a second plurality of intervals shifted with respect to the first plurality of intervals such that a center of each of the second plurality of intervals corresponds to an edge of one of the first plurality of intervals.

(G4) In any frequency-domain analyzer denoted by one of (G2) and (G3), the microprocessor may be further adapted to execute the instructions to, before the step of generating a plurality of estimates: pre-process the baseband signal using a temporal differencing algorithm.

(G5) Any frequency-domain analyzer denoted by one of (G1) through (G4) may further include: (i) a receiver including a first channel, a second channel, and a third channel. The first channel includes (i) a first lens for receiving a first portion of an optical signal from the object, and (ii) a first photodetector for converting the received first portion, into a first electrical signal having the first frequency-domain amplitude, the optical signal being modulated at the temporal frequency. The second channel includes (i) a second lens for directing a second portion of the optical signal toward a slow-varying optical mask having a strictly monotonic transmissivity $T_2(x)$ in an x-range of a spatial dimension x, and (ii) a second photodetector for converting the second portion, transmitted through the slow-varying optical mask, into a second electrical signal. The third channel includes (i) a third lens for directing a third portion of the optical signal toward a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal. The microprocessor may be further configured to (i) determine a second and third frequency-domain amplitude from the second, and third electrical signals, respectively, and (ii) determine a location parameter of the object by comparing the first, second, and third frequency-domain amplitudes.

(G6) In any frequency-domain analyzer denoted by (G5), the microprocessor may be further configured to execute steps (ii) through (vi) of the method denoted by (F6).

(G7) In any frequency-domain analyzer denoted by (G6), the microprocessor may be further configured to execute steps (i) through (iv) of the method denoted by (F7).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for determining a localization parameter of an object, comprising:
    detecting a first portion of an optical signal from the object, the optical signal including a baseband signal modulated at a first temporal frequency;
    detecting a second portion of the optical signal transmitted through a first optical mask having a first spatially-varying transmissivity and at least three first transmissivity values;
    detecting a third portion of the optical signal transmitted through a second optical mask having a second spatially-varying transmissivity that differs from the first spatially-varying transmissivity and has at least three second transmissivity values;
    demodulating one of the first portion, the second portion, and the third portion to recover the baseband signal;
    generating a plurality of estimates of a first frequency-domain amplitude of the baseband signal, each of the plurality of estimates corresponding to a respective one of a plurality of temporal segments of the baseband signal, the first frequency-domain amplitude corresponding to the temporal frequency;
    binning the plurality of estimates into a plurality of bins, each of the plurality of bins corresponding to a respective one of a first plurality of intervals between a maximum of the plurality of estimates and a minimum of the plurality of estimates;
    determining the first frequency-domain amplitude as the estimate of the plurality of estimates that corresponds to the interval, of the first plurality of intervals, having the greatest number of estimates; and
    determining the localization parameter based on the first frequency-domain amplitude, the localization parameter being at least one of (i) an angle with respect to a receiver configured to detect the baseband signal and (ii) a distance between the object and the receiver.

2. The method of claim 1, the plurality of bins including (i) a first plurality of bins corresponding to a first subplurality of intervals, of the first plurality of intervals, each with a respective center and a respective edge, (ii) a second plurality of bins corresponding to a second subplurality of intervals, of the first plurality of intervals, shifted with respect to the first subplurality of intervals such that a center of each of the second subplurality of intervals corresponds to an edge of one of the first subplurality of intervals.

3. The method of claim 2, further comprising, before generating the plurality of estimates, pre-processing the recovered baseband signal using a temporal differencing algorithm.

4. The method of claim 1,
    when detecting the second portion of the optical signal, the first spatially-varying transmissivity being a strictly monotonic transmissivity $T_2(x)$, in an x-range of a spatial dimension x;
    when detecting the third portion of the optical signal, the second spatially-varying transmissivity being a spatially-varying transmissivity $T_3(x)$ having a same value at more than one value of x in the x-range.

5. The method of claim 1, the one of the detected first portion, the detected second portion, and the detected third portion being the detected first portion, and further comprising:
    demodulating the detected second portion to yield a second baseband signal;
    generating a second plurality of estimates, of a second frequency-domain amplitude corresponding to the temporal frequency, each corresponding to a respective one of a plurality of second temporal segments of the second baseband signal;
    binning the second plurality of estimates into a second plurality of bins, each of the plurality of bins corresponding to a respective one of a second plurality of intervals between a maximum of the second plurality of estimates and a minimum of the second plurality of estimates;

determining the second frequency-domain amplitude as the estimate of the second plurality of estimates that corresponds to the interval, of the second plurality of intervals, having the greatest number of estimates;

demodulating the detected third portion to yield a third baseband signal;

generating a third plurality of estimates, of a third frequency-domain amplitude, corresponding to the temporal frequency, each corresponding to a respective one of a plurality of third temporal segments of the third baseband signal; and binning the third plurality of estimates into a third plurality of bins, each of the plurality of bins corresponding to a respective one of a third plurality of intervals interval between a maximum of the third plurality of estimates and a minimum of the third plurality of estimates;

determining the third frequency-domain amplitude as the estimate of the third plurality of estimates and within one of the third plurality bins that corresponds to the interval, of the third plurality of intervals, having the greatest number of estimates.

6. A localization system for determining a localization parameter of an object comprising:
a receiver including:
a first channel including (i) a first lens for receiving a first portion of an optical signal from the object, and (ii) a first photodetector for converting the received first portion into a first electrical signal having the first frequency-domain amplitude, the optical signal including a baseband signal modulated at a first temporal frequency;
a second channel including (i) a second lens for directing a second portion of the optical signal toward a slow-varying optical mask having first spatially-varying transmissivity, and (ii) a second photodetector for converting the second portion, transmitted through the slow-varying optical mask, into a second electrical signal;
a third channel including (i) a third lens for directing a third portion of the optical signal toward a fast-varying optical mask having a second spatially-varying transmissivity that differs from the first spatially-varying transmissivity, and (ii) a third photodetector for converting the third portion, transmitted through the fast-varying optical mask, into a third electrical signal;
a memory storing non-transitory computer-readable instructions and configured to store the baseband signal that includes the first temporal frequency and, corresponding thereto, the first frequency-domain amplitude; and
a microprocessor adapted to execute the instructions to:
generate a plurality of estimates of the first frequency-domain amplitude, wherein each of the plurality of estimates corresponds to a respective one of a plurality of temporal segments of the baseband signal;
bin the plurality of estimates into a plurality of bins, each of the plurality of bins corresponding to a respective one of a first plurality of intervals between a maximum of the plurality of estimates and a minimum of the plurality of estimates; and
determine the first frequency-domain amplitude as an estimate within one of the plurality bins that corresponds to the interval, of the first plurality of intervals, having the greatest number of estimates; and determine the localization parameter based on the first frequency-domain amplitude.

7. The localization system of claim 6, the plurality of bins including (i) a first plurality of bins corresponding to a first subplurality of intervals, of the first plurality of intervals, each with a respective center and a respective edge, (ii) a second plurality of bins corresponding to a second subplurality of intervals, of the first plurality of intervals, shifted with respect to the first subplurality of intervals such that a center of each of the second subplurality of intervals corresponds to an edge of one of the first subplurality of intervals.

8. The localization system of claim 6, the microprocessor being further adapted to execute the instructions to, before the step of generating a plurality of estimates: pre-process the baseband signal using a temporal differencing algorithm.

9. The localization system of claim 6,
the first spatially-varying transmissivity being a strictly monotonic transmissivity $T_2(x)$ in an x-range of a spatial dimension x;
the second spatially-varying transmissivity being a spatially-varying transmissivity $T_3(x)$ having a same value at more than one value of x in the x-range;
the microprocessor being further configured to (i) determine a second and third frequency-domain amplitude from the second, and third electrical signals, respectively, and (ii) determine a localization parameter of the object by comparing the first, second, and third frequency-domain amplitudes.

10. The localization system of claim 6, the microprocessor being further configured to:
demodulate the second portion to yield a second baseband signal;
generate a second plurality of estimates of a second frequency-domain amplitude, corresponding to the temporal frequency, each corresponding to a respective one of a respective plurality of second temporal segments of the second baseband signal;
bin the second plurality of estimates into a second plurality of bins, each of the plurality of bins corresponding to a respective one of a second plurality of intervals between a maximum of the second plurality of estimates and a minimum of the second plurality of estimates;
determine the second frequency-domain amplitude as the estimate of the second plurality of estimates that corresponds to the interval, of the second plurality of intervals having the greatest number of estimates;
demodulate the third portion to yield a third baseband signal;
generate a third plurality of estimates of a third frequency-domain amplitude, corresponding to the temporal frequency, each corresponding to a respective one of a plurality of third temporal segments of the third baseband signal;
bin the third plurality of estimates into a third plurality of bins, each of the plurality of bins corresponding to a respective one of a third plurality of intervals between a maximum of the third plurality of estimates and a minimum of the third plurality of estimates; and
determine the third frequency-domain amplitude as the estimate of the third plurality of estimates and within one of the third plurality bins that corresponds to the interval, of the third plurality of intervals, having the greatest number of estimates.

11. The localization system of claim 9, the microprocessor being further configured to determine the localization parameter by:

determining a coarse-estimate location $x_2$ in the x-range and corresponding to a position on the slow-varying optical mask having transmissivity equal to the second frequency-domain amplitude divided by the first frequency-domain amplitude;

determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third frequency-domain amplitude divided by the first frequency-domain amplitude;

determining a refined-estimate location, of the plurality of candidate locations, closest to coarse-estimate location $x_2$; and determining the localization parameter, based on the refined-estimate location, as an angle of the object with respect to a plane perpendicular to the spatial dimension x and intersecting the slow-varying optical mask and the fast-varying optical mask.

12. A frequency-domain analyzer comprising:

a receiver including:
- a first channel including (i) a first lens for receiving a first portion of an optical signal from the object, and (ii) a first photodetector for converting the received first portion into a first electrical signal having the first frequency-domain amplitude, the optical signal including a baseband signal modulated at a first temporal frequency;
- a second channel including (i) a second lens for directing a second portion of the optical signal toward a slow-varying optical mask having first spatially-varying transmissivity, and (ii) a second photodetector for converting the second portion, transmitted through the slow-varying optical mask, into a second electrical signal;
- a third channel including (i) a third lens for directing a third portion of the optical signal toward a fast-varying optical mask having a second spatially-varying transmissivity that differs from the first spatially-varying transmissivity, and (ii) a third photodetector for converting the third portion, transmitted through the fast-varying optical mask, into a third electrical signal;

a memory storing non-transitory computer-readable instructions and configured to store the baseband signal that includes the first temporal frequency and, corresponding thereto, the first frequency-domain amplitude;

the instructions, when executed by a microprocessor, causing the microprocessor to:
- generate a plurality of estimates of the first frequency-domain amplitude each corresponding to a respective one of a plurality of temporal segments of the baseband signal;
- bin the plurality of estimates into a plurality of bins, each bin corresponding to a respective one of a first plurality of intervals between a maximum of the plurality of estimates and a minimum of the plurality of estimates; and
- determine the first frequency-domain amplitude an estimate within one of the plurality of bins corresponding to the interval, of the first plurality of intervals, having the greatest number of estimates.

13. The frequency-domain analyzer of claim 12, the plurality of bins including (i) a first plurality of bins corresponding to a first subplurality of intervals, of the first plurality of intervals, each with a respective center and a respective edge, (ii) a second plurality of bins corresponding to a second subplurality of intervals, of the first plurality of intervals, shifted with respect to the first subplurality of intervals such that a center of each of the second subplurality of intervals corresponds to an edge of one of the first subplurality of intervals.

14. The frequency-domain analyzer of claim 12, further comprising instructions that when executed by the microprocessor, further cause the microprocessor, before the step of generating a plurality of estimates: pre-process the baseband signal using a temporal differencing algorithm.

15. The frequency-domain analyzer of claim 12,
the first spatially-varying transmissivity being a strictly monotonic transmissivity $T_2(x)$ in an x-range of a spatial dimension x;

the second spatially-varying transmissivity being the third channel including (i) a third lens for directing a third portion of the optical signal toward a fast-varying optical mask having a spatially-varying transmissivity $T_3(x)$ having a same value at more than one value of x in the x-range, and (ii) a third photodetector for converting the third portion, transmitted through the fast-varying optical mask, into a third electrical signal;

the instructions, when executed by the microprocessor, further causing the microprocessor to (i) determine a second and third frequency-domain amplitude from the second, and third electrical signals, respectively, and (ii) determine a location parameter of the object by comparing the first, second, and third frequency-domain amplitudes.

16. The frequency-domain analyzer of claim 15, further comprising instructions, that when executed by the microprocessor, further cause the microprocessor to:

demodulate the second portion to yield a second baseband signal;

generate a second plurality of estimates of a second frequency-domain amplitude, corresponding to the temporal frequency, each corresponding to a respective one of a respective plurality of second temporal segments of the second baseband signal;

bin the second plurality of estimates into a second plurality of bins, each of the plurality of bins corresponding to a respective one of second plurality of intervals between a maximum of the second plurality of estimates and a minimum of the second plurality of estimates;

determine the second frequency-domain amplitude as the estimate of the second plurality of estimates and within one of the second plurality bins that corresponds to the interval, of the second plurality of intervals, having the greatest number of estimates;

demodulate the third portion to yield a third baseband signal;

generate a third plurality of estimates of a third frequency-domain amplitude, corresponding to the temporal frequency, each corresponding to a respective one of a plurality of third temporal segments of the third baseband signal;

bin the third plurality of estimates into a third plurality of bins, each of the plurality of bins corresponding to a respective one of a third plurality of intervals between a maximum of the third plurality of estimates and a minimum of the third plurality of estimates; and determine the third frequency-domain amplitude as the estimate of the third plurality of estimates and within one of the third plurality bins that corresponds to the interval, of the third plurality of intervals, having the greatest number of estimates.

17. The frequency-domain analyzer of claim 15, further comprising instructions that, when executed by the microprocessor, further cause the microprocessor to determine the location parameter by:
- determining a coarse-estimate location $x_2$ in the x-range and corresponding to a position on the slow-varying optical mask having transmissivity equal to the second frequency-domain amplitude divided by the first frequency-domain amplitude;
- determining a plurality of candidate locations $\{x_{3,1}, x_{3,2}, x_{3,3}, \ldots, x_{3,n}\}$ in the x-range and corresponding to positions on the fast-varying optical mask having transmissivity equal to the third frequency-domain amplitude divided by the first frequency-domain amplitude;
- determining a refined-estimate location, of the plurality of candidate locations, closest to coarse-estimate location $x_2$; and
- determining, based on the refined-estimate location, an angle of the object with respect to a plane perpendicular to the spatial dimension x and intersecting the slow-varying optical mask and the fast-varying optical mask.

\* \* \* \* \*